US011687778B2

(12) United States Patent
Ciftci et al.

(10) Patent No.: US 11,687,778 B2
(45) Date of Patent: Jun. 27, 2023

(54) FAKECATCHER: DETECTION OF SYNTHETIC PORTRAIT VIDEOS USING BIOLOGICAL SIGNALS

(71) Applicants: The Research Foundation for The State University of New York, Binghamton, NY (US); Ilke Demir, Hermosa Beach, CA (US)

(72) Inventors: Umur Aybars Ciftci, Vestal, NY (US); Ilke Demir, Hermosa Beach, CA (US); Lijun Yin, Vestal, NY (US)

(73) Assignee: The Research Foundation for The State University of New York, Binghamton, NY (US)

( * ) Notice: Subject to any disclaimer, the term of this patent is extended or adjusted under 35 U.S.C. 154(b) by 177 days.

(21) Appl. No.: 17/143,093

(22) Filed: Jan. 6, 2021

(65) Prior Publication Data
US 2021/0209388 A1    Jul. 8, 2021

Related U.S. Application Data

(60) Provisional application No. 62/957,775, filed on Jan. 6, 2020.

(51) Int. Cl.
*G06N 3/08* (2023.01)
*G06V 40/40* (2022.01)
(Continued)

(52) U.S. Cl.
CPC ........... *G06N 3/08* (2013.01); *G06F 18/2411* (2023.01); *G06F 18/2415* (2023.01);
(Continued)

(58) Field of Classification Search
CPC ...... G06V 40/40; G06V 20/46; G06V 40/161; G06V 20/41; G06K 9/6269; G06K 9/6277; G06N 3/0454
(Continued)

(56) References Cited

U.S. PATENT DOCUMENTS 1,032,832 A    7/1912  Howson
5,021,692 A    6/1991  Hughes
(Continued)

OTHER PUBLICATIONS

U.S. Appl. No. 10/160,003, filed Dec. 25, 2018, Tanaka et al.
U.S. Appl. No. 10/160,167, filed Dec. 25, 2018, Valembois.
(Continued)

*Primary Examiner* — Michael R Neff
(74) *Attorney, Agent, or Firm* — Hoffberg & Associates; Steven M. Hoffberg

(57) ABSTRACT

Detection of synthetic content in portrait videos, e.g., deep fakes, is achieved. Detectors blindly utilizing deep learning are not effective in catching fake content, as generative models produce realistic results. However, biological signals hidden in portrait videos which are neither spatially nor temporally preserved in fake content, can be used as implicit descriptors of authenticity. 99.39% accuracy in pairwise separation is achieved. A generalized classifier for fake content is formulated by analyzing signal transformations and corresponding feature sets. Signal maps are generated, and a CNN employed to improve the classifier for detecting synthetic content. Evaluation on several datasets produced superior detection rates against baselines, independent of the source generator, or properties of available fake content. Experiments and evaluations include signals from various facial regions, under image distortions, with varying segment durations, from different generators, against unseen datasets, and under several dimensionality reduction techniques.

20 Claims, 13 Drawing Sheets

(51) Int. Cl.

| | |
|---|---|
| *G06V 20/40* | (2022.01) |
| *G06V 40/16* | (2022.01) |
| *G06F 18/2411* | (2023.01) |
| *G06F 18/2415* | (2023.01) |
| *G06N 3/045* | (2023.01) |
| *G06V 10/764* | (2022.01) |
| *G06V 10/82* | (2022.01) |
| *G06V 40/10* | (2022.01) |

(52) U.S. Cl.
CPC ........... *G06N 3/045* (2023.01); *G06V 10/764* (2022.01); *G06V 10/82* (2022.01); *G06V 20/41* (2022.01); *G06V 20/46* (2022.01); *G06V 40/161* (2022.01); *G06V 40/169* (2022.01); *G06V 40/40* (2022.01); *G06V 40/45* (2022.01); *G06V 40/15* (2022.01)

(58) Field of Classification Search
USPC ........................................................ 382/115
See application file for complete search history.

(56) References Cited

U.S. PATENT DOCUMENTS

| | | |
|---|---|---|
| 5,490,061 A | 2/1996 | Tolin et al. |
| 5,591,978 A | 1/1997 | Kovalsky et al. |
| 5,730,904 A | 3/1998 | Bartmann et al. |
| 5,892,850 A | 4/1999 | Tsuruoka |
| 6,248,110 B1 | 6/2001 | Reiley et al. |
| 6,639,349 B1 | 10/2003 | Bahadur |
| 6,875,048 B2 | 4/2005 | Lee |
| 7,066,611 B2 | 6/2006 | Anderson |
| 7,128,002 B2 | 10/2006 | Stanford |
| 7,213,940 B1 | 5/2007 | Van De Ven et al. |
| 7,333,916 B2 | 2/2008 | Warfield et al. |
| 7,370,364 B2 | 5/2008 | Dobbins et al. |
| 7,761,831 B2 | 7/2010 | Mai et al. |
| 7,880,266 B2 | 2/2011 | Park et al. |
| 8,637,596 B2 | 1/2014 | Van Den Bergen |
| 8,869,270 B2 | 10/2014 | Touboul |
| 9,500,591 B1 | 11/2016 | Goad et al. |
| 2008/0181508 A1 | 7/2008 | Kaneda et al. |
| 2008/0201282 A1 | 8/2008 | Garcia et al. |
| 2012/0082384 A1 | 4/2012 | Kaneda |
| 2013/0182130 A1 | 7/2013 | Tran |
| 2014/0058755 A1 | 2/2014 | Macoviak et al. |
| 2014/0068740 A1 | 3/2014 | LeCun et al. |
| 2014/0085501 A1 | 3/2014 | Tran |
| 2014/0089001 A1 | 3/2014 | Macoviak et al. |
| 2014/0300758 A1 | 10/2014 | Tran |
| 2014/0307076 A1 | 10/2014 | Deutsch |
| 2014/0355861 A1 | 12/2014 | Nirenberg et al. |
| 2014/0357312 A1 | 12/2014 | Davis et al. |
| 2014/0366113 A1 | 12/2014 | LeCun et al. |
| 2015/0002682 A1 | 1/2015 | Tran |
| 2015/0125049 A1 | 5/2015 | Taigman et al. |
| 2015/0142466 A1 | 5/2015 | Macoviak et al. |
| 2015/0142704 A1 | 5/2015 | London |
| 2015/0163345 A1 | 6/2015 | Cornaby et al. |
| 2015/0178554 A1 | 6/2015 | Kanaujia et al. |
| 2015/0193718 A1 | 7/2015 | Shaburov et al. |
| 2015/0262496 A1 | 9/2015 | Cook et al. |
| 2015/0286858 A1 | 10/2015 | Shaburov et al. |
| 2015/0286873 A1 | 10/2015 | Davis et al. |
| 2015/0379253 A1 | 12/2015 | Cook et al. |
| 2016/0055307 A1 | 2/2016 | Macoviak et al. |
| 2016/0071275 A1* | 3/2016 | Hirvonen ................. G06T 7/70 382/103 |
| 2016/0078339 A1 | 3/2016 | Li et al. |
| 2016/0092764 A1 | 3/2016 | Burchard |
| 2016/0117587 A1 | 4/2016 | Yan et al. |
| 2016/0117593 A1 | 4/2016 | London |
| 2016/0125274 A1 | 5/2016 | Zhou et al. |
| 2016/0127641 A1 | 5/2016 | Gove |
| 2016/0132789 A1 | 5/2016 | Flinn et al. |
| 2016/0180183 A1 | 6/2016 | Bourdev et al. |
| 2016/0188902 A1 | 6/2016 | Jin |
| 2016/0189010 A1 | 6/2016 | Tang et al. |
| 2016/0196758 A1 | 7/2016 | Causevic et al. |
| 2016/0203525 A1 | 7/2016 | Hara et al. |
| 2016/0210518 A1 | 7/2016 | Script et al. |
| 2016/0210533 A1 | 7/2016 | Kiapour et al. |
| 2016/0217157 A1 | 7/2016 | Shih et al. |
| 2016/0259994 A1 | 9/2016 | Ravindran et al. |
| 2016/0275341 A1 | 9/2016 | Li et al. |
| 2016/0313801 A1 | 10/2016 | Wagner et al. |
| 2016/0314345 A1 | 10/2016 | Kanaujia et al. |
| 2016/0321633 A1 | 11/2016 | Chandrasekaran et al. |
| 2016/0321671 A1 | 11/2016 | Chandrasekaran et al. |
| 2016/0323274 A1 | 11/2016 | Chandrasekaran et al. |
| 2016/0342865 A1 | 11/2016 | Tang et al. |
| 2016/0350649 A1 | 12/2016 | Zhang et al. |
| 2016/0358314 A1 | 12/2016 | Ji et al. |
| 2016/0371546 A1 | 12/2016 | Yadav et al. |
| 2016/0379092 A1 | 12/2016 | Kutliroff |
| 2016/0379505 A1 | 12/2016 | el Kaliouby et al. |
| 2017/0011258 A1 | 1/2017 | Pitre et al. |
| 2017/0024611 A1 | 1/2017 | Bourdev et al. |
| 2017/0046562 A1 | 2/2017 | Juefei-Xu et al. |
| 2017/0053169 A1 | 2/2017 | Cuban et al. |
| 2017/0061249 A1 | 3/2017 | Estrada et al. |
| 2017/0061625 A1 | 3/2017 | Estrada et al. |
| 2017/0068847 A1 | 3/2017 | el Kaliouby et al. |
| 2017/0068888 A1 | 3/2017 | Chung et al. |
| 2017/0076179 A1 | 3/2017 | Martineau et al. |
| 2017/0083752 A1 | 3/2017 | Saberian et al. |
| 2017/0083762 A1 | 3/2017 | Segalovitz et al. |
| 2017/0085774 A1 | 3/2017 | Majumdar et al. |
| 2017/0095192 A1 | 4/2017 | Sadowsky et al. |
| 2017/0098122 A1 | 4/2017 | el Kaliouby et al. |
| 2017/0098124 A1 | 4/2017 | Jonsson et al. |
| 2017/0105668 A1 | 4/2017 | el Kaliouby et al. |
| 2017/0109571 A1 | 4/2017 | McDuff et al. |
| 2017/0116467 A1 | 4/2017 | Li et al. |
| 2017/0124894 A1 | 5/2017 | Essafi et al. |
| 2017/0132495 A1 | 5/2017 | Feris et al. |
| 2017/0132496 A1 | 5/2017 | Shoaib et al. |
| 2017/0132511 A1 | 5/2017 | Gong et al. |
| 2017/0140213 A1 | 5/2017 | Brandt et al. |
| 2017/0148222 A1 | 5/2017 | Holzer et al. |
| 2017/0148223 A1 | 5/2017 | Holzer et al. |
| 2017/0154211 A1 | 6/2017 | Shaburov et al. |
| 2017/0155631 A1 | 6/2017 | Du |
| 2017/0171614 A1 | 6/2017 | el Kaliouby et al. |
| 2017/0177943 A1 | 6/2017 | Mehrseresht et al. |
| 2017/0185871 A1 | 6/2017 | Zhang et al. |
| 2017/0193011 A1 | 7/2017 | Kale et al. |
| 2017/0193315 A1 | 7/2017 | El-Khamy et al. |
| 2017/0193480 A1 | 7/2017 | Chandrasekaran et al. |
| 2017/0206691 A1 | 7/2017 | Harrises et al. |
| 2017/0213112 A1 | 7/2017 | Sachs et al. |
| 2017/0229149 A1 | 8/2017 | Rothschild et al. |
| 2017/0235824 A1 | 8/2017 | Liu |
| 2017/0236006 A1 | 8/2017 | Davis et al. |
| 2017/0236337 A1 | 8/2017 | Devries |
| 2017/0237961 A1 | 8/2017 | Barron et al. |
| 2017/0238859 A1 | 8/2017 | Sadowsky et al. |
| 2017/0238860 A1 | 8/2017 | el Kaliouby et al. |
| 2017/0244908 A1 | 8/2017 | Flack et al. |
| 2017/0249306 A1 | 8/2017 | Allen et al. |
| 2017/0255648 A1 | 9/2017 | Dube et al. |
| 2017/0255837 A1 | 9/2017 | Nirenberg et al. |
| 2017/0255923 A1 | 9/2017 | Dieter et al. |
| 2017/0255941 A1 | 9/2017 | Chandrasekaran et al. |
| 2017/0255942 A1 | 9/2017 | Chandrasekaran et al. |
| 2017/0256254 A1 | 9/2017 | Huang et al. |
| 2017/0263030 A1 | 9/2017 | Allen et al. |
| 2017/0264578 A1 | 9/2017 | Allen et al. |
| 2017/0270593 A1 | 9/2017 | Sherman et al. |
| 2017/0277363 A1 | 9/2017 | Holzer et al. |
| 2017/0278122 A1 | 9/2017 | Kaehler |
| 2017/0278289 A1 | 9/2017 | Marino et al. |
| 2017/0287225 A1 | 10/2017 | Powderly et al. |

(56) References Cited

U.S. PATENT DOCUMENTS

| | | |
|---|---|---|
| 2017/0289234 A1 | 10/2017 | Andreou et al. |
| 2017/0293480 A1 | 10/2017 | Wexler et al. |
| 2017/0294000 A1 | 10/2017 | Shen et al. |
| 2017/0300750 A1 | 10/2017 | Jonsson et al. |
| 2017/0300784 A1 | 10/2017 | Tang et al. |
| 2017/0301108 A1 | 10/2017 | Estrada et al. |
| 2017/0308734 A1 | 10/2017 | Chalom et al. |
| 2017/0309079 A1 | 10/2017 | Naples et al. |
| 2017/0312614 A1 | 11/2017 | Tran et al. |
| 2017/0323481 A1 | 11/2017 | Tran et al. |
| 2017/0323485 A1 | 11/2017 | Samec et al. |
| 2017/0330029 A1 | 11/2017 | Turcot et al. |
| 2017/0330059 A1 | 11/2017 | Novotny et al. |
| 2017/0330264 A1 | 11/2017 | Youssef et al. |
| 2017/0337438 A1 | 11/2017 | el Kaliouby, Jr. et al. |
| 2017/0337742 A1 | 11/2017 | Powderly et al. |
| 2017/0339093 A1 | 11/2017 | Pesavento et al. |
| 2017/0344860 A1 | 11/2017 | Sachs et al. |
| 2017/0344900 A1 | 11/2017 | Alzahrani |
| 2017/0351905 A1 | 12/2017 | Wang et al. |
| 2017/0351909 A1 | 12/2017 | Kaehler |
| 2017/0357847 A1 | 12/2017 | Jabri |
| 2017/0357851 A1 | 12/2017 | Segalovitz et al. |
| 2017/0357866 A1 | 12/2017 | Welland et al. |
| 2017/0357877 A1 | 12/2017 | Lin et al. |
| 2017/0359570 A1 | 12/2017 | Holzer et al. |
| 2017/0360323 A1 | 12/2017 | Li et al. |
| 2017/0364733 A1 | 12/2017 | Estrada et al. |
| 2017/0365101 A1 | 12/2017 | Samec et al. |
| 2017/0366896 A1 | 12/2017 | Adsumilli et al. |
| 2017/0371856 A1 | 12/2017 | Can et al. |
| 2017/0372046 A1 | 12/2017 | Thomee et al. |
| 2017/0372202 A1 | 12/2017 | Ginsburg et al. |
| 2017/0372364 A1 | 12/2017 | Andreou |
| 2017/0372487 A1 | 12/2017 | Lagun et al. |
| 2017/0372505 A1 | 12/2017 | Bhat et al. |
| 2018/0005445 A1 | 1/2018 | McCulloch et al. |
| 2018/0007337 A1 | 1/2018 | Barron et al. |
| 2018/0011865 A1 | 1/2018 | Bowman et al. |
| 2018/0011866 A1 | 1/2018 | Bowman et al. |
| 2018/0011867 A1 | 1/2018 | Bowman et al. |
| 2018/0012072 A1 | 1/2018 | Glaser et al. |
| 2018/0012080 A1 | 1/2018 | Glaser et al. |
| 2018/0012082 A1 | 1/2018 | Satazoda et al. |
| 2018/0012110 A1 | 1/2018 | Souche et al. |
| 2018/0012330 A1 | 1/2018 | Holzer et al. |
| 2018/0014382 A1 | 1/2018 | Glaser et al. |
| 2018/0015282 A1 | 1/2018 | Waner et al. |
| 2018/0018508 A1 | 1/2018 | Tusch |
| 2018/0018515 A1 | 1/2018 | Spizhevoy et al. |
| 2018/0028364 A1 | 2/2018 | Erickson et al. |
| 2018/0032798 A1 | 2/2018 | Setchell |
| 2018/0035938 A1 | 2/2018 | el Kaliouby et al. |
| 2018/0039745 A1 | 2/2018 | Chevalier et al. |
| 2018/0039866 A1 | 2/2018 | Kiapour et al. |
| 2018/0043829 A1 | 2/2018 | Cordell et al. |
| 2018/0043902 A1 | 2/2018 | Zhang |
| 2018/0045963 A1 | 2/2018 | Hoover et al. |
| 2018/0046851 A1 | 2/2018 | Kienzle et al. |
| 2018/0046869 A1 | 2/2018 | Cordell et al. |
| 2018/0046870 A1 | 2/2018 | Cordell et al. |
| 2018/0047288 A1 | 2/2018 | Cordell et al. |
| 2018/0047395 A1 | 2/2018 | Sommers et al. |
| 2018/0052876 A1 | 2/2018 | Liu et al. |
| 2018/0052908 A1 | 2/2018 | Liu et al. |
| 2018/0052928 A1 | 2/2018 | Liu et al. |
| 2018/0052929 A1 | 2/2018 | Liu et al. |
| 2018/0053102 A1 | 2/2018 | Martinson et al. |
| 2018/0053103 A1 | 2/2018 | Delgado et al. |
| 2018/0053108 A1 | 2/2018 | Olabiyi et al. |
| 2018/0053233 A1 | 2/2018 | Srivastava |
| 2018/0060466 A1 | 3/2018 | Morgan et al. |
| 2018/0060468 A1 | 3/2018 | Morgan et al. |
| 2018/0060469 A1 | 3/2018 | Morgan et al. |
| 2018/0060649 A1 | 3/2018 | Kastaniotis et al. |
| 2018/0060724 A1 | 3/2018 | Wang et al. |
| 2018/0063482 A1 | 3/2018 | Goesnar |
| 2018/0068019 A1 | 3/2018 | Novikoff et al. |
| 2018/0068031 A1 | 3/2018 | Hewavitharana et al. |
| 2018/0068198 A1 | 3/2018 | Savvides et al. |
| 2018/0074493 A1 | 3/2018 | Prokhorov et al. |
| 2018/0075292 A1 | 3/2018 | Shaburov et al. |
| 2018/0075293 A1 | 3/2018 | Schinas et al. |
| 2018/0075483 A1 | 3/2018 | Boyarshinov |
| 2018/0075659 A1 | 3/2018 | Browy et al. |
| 2018/0082107 A1 | 3/2018 | Li et al. |
| 2018/0082172 A1 | 3/2018 | Patel et al. |
| 2018/0082212 A1 | 3/2018 | Faivishevsky et al. |
| 2018/0082304 A1 | 3/2018 | Summerlin et al. |
| 2018/0083901 A1 | 3/2018 | McGregor, Jr. et al. |
| 2018/0088340 A1 | 3/2018 | Amayeh et al. |
| 2018/0088677 A1 | 3/2018 | Zhang et al. |
| 2018/0089493 A1 | 3/2018 | Nirenberg |
| 2018/0089505 A1 | 3/2018 | El-Khamy et al. |
| 2018/0089534 A1 | 3/2018 | Ye |
| 2018/0089540 A1 | 3/2018 | Merler et al. |
| 2018/0089543 A1 | 3/2018 | Merler et al. |
| 2018/0095619 A1 | 4/2018 | Liu et al. |
| 2018/0096196 A1 | 4/2018 | Gordon |
| 2018/0096226 A1 | 4/2018 | Aliabadi et al. |
| 2018/0096457 A1 | 4/2018 | Savvides et al. |
| 2018/0096503 A1 | 4/2018 | Kaehler et al. |
| 2018/0107682 A1 | 4/2018 | Wang et al. |
| 2018/0107684 A1 | 4/2018 | Kiapour et al. |
| 2018/0107685 A1 | 4/2018 | Kale et al. |
| 2018/0107902 A1 | 4/2018 | Yang et al. |
| 2018/0107917 A1 | 4/2018 | Hewavitharana et al. |
| 2018/0108066 A1 | 4/2018 | Kale et al. |
| 2018/0108165 A1 | 4/2018 | Shi et al. |
| 2018/0114017 A1 | 4/2018 | Leitner et al. |
| 2018/0114219 A1 | 4/2018 | Setchell et al. |
| 2018/0121560 A1 | 5/2018 | Chen et al. |
| 2018/0121748 A1 | 5/2018 | Kwak et al. |
| 2018/0121762 A1 | 5/2018 | Han et al. |
| 2018/0121767 A1 | 5/2018 | Wang et al. |
| 2018/0122114 A1 | 5/2018 | Luan et al. |
| 2018/0124299 A1 | 5/2018 | Brook |
| 2018/0124300 A1 | 5/2018 | Brook |
| 2018/0129869 A1 | 5/2018 | Yu et al. |
| 2018/0130324 A1 | 5/2018 | Yu et al. |
| 2018/0136486 A1 | 5/2018 | Macnamara et al. |
| 2018/0137551 A1 | 5/2018 | Zheng et al. |
| 2018/0137678 A1 | 5/2018 | Kaehler |
| 2018/0143635 A1 | 5/2018 | Zijderveld et al. |
| 2018/0144214 A1 | 5/2018 | Hsieh et al. |
| 2018/0144242 A1 | 5/2018 | Simard |
| 2018/0144243 A1 | 5/2018 | Hsieh et al. |
| 2018/0144465 A1 | 5/2018 | Hsieh et al. |
| 2018/0144466 A1 | 5/2018 | Hsieh et al. |
| 2018/0144649 A1 | 5/2018 | el Kaliouby et al. |
| 2018/0144746 A1 | 5/2018 | Mishra et al. |
| 2018/0150681 A1 | 5/2018 | Wang et al. |
| 2018/0150684 A1 | 5/2018 | Wang et al. |
| 2018/0150740 A1 | 5/2018 | Wang et al. |
| 2018/0157398 A1 | 6/2018 | Kaehler et al. |
| 2018/0157465 A1 | 6/2018 | Bittner et al. |
| 2018/0157681 A1 | 6/2018 | Yang et al. |
| 2018/0157916 A1 | 6/2018 | Doumbouya et al. |
| 2018/0157923 A1 | 6/2018 | el Kaliouby, Jr. et al. |
| 2018/0157939 A1 | 6/2018 | Butt et al. |
| 2018/0158159 A1 | 6/2018 | Divine et al. |
| 2018/0158197 A1 | 6/2018 | Dasgupta et al. |
| 2018/0158210 A1 | 6/2018 | Estrada et al. |
| 2018/0158246 A1 | 6/2018 | Grau et al. |
| 2018/0160982 A1 | 6/2018 | Laszlo et al. |
| 2018/0165508 A1 | 6/2018 | Othman et al. |
| 2018/0165596 A1 | 6/2018 | Abrams et al. |
| 2018/0173572 A1 | 6/2018 | Bequet et al. |
| 2018/0173942 A1 | 6/2018 | Kim et al. |
| 2018/0174348 A1 | 6/2018 | Bhat et al. |
| 2018/0174586 A1 | 6/2018 | Zamora Esquivel et al. |
| 2018/0181445 A1 | 6/2018 | Bequet et al. |
| 2018/0181446 A1 | 6/2018 | Bequet et al. |
| 2018/0181592 A1 | 6/2018 | Chen et al. |

(56) References Cited

U.S. PATENT DOCUMENTS

| | | |
|---|---|---|
| 2018/0189111 A1 | 7/2018 | Bequet et al. |
| 2018/0189112 A1 | 7/2018 | Bequet et al. |
| 2018/0189113 A1 | 7/2018 | Bequet et al. |
| 2018/0189215 A1 | 7/2018 | Boesch et al. |
| 2018/0189227 A1 | 7/2018 | Korthikanti et al. |
| 2018/0189229 A1 | 7/2018 | Desoli et al. |
| 2018/0189236 A1 | 7/2018 | Korthikanti et al. |
| 2018/0189238 A1 | 7/2018 | Lau et al. |
| 2018/0189424 A1 | 7/2018 | Boesch et al. |
| 2018/0189544 A1 | 7/2018 | Estrada et al. |
| 2018/0189568 A1 | 7/2018 | Powderly et al. |
| 2018/0189581 A1 | 7/2018 | Turcot et al. |
| 2018/0189641 A1 | 7/2018 | Boesch et al. |
| 2018/0189642 A1 | 7/2018 | Boesch et al. |
| 2018/0189652 A1 | 7/2018 | Korthikanti et al. |
| 2018/0196432 A1 | 7/2018 | Krupat et al. |
| 2018/0196587 A1 | 7/2018 | Bialynicka-Birula et al. |
| 2018/0197624 A1 | 7/2018 | Robaina et al. |
| 2018/0199025 A1 | 7/2018 | Holzer et al. |
| 2018/0199870 A1 | 7/2018 | Lee et al. |
| 2018/0201273 A1 | 7/2018 | Xiao et al. |
| 2018/0204111 A1 | 7/2018 | Zadeh et al. |
| 2018/0211107 A1 | 7/2018 | Segalovitz et al. |
| 2018/0211117 A1 | 7/2018 | Ratti |
| 2018/0211135 A1 | 7/2018 | Lin et al. |
| 2018/0211152 A1 | 7/2018 | Migacz et al. |
| 2018/0217429 A1 | 8/2018 | Busch |
| 2018/0218275 A1 | 8/2018 | Arrigoni et al. |
| 2018/0219814 A1 | 8/2018 | Maarek et al. |
| 2018/0225032 A1 | 8/2018 | Jones et al. |
| 2018/0225519 A1 | 8/2018 | Chen et al. |
| 2018/0225551 A1 | 8/2018 | Lin et al. |
| 2018/0232566 A1 | 8/2018 | Griffin et al. |
| 2018/0233132 A1 | 8/2018 | Herold et al. |
| 2018/0239650 A1 | 8/2018 | Gong et al. |
| 2018/0239651 A1 | 8/2018 | Gong et al. |
| 2018/0239975 A1 | 8/2018 | Tamrakar et al. |
| 2018/0246762 A1 | 8/2018 | Tarsa et al. |
| 2018/0247189 A1 | 8/2018 | Adel et al. |
| 2018/0247191 A1 | 8/2018 | Katz et al. |
| 2018/0247201 A1 | 8/2018 | Liu et al. |
| 2018/0253816 A1 | 9/2018 | John |
| 2018/0253817 A1 | 9/2018 | John |
| 2018/0253818 A1 | 9/2018 | John |
| 2018/0253865 A1 | 9/2018 | Price et al. |
| 2018/0255290 A1 | 9/2018 | Holzer et al. |
| 2018/0259960 A1 | 9/2018 | Cuban et al. |
| 2018/0260417 A1 | 9/2018 | Mahadevan et al. |
| 2018/0260643 A1 | 9/2018 | Sheikh Faridul et al. |
| 2018/0260668 A1 | 9/2018 | Shen et al. |
| 2018/0260801 A1 | 9/2018 | Chiarella et al. |
| 2018/0260975 A1 | 9/2018 | Sunkavalli et al. |
| 2018/0261203 A1 | 9/2018 | Zoller et al. |
| 2018/0267951 A1 | 9/2018 | Moah et al. |
| 2018/0268280 A1 | 9/2018 | Tokuchi |
| 2018/0268290 A1 | 9/2018 | Bose et al. |
| 2018/0268595 A1 | 9/2018 | Sarna et al. |
| 2018/0268812 A1 | 9/2018 | Kim et al. |
| 2018/0276231 A1 | 9/2018 | Bowman et al. |
| 2018/0276259 A1 | 9/2018 | Bowman et al. |
| 2018/0276479 A1 | 9/2018 | Harris et al. |
| 2018/0276489 A1 | 9/2018 | Xu et al. |
| 2018/0276495 A1 | 9/2018 | Yu et al. |
| 2018/0285456 A1 | 10/2018 | Nichkawde |
| 2018/0285682 A1 | 10/2018 | Najibi et al. |
| 2018/0286428 A1 | 10/2018 | Seider |
| 2018/0286520 A1 | 10/2018 | Apte et al. |
| 2018/0288182 A1 | 10/2018 | Tong et al. |
| 2018/0288431 A1 | 10/2018 | Liu et al. |
| 2018/0289334 A1 | 10/2018 | De Brouwer et al. |
| 2018/0292092 A1 | 10/2018 | Bhogal |
| 2018/0293552 A1 | 10/2018 | Zhang et al. |
| 2018/0293664 A1 | 10/2018 | Zhang et al. |
| 2018/0293754 A1 | 10/2018 | Ahuja et al. |
| 2018/0293755 A1 | 10/2018 | Ahuja et al. |
| 2018/0293806 A1 | 10/2018 | Zhang et al. |
| 2018/0295081 A1 | 10/2018 | McGregor, Jr. et al. |
| 2018/0295396 A1 | 10/2018 | Ramadorai et al. |
| 2018/0300556 A1 | 10/2018 | Varerkar et al. |
| 2018/0300751 A1 | 10/2018 | Hammitt et al. |
| 2018/0300927 A1 | 10/2018 | Hushchyn et al. |
| 2018/0303397 A1 | 10/2018 | Krupat et al. |
| 2018/0303581 A1 | 10/2018 | Martz et al. |
| 2018/0307303 A1 | 10/2018 | Powderly et al. |
| 2018/0307899 A1 | 10/2018 | Das et al. |
| 2018/0307912 A1 | 10/2018 | Selinger et al. |
| 2018/0307916 A1 | 10/2018 | Satzoda et al. |
| 2018/0308005 A1 | 10/2018 | Banipal et al. |
| 2018/0314406 A1 | 11/2018 | Powderly et al. |
| 2018/0314416 A1 | 11/2018 | Powderly et al. |
| 2018/0314941 A1 | 11/2018 | Lie et al. |
| 2018/0315076 A1 | 11/2018 | Andreou |
| 2018/0315188 A1 | 11/2018 | Tegzes et al. |
| 2018/0315213 A1 | 11/2018 | Surazhsky et al. |
| 2018/0316643 A1 | 11/2018 | Pesavento et al. |
| 2018/0316860 A1 | 11/2018 | Hushchyn et al. |
| 2018/0322365 A1 | 11/2018 | Yehezkel Rohekar |
| 2018/0322908 A1 | 11/2018 | Kim et al. |
| 2018/0330178 A1 | 11/2018 | el Kaliouby et al. |
| 2018/0330536 A1 | 11/2018 | Sawaki |
| 2018/0335776 A1 | 11/2018 | Theis et al. |
| 2018/0336226 A1 | 11/2018 | Anorga et al. |
| 2018/0336332 A1 | 11/2018 | Singh et al. |
| 2018/0336401 A1 | 11/2018 | Brandt et al. |
| 2018/0336415 A1 | 11/2018 | Anorga et al. |
| 2018/0336440 A1 | 11/2018 | Gopalan |
| 2018/0336463 A1 | 11/2018 | Bloom |
| 2018/0336464 A1 | 11/2018 | Karras et al. |
| 2018/0337994 A1 | 11/2018 | Dachtt et al. |
| 2018/0341838 A1 | 11/2018 | Prokopenya et al. |
| 2018/0341861 A1 | 11/2018 | Katz et al. |
| 2018/0341878 A1 | 11/2018 | Azout et al. |
| 2018/0342050 A1 | 11/2018 | Fitzgerald et al. |
| 2018/0342322 A1 | 11/2018 | Apte et al. |
| 2018/0348861 A1 | 12/2018 | Uscinski et al. |
| 2018/0349508 A1 | 12/2018 | Bequet et al. |
| 2018/0349702 A1 | 12/2018 | Gildert et al. |
| 2018/0349939 A1 | 12/2018 | Setchell et al. |
| 2018/0350071 A1 | 12/2018 | Purwar et al. |
| 2018/0350150 A1 | 12/2018 | Powderly et al. |
| 2018/0351786 A1 | 12/2018 | Pope et al. |
| 2018/0351956 A1 | 12/2018 | Verma |
| 2018/0356967 A1 | 12/2018 | Rasheed |
| 2018/0357286 A1 | 12/2018 | Wang et al. |
| 2018/0357501 A1 | 12/2018 | Ma |
| 2018/0364966 A1 | 12/2018 | Valeri et al. |
| 2018/0365270 A1 | 12/2018 | Azout et al. |
| 2018/0365372 A1 | 12/2018 | Araya et al. |
| 2018/0365772 A1 | 12/2018 | Thompson et al. |
| 2018/0365828 A1 | 12/2018 | Mansi et al. |
| 2018/0365874 A1 | 12/2018 | Hadap et al. |
| 2018/0365901 A1 | 12/2018 | Powderly et al. |
| 2018/0366225 A1 | 12/2018 | Mansi et al. |
| 2018/0367626 A1 | 12/2018 | Azout et al. |
| 2018/0367752 A1 | 12/2018 | Donsbach et al. |
| 2018/0367774 A1 | 12/2018 | Barron et al. |
| 2018/0373328 A1 | 12/2018 | Sawaki |
| 2018/0373696 A1 | 12/2018 | Terry et al. |
| 2018/0373958 A1 | 12/2018 | Patel et al. |
| 2018/0373975 A1 | 12/2018 | Yu et al. |
| 2018/0373983 A1 | 12/2018 | Katz et al. |
| 2018/0373984 A1 | 12/2018 | Katz et al. |
| 2018/0373985 A1 | 12/2018 | Yang et al. |
| 2018/0374099 A1 | 12/2018 | Litsur et al. |
| 2018/0374105 A1 | 12/2018 | Azout et al. |
| 2018/0374199 A1 | 12/2018 | Shen et al. |
| 2018/0374242 A1 | 12/2018 | Li et al. |
| 2019/0005021 A1 | 1/2019 | Miller et al. |
| 2019/0005024 A1 | 1/2019 | Somech et al. |
| 2019/0005195 A1 | 1/2019 | Peterson et al. |
| 2019/0005200 A1 | 1/2019 | Zimmerman et al. |
| 2019/0005313 A1 | 1/2019 | Vemulapalli et al. |
| 2019/0005355 A1 | 1/2019 | Joyce et al. |
| 2019/0005629 A1 | 1/2019 | Sharma et al. |

(56) References Cited

U.S. PATENT DOCUMENTS

| | | |
|---|---|---|
| 2019/0005976 A1 | 1/2019 | Peleg et al. |
| 2019/0007894 A1 | 1/2019 | Subramanian et al. |
| 2019/0011703 A1 | 1/2019 | Robaina et al. |
| 2019/0012170 A1 | 1/2019 | Qadeer et al. |
| 2019/0012403 A1 | 1/2019 | Bequet et al. |
| 2019/0012599 A1 | 1/2019 | el Kaliouby et al. |
| 2019/0012654 A1 | 1/2019 | Dragushan et al. |
| 2019/0014884 A1 | 1/2019 | Fu et al. |
| 2019/0019012 A1 | 1/2019 | Huang et al. |
| 2019/0019063 A1 | 1/2019 | Prokopenya et al. |
| 2019/0019068 A1 | 1/2019 | Zhu et al. |
| 2019/0019575 A1 | 1/2019 | Apte et al. |
| 2019/0025773 A1 | 1/2019 | Yang et al. |
| 2019/0026155 A1 | 1/2019 | Bequet et al. |
| 2019/0026538 A1 | 1/2019 | Wang et al. |
| 2019/0026548 A1 | 1/2019 | Varadarajan et al. |
| 2019/0026563 A1 | 1/2019 | Pachauri |
| 2019/0026608 A1 | 1/2019 | Hsieh et al. |
| 2019/0026864 A1 | 1/2019 | Chen et al. |
| 2019/0028829 A1 | 1/2019 | R et al. |
| 2019/0034235 A1 | 1/2019 | Yang et al. |
| 2019/0034706 A1 | 1/2019 | el Kaliouby et al. |
| 2019/0034716 A1 | 1/2019 | Kamarol et al. |
| 2019/0034735 A1 | 1/2019 | Cuban et al. |
| 2019/0034765 A1 | 1/2019 | Kaehler et al. |
| 2019/0034897 A1 | 1/2019 | Gao et al. |
| 2019/0034976 A1 | 1/2019 | Hamedi et al. |
| 2019/0035104 A1 | 1/2019 | Cuban et al. |
| 2019/0035159 A1 | 1/2019 | Tran et al. |
| 2019/0035381 A1 | 1/2019 | Maziewski et al. |
| 2019/0036856 A1 | 1/2019 | Bergenlid et al. |
| 2019/0041197 A1 | 2/2019 | Gernoth et al. |
| 2019/0042833 A1 | 2/2019 | Gernoth et al. |
| 2019/0042851 A1 | 2/2019 | Varadarajan et al. |
| 2019/0042854 A1 | 2/2019 | Sanjay et al. |
| 2019/0042867 A1 | 2/2019 | Chen et al. |
| 2019/0042870 A1 | 2/2019 | Chen et al. |
| 2019/0042884 A1 | 2/2019 | Guim Bernat et al. |
| 2019/0042894 A1 | 2/2019 | Anderson |
| 2019/0042900 A1 | 2/2019 | Smith et al. |
| 2019/0043177 A1 | 2/2019 | Nishimura et al. |
| 2019/0043201 A1 | 2/2019 | Strong et al. |
| 2019/0043209 A1 | 2/2019 | Nishimura et al. |
| 2019/0043217 A1 | 2/2019 | Estrada et al. |
| 2019/0043351 A1 | 2/2019 | Yang et al. |
| 2019/0043514 A1 | 2/2019 | Maziewski et al. |
| 2019/0043521 A1 | 2/2019 | Maziewski et al. |
| 2019/0044703 A1 | 2/2019 | Smith |
| 2019/0045169 A1 | 2/2019 | Menashe et al. |
| 2019/0045207 A1 | 2/2019 | Chen et al. |
| 2019/0050683 A1 | 2/2019 | Gupta Hyde et al. |
| 2019/0050774 A1 | 2/2019 | Divine et al. |
| 2019/0050987 A1 | 2/2019 | Hsieh et al. |
| 2019/0051179 A1 | 2/2019 | Alvarez et al. |
| 2019/0057299 A1 | 2/2019 | Kutliroff |
| 2019/0057356 A1 | 2/2019 | Larsen et al. |
| 2019/0060602 A1 | 2/2019 | Tran et al. |
| 2019/0065460 A1 | 2/2019 | Xin et al. |
| 2019/0065626 A1 | 2/2019 | Cameron et al. |
| 2019/0065835 A1 | 2/2019 | Prokopenya et al. |
| 2019/0065856 A1 | 2/2019 | Harris et al. |
| 2019/0065867 A1 | 2/2019 | Huang et al. |
| 2019/0065901 A1 | 2/2019 | Amato et al. |
| 2019/0065906 A1 | 2/2019 | Weng et al. |
| 2019/0065970 A1 | 2/2019 | Bonutti et al. |
| 2019/0066225 A1 | 2/2019 | Thompson et al. |
| 2019/0066328 A1 | 2/2019 | Kwant et al. |
| 2019/0066733 A1 | 2/2019 | Somanath et al. |
| 2019/0068996 A1 | 2/2019 | Ananthanarayanan et al. |
| 2019/0069147 A1 | 2/2019 | Charlton et al. |
| 2019/0073547 A1 | 3/2019 | el Kaliouby et al. |
| 2019/0073562 A1 | 3/2019 | Stolikj et al. |
| 2019/0078142 A1 | 3/2019 | Apte et al. |
| 2019/0079920 A1 | 3/2019 | Terry et al. |
| 2019/0079921 A1 | 3/2019 | Terry et al. |
| 2019/0080003 A1 | 3/2019 | Alcantara et al. |
| 2019/0080148 A1 | 3/2019 | He et al. |
| 2019/0080243 A1 | 3/2019 | David |
| 2019/0080448 A1 | 3/2019 | Dewitt et al. |
| 2019/0080474 A1 | 3/2019 | Lagun et al. |
| 2019/0080498 A1 | 3/2019 | Horie et al. |
| 2019/0080692 A1 | 3/2019 | R et al. |
| 2019/0080794 A1 | 3/2019 | Moskowitz |
| 2019/0081476 A1 | 3/2019 | Konya et al. |
| 2019/0082229 A1 | 3/2019 | Grumer et al. |
| 2019/0087544 A1 | 3/2019 | Peterson |
| 2019/0087660 A1 | 3/2019 | Hare et al. |
| 2019/0087661 A1 | 3/2019 | Lee et al. |
| 2019/0087686 A1 | 3/2019 | Du |
| 2019/0087690 A1 | 3/2019 | Srivastava |
| 2019/0087726 A1 | 3/2019 | Greenblatt et al. |
| 2019/0087729 A1 | 3/2019 | Byun et al. |
| 2019/0087973 A1 | 3/2019 | Kaehler et al. |
| 2019/0095703 A1 | 3/2019 | Das et al. |
| 2019/0095716 A1 | 3/2019 | Shrestha et al. |
| 2019/0095736 A1 | 3/2019 | Stahlfeld |
| 2019/0095787 A1 | 3/2019 | Kung et al. |
| 2019/0095946 A1 | 3/2019 | Azout et al. |
| 2019/0096073 A1 | 3/2019 | Nishimura |
| 2019/0102531 A1 | 4/2019 | Li et al. |
| 2019/0102640 A1 | 4/2019 | Balasubramanian |
| 2019/0102873 A1 | 4/2019 | Wang et al. |
| 2019/0102905 A1 | 4/2019 | Skogo |
| 2019/0107845 A1 | 4/2019 | Kaine |
| 2019/0108436 A1 | 4/2019 | David et al. |
| 2019/0108447 A1 | 4/2019 | Kounavis et al. |
| 2019/0110103 A1 | 4/2019 | el Kaliouby et al. |
| 2019/0114302 A1 | 4/2019 | Bequet |
| 2019/0114487 A1 | 4/2019 | Vijayanarasimhan et al. |
| 2019/0114533 A1 | 4/2019 | Ng et al. |
| 2019/0114548 A1 | 4/2019 | Wu et al. |
| 2019/0114818 A1 | 4/2019 | Lin et al. |
| 2019/0114824 A1 | 4/2019 | Martinez |
| 2019/0115097 A1 | 4/2019 | Macoviak et al. |
| 2019/0116150 A1 | 4/2019 | Pesavento et al. |
| 2019/0121808 A1 | 4/2019 | Chadha et al. |
| 2019/0122082 A1 | 4/2019 | Cuban et al. |
| 2019/0122092 A1 | 4/2019 | Haines et al. |
| 2019/0122146 A1 | 4/2019 | Meadows et al. |
| 2019/0122373 A1 | 4/2019 | Natroshvili et al. |
| 2019/0122409 A1 | 4/2019 | Meadows et al. |
| 2019/0122411 A1 | 4/2019 | Sachs et al. |
| 2019/0124079 A1 | 4/2019 | LeCun et al. |
| 2019/0129887 A1 | 5/2019 | Bowman et al. |
| 2019/0129888 A1 | 5/2019 | Bowman et al. |
| 2019/0130165 A1 | 5/2019 | Seshadri et al. |
| 2019/0130167 A1 | 5/2019 | Ng et al. |
| 2019/0130172 A1 | 5/2019 | Zhong et al. |
| 2019/0130202 A1 | 5/2019 | Doumbouya et al. |
| 2019/0130208 A1 | 5/2019 | Michael et al. |
| 2019/0130214 A1 | 5/2019 | N et al. |
| 2019/0130275 A1 | 5/2019 | Chen et al. |
| 2019/0130292 A1 | 5/2019 | N et al. |
| 2019/0130580 A1 | 5/2019 | Chen et al. |
| 2019/0130583 A1 | 5/2019 | Chen et al. |
| 2019/0130594 A1 | 5/2019 | Seyfi et al. |
| 2019/0130622 A1 | 5/2019 | Hoover et al. |
| 2019/0132629 A1 | 5/2019 | Kendrick |
| 2019/0132709 A1 | 5/2019 | Graefe et al. |
| 2019/0133510 A1 | 5/2019 | el Kaliouby et al. |
| 2019/0138554 A1 | 5/2019 | Remis et al. |
| 2019/0138555 A1 | 5/2019 | Bequet et al. |
| 2019/0138569 A1 | 5/2019 | Korthikanti et al. |
| 2019/0138656 A1 | 5/2019 | Yang et al. |
| 2019/0138787 A1 | 5/2019 | Zhang et al. |
| 2019/0138854 A1 | 5/2019 | Zhang et al. |
| 2019/0138907 A1 | 5/2019 | Szu |
| 2019/0146997 A1 | 5/2019 | Jin et al. |
| 2019/0146998 A1 | 5/2019 | Jin et al. |
| 2019/0147125 A1 | 5/2019 | Yu et al. |
| 2019/0147224 A1 | 5/2019 | Li et al. |
| 2019/0147296 A1 | 5/2019 | Wang et al. |
| 2019/0147305 A1 | 5/2019 | Lu et al. |
| 2019/0147366 A1 | 5/2019 | Sankaran et al. |

(56) References Cited

U.S. PATENT DOCUMENTS

| | | |
|---|---|---|
| 2019/0147607 A1 | 5/2019 | Stent et al. |
| 2019/0147614 A1 | 5/2019 | Hamzic et al. |
| 2019/0147709 A1 | 5/2019 | Schoner |
| 2019/0147875 A1 | 5/2019 | Stemmer et al. |
| 2019/0149725 A1 | 5/2019 | Adato et al. |
| 2019/0149736 A1 | 5/2019 | Hushchyn et al. |
| 2019/0149752 A1 | 5/2019 | Takahashi et al. |
| 2019/0150857 A1 | 5/2019 | Nye et al. |
| 2019/0152492 A1 | 5/2019 | el Kaliouby et al. |
| 2019/0155313 A1 | 5/2019 | Tang et al. |
| 2019/0156112 A1 | 5/2019 | Shaburov et al. |
| 2019/0156193 A1 | 5/2019 | Jaroch |
| 2019/0156206 A1 | 5/2019 | Graham et al. |
| 2019/0156210 A1 | 5/2019 | He et al. |
| 2019/0156217 A1 | 5/2019 | Jaroch |
| 2019/0156477 A1 | 5/2019 | Perrin et al. |
| 2019/0156484 A1 | 5/2019 | Nye et al. |
| 2019/0156506 A1 | 5/2019 | Fisher et al. |
| 2019/0158784 A1 | 5/2019 | Ahn et al. |
| 2019/0159737 A1 | 5/2019 | Buckler et al. |
| 2019/0162549 A1 | 5/2019 | Fouad et al. |
| 2019/0163870 A1 | 5/2019 | Bastide et al. |
| 2019/0163959 A1 | 5/2019 | Zhou et al. |
| 2019/0163977 A1 | 5/2019 | Chen et al. |
| 2019/0164050 A1 | 5/2019 | Chen et al. |
| 2019/0164173 A1 | 5/2019 | Liu et al. |
| 2019/0164197 A1 | 5/2019 | Boyd et al. |
| 2019/0164285 A1 | 5/2019 | Nye et al. |
| 2019/0164312 A1 | 5/2019 | Sunkavalli et al. |
| 2019/0164322 A1 | 5/2019 | Kong et al. |
| 2019/0164341 A1 | 5/2019 | Venkataraman |
| 2019/0166141 A1 | 5/2019 | Xu et al. |
| 2019/0171690 A1 | 6/2019 | Lau et al. |
| 2019/0171868 A1 | 6/2019 | Taigman et al. |
| 2019/0171871 A1 | 6/2019 | Zhang et al. |
| 2019/0171876 A1 | 6/2019 | Segalovitz et al. |
| 2019/0171886 A1 | 6/2019 | Ashour et al. |
| 2019/0171916 A1 | 6/2019 | Prokopenya et al. |
| 2019/0172197 A1 | 6/2019 | Buckler et al. |
| 2019/0172224 A1 | 6/2019 | Vajda et al. |
| 2019/0172243 A1 | 6/2019 | Mishra et al. |
| 2019/0172245 A1 | 6/2019 | Hushchyn et al. |
| 2019/0172458 A1 | 6/2019 | Mishra et al. |
| 2019/0172462 A1 | 6/2019 | Mishra et al. |
| 2019/0179861 A1 | 6/2019 | Goldenstein et al. |
| 2019/0180083 A1 | 6/2019 | Gupta et al. |
| 2019/0180084 A1 | 6/2019 | Bouaziz et al. |
| 2019/0180153 A1 | 6/2019 | Buckler et al. |
| 2019/0180409 A1 | 6/2019 | Moloney et al. |
| 2019/0180438 A1 | 6/2019 | Buckler et al. |
| 2019/0180469 A1 | 6/2019 | Gu et al. |
| 2019/0180499 A1 | 6/2019 | Caulfield et al. |
| 2019/0180586 A1 | 6/2019 | Script |
| 2019/0182455 A1 | 6/2019 | Ankita et al. |
| 2019/0188240 A1 | 6/2019 | Choi et al. |
| 2019/0188493 A1 | 6/2019 | Tiziani |
| 2019/0188524 A1 | 6/2019 | He et al. |
| 2019/0188562 A1 | 6/2019 | Edwards et al. |
| 2019/0188567 A1 | 6/2019 | Yao et al. |
| 2019/0188830 A1 | 6/2019 | Edwards et al. |
| 2019/0188895 A1 | 6/2019 | Marshall et al. |
| 2019/0188899 A1 | 6/2019 | Moloney et al. |
| 2019/0190538 A1 | 6/2019 | Park et al. |
| 2019/0190908 A1 | 6/2019 | Shen et al. |
| 2019/0197021 A1 | 6/2019 | Bowman et al. |
| 2019/0197328 A1 | 6/2019 | Zhong |
| 2019/0197330 A1 | 6/2019 | Mahmoud et al. |
| 2019/0197354 A1 | 6/2019 | Law et al. |
| 2019/0197357 A1 | 6/2019 | Anderson et al. |
| 2019/0197362 A1 | 6/2019 | Campanella et al. |
| 2019/0197369 A1 | 6/2019 | Law et al. |
| 2019/0197789 A1 | 6/2019 | Macauley et al. |
| 2019/0198057 A1 | 6/2019 | Cheung et al. |
| 2019/0200746 A1 | 7/2019 | Serval et al. |
| 2019/0200888 A1 | 7/2019 | Poltorak |
| 2019/0201691 A1 | 7/2019 | Poltorak |
| 2019/0205616 A1 | 7/2019 | Hong |
| 2019/0205618 A1 | 7/2019 | Jiang |
| 2019/0205620 A1 | 7/2019 | Yi et al. |
| 2019/0205659 A1 | 7/2019 | Cuban et al. |
| 2019/0205735 A1 | 7/2019 | Smelyanskiy et al. |
| 2019/0206091 A1 | 7/2019 | Weng |
| 2019/0209052 A1* | 7/2019 | Jeanne ............... A61B 5/1176 |
| 2019/0212749 A1 | 7/2019 | Chen et al. |
| 2019/0212815 A1 | 7/2019 | Zhang et al. |
| 2019/0213212 A1 | 7/2019 | Adato et al. |
| 2019/0213314 A1 | 7/2019 | Gordon |
| 2019/0213390 A1 | 7/2019 | Adato et al. |
| 2019/0213392 A1 | 7/2019 | Pan et al. |
| 2019/0213393 A1 | 7/2019 | Liu et al. |
| 2019/0213418 A1 | 7/2019 | Adato et al. |
| 2019/0213421 A1 | 7/2019 | Adato et al. |
| 2019/0213429 A1 | 7/2019 | Sicconi et al. |
| 2019/0213435 A1 | 7/2019 | Nikhara et al. |
| 2019/0213441 A1 | 7/2019 | Adato et al. |
| 2019/0213462 A1 | 7/2019 | McDonald et al. |
| 2019/0213474 A1 | 7/2019 | Lin et al. |
| 2019/0213497 A1 | 7/2019 | Long et al. |
| 2019/0213523 A1 | 7/2019 | Adato et al. |
| 2019/0213534 A1 | 7/2019 | Adato et al. |
| 2019/0213535 A1 | 7/2019 | Adato et al. |
| 2019/0213545 A1 | 7/2019 | Adato et al. |
| 2019/0213546 A1 | 7/2019 | Adato et al. |
| 2019/0213563 A1 | 7/2019 | Zhang et al. |
| 2019/0213689 A1 | 7/2019 | Zhang et al. |
| 2019/0213752 A1 | 7/2019 | Adato et al. |
| 2019/0213772 A1 | 7/2019 | Lombardi et al. |
| 2019/0213804 A1 | 7/2019 | Zhang et al. |
| 2019/0215424 A1 | 7/2019 | Adato et al. |
| 2019/0216334 A1 | 7/2019 | Zhou |
| 2019/0220652 A1 | 7/2019 | Li et al. |
| 2019/0220653 A1 | 7/2019 | Wang et al. |
| 2019/0220665 A1 | 7/2019 | Neumann et al. |
| 2019/0220697 A1 | 7/2019 | Kiemele et al. |
| 2019/0220698 A1 | 7/2019 | Pradeep |
| 2019/0220975 A1 | 7/2019 | Hsieh et al. |
| 2019/0220983 A1 | 7/2019 | Price et al. |
| 2019/0221001 A1 | 7/2019 | Dassa et al. |
| 2019/0222830 A1 | 7/2019 | Edwin et al. |
| 2019/0224441 A1 | 7/2019 | Poltorak |
| 2019/0228231 A1 | 7/2019 | Tandon et al. |
| 2019/0228273 A1 | 7/2019 | Merrill et al. |
| 2019/0230253 A1 | 7/2019 | Nikhara et al. |
| 2019/0235729 A1 | 8/2019 | Day et al. |
| 2019/0236273 A1 | 8/2019 | Saxe et al. |
| 2019/0236342 A1 | 8/2019 | Madden et al. |
| 2019/0236450 A1 | 8/2019 | Li et al. |
| 2019/0236452 A1 | 8/2019 | Wang et al. |
| 2019/0236531 A1 | 8/2019 | Adato et al. |
| 2019/0236609 A1 | 8/2019 | Li |
| 2019/0236738 A1 | 8/2019 | Lebel et al. |
| 2019/0237044 A1 | 8/2019 | Day et al. |
| 2019/0238568 A1 | 8/2019 | Goswami et al. |
| 2019/0243371 A1 | 8/2019 | Nister et al. |
| 2019/0243448 A1 | 8/2019 | Miller et al. |
| 2019/0243865 A1 | 8/2019 | Rausch et al. |
| 2019/0244092 A1 | 8/2019 | Baughman et al. |
| 2019/0244347 A1 | 8/2019 | Buckler et al. |
| 2019/0244348 A1 | 8/2019 | Buckler et al. |
| 2019/0244386 A1 | 8/2019 | Fisher et al. |
| 2019/0246075 A1 | 8/2019 | Khadloya et al. |
| 2019/0246130 A1 | 8/2019 | Sheikh et al. |
| 2019/0247662 A1 | 8/2019 | Poltroak |
| 2019/0248487 A1 | 8/2019 | Holtz et al. |
| 2019/0250601 A1 | 8/2019 | Donahoe et al. |
| 2019/0250622 A1 | 8/2019 | Nister et al. |
| 2019/0250640 A1 | 8/2019 | O'Flaherty et al. |
| 2019/0251337 A1 | 8/2019 | Liang et al. |
| 2019/0251369 A1 | 8/2019 | Popov et al. |
| 2019/0251376 A1 | 8/2019 | Stoffel et al. |
| 2019/0251395 A1 | 8/2019 | Zhang et al. |
| 2019/0251674 A1 | 8/2019 | Chang et al. |
| 2019/0253270 A1 | 8/2019 | Glaser et al. |
| 2019/0253614 A1 | 8/2019 | Oleson et al. |

(56) References Cited

U.S. PATENT DOCUMENTS

| | | |
|---|---|---|
| 2019/0258251 A1 | 8/2019 | Ditty et al. |
| 2019/0258851 A1 | 8/2019 | Rajan et al. |
| 2019/0258866 A1 | 8/2019 | Khadloya et al. |
| 2019/0258878 A1 | 8/2019 | Koivisto et al. |
| 2019/0258885 A1 | 8/2019 | Piette et al. |
| 2019/0258919 A1 | 8/2019 | Lie et al. |
| 2019/0258920 A1 | 8/2019 | Lie et al. |
| 2019/0258921 A1 | 8/2019 | Lie et al. |
| 2019/0259284 A1 | 8/2019 | Khadloya et al. |
| 2019/0259378 A1 | 8/2019 | Khadloya et al. |
| 2019/0259473 A1 | 8/2019 | Och et al. |
| 2019/0260204 A1 | 8/2019 | Koval et al. |
| 2019/0265703 A1 | 8/2019 | Hicok et al. |
| 2019/0265783 A1 | 8/2019 | Wedig |
| 2019/0266015 A1 | 8/2019 | Chandra et al. |
| 2019/0266391 A1 | 8/2019 | Prokopenya et al. |
| 2019/0266404 A1 | 8/2019 | Spivack et al. |
| 2019/0266418 A1 | 8/2019 | Xu et al. |
| 2019/0266450 A1 | 8/2019 | van Rensburg et al. |
| 2019/0266451 A1 | 8/2019 | Kiapour et al. |
| 2019/0266479 A1 | 8/2019 | Singh et al. |
| 2019/0266485 A1 | 8/2019 | Singh et al. |
| 2019/0266701 A1 | 8/2019 | Isikdogan et al. |
| 2019/0266784 A1 | 8/2019 | Singh et al. |
| 2019/0266796 A1 | 8/2019 | Comer |
| 2019/0268660 A1 | 8/2019 | el Kaliouby et al. |
| 2019/0268716 A1 | 8/2019 | Allen et al. |
| 2019/0269224 A1 | 9/2019 | Fu et al. |
| 2019/0272415 A1 | 9/2019 | Miao et al. |
| 2019/0272547 A1 | 9/2019 | Coman et al. |
| 2019/0272636 A1 | 9/2019 | Mansi et al. |
| 2019/0274523 A1 | 9/2019 | Bates et al. |
| 2019/0278434 A1 | 9/2019 | Holzer et al. |
| 2019/0278976 A1 | 9/2019 | Khadloya et al. |
| 2019/0278994 A1 | 9/2019 | Bumpas et al. |
| 2019/0279011 A1 | 9/2019 | Kshirsagar et al. |
| 2019/0279021 A1 | 9/2019 | Nirenberg et al. |
| 2019/0279046 A1 | 9/2019 | Han et al. |
| 2019/0279768 A1 | 9/2019 | Bates et al. |
| 2019/0281093 A1 | 9/2019 | Ahn et al. |
| 2019/0281104 A1 | 9/2019 | Andreou et al. |
| 2019/0283762 A1 | 9/2019 | el Kaliouby et al. |
| 2019/0285881 A1 | 9/2019 | Ilic et al. |
| 2019/0286153 A1 | 9/2019 | Rankawat et al. |
| 2019/0286242 A1 | 9/2019 | Ionescu et al. |
| 2019/0286889 A1 | 9/2019 | DeCovnick et al. |
| 2019/0286936 A1 | 9/2019 | Fuchs |
| 2019/0286947 A1 | 9/2019 | Abhiram |
| 2019/0286972 A1 | 9/2019 | El Husseini et al. |
| 2019/0286973 A1 | 9/2019 | Kovvuri et al. |
| 2019/0286980 A1 | 9/2019 | Backhus et al. |
| 2019/0286987 A1 | 9/2019 | Lie et al. |
| 2019/0287114 A1 | 9/2019 | Li |
| 2019/0287139 A1 | 9/2019 | Yadav et al. |
| 2019/0287309 A1 | 9/2019 | Samec et al. |
| 2019/0287512 A1 | 9/2019 | Zoller et al. |
| 2019/0289258 A1 | 9/2019 | Peterson et al. |
| 2019/0289359 A1 | 9/2019 | Sekar et al. |
| 2019/0289372 A1 | 9/2019 | Merler et al. |
| 2019/0289986 A1 | 9/2019 | Fu et al. |
| 2019/0291277 A1 | 9/2019 | Oleynik |
| 2019/0291720 A1 | 9/2019 | Xiao et al. |
| 2019/0294631 A1 | 9/2019 | Alcantara et al. |
| 2019/0294860 A1 | 9/2019 | Jin et al. |
| 2019/0294868 A1 | 9/2019 | Martinez |
| 2019/0294869 A1 | 9/2019 | Naphade et al. |
| 2019/0294889 A1 | 9/2019 | Sriram et al. |
| 2019/0294961 A1 | 9/2019 | Zuev et al. |
| 2019/0295151 A1 | 9/2019 | Ghadar et al. |
| 2019/0295223 A1 | 9/2019 | Shen et al. |
| 2019/0295252 A1 | 9/2019 | Fuchs et al. |
| 2019/0295282 A1 | 9/2019 | Smolyanskiy et al. |
| 2019/0296540 A1 | 9/2019 | Li et al. |
| 2019/0297461 A1 | 9/2019 | Charlton et al. |
| 2019/0302310 A1 | 10/2019 | Fox et al. |
| 2019/0302761 A1 | 10/2019 | Huang et al. |
| 2019/0303651 A1 | 10/2019 | Gallagher et al. |
| 2019/0303684 A1 | 10/2019 | Khadloya et al. |
| 2019/0303715 A1 | 10/2019 | Jiang et al. |
| 2019/0303759 A1 | 10/2019 | Farabet et al. |
| 2019/0303765 A1 | 10/2019 | Gou et al. |
| 2019/0304104 A1 | 10/2019 | Amer et al. |
| 2019/0304118 A1 | 10/2019 | Zhao |
| 2019/0304156 A1 | 10/2019 | Amer et al. |
| 2019/0304595 A1 | 10/2019 | Bergman et al. |
| 2019/0304604 A1 | 10/2019 | Kupersmith et al. |
| 2019/0306566 A1 | 10/2019 | Zaatarah |
| 2019/0311098 A1 | 10/2019 | Baldwin et al. |
| 2019/0311099 A1 | 10/2019 | Baldwin et al. |
| 2019/0311183 A1 | 10/2019 | Wang et al. |
| 2019/0311184 A1 | 10/2019 | Bourlai et al. |
| 2019/0311260 A1 | 10/2019 | Baldwin et al. |
| 2019/0311261 A1 | 10/2019 | Baldwin et al. |
| 2019/0313086 A1 | 10/2019 | Contreras et al. |
| 2019/0318153 A1 | 10/2019 | Liu et al. |
| 2019/0318156 A1 | 10/2019 | Wu et al. |
| 2019/0318171 A1 | 10/2019 | Wang et al. |
| 2019/0318262 A1 | 10/2019 | Meinders |
| 2019/0318491 A1 | 10/2019 | Laganiere et al. |
| 2019/0324458 A1 | 10/2019 | Sadeghi et al. |
| 2019/0324527 A1 | 10/2019 | Presant et al. |
| 2019/0324553 A1 | 10/2019 | Liu et al. |
| 2019/0324780 A1 | 10/2019 | Zhu et al. |
| 2019/0325042 A1 | 10/2019 | Yu et al. |
| 2019/0325080 A1 | 10/2019 | Natarajan et al. |
| 2019/0325081 A1 | 10/2019 | Liu et al. |
| 2019/0325084 A1 | 10/2019 | Peng et al. |
| 2019/0325200 A1 | 10/2019 | Qian et al. |
| 2019/0325203 A1 | 10/2019 | Yao et al. |
| 2019/0325256 A1 | 10/2019 | Van Bree et al. |
| 2019/0325259 A1 | 10/2019 | Murphy |
| 2019/0325263 A1 | 10/2019 | Kellerman |
| 2019/0325273 A1 | 10/2019 | Kumar |
| 2019/0325276 A1 | 10/2019 | Fu et al. |
| 2019/0325317 A1 | 10/2019 | David |
| 2019/0325633 A1 | 10/2019 | Marshall et al. |
| 2019/0325653 A1 | 10/2019 | Yip |
| 2019/0325863 A1 | 10/2019 | Martin |
| 2019/0325914 A1 | 10/2019 | Rothschild et al. |
| 2019/0326018 A1 | 10/2019 | Ricketts et al. |
| 2019/0327330 A1 | 10/2019 | Natarajan et al. |
| 2019/0327331 A1 | 10/2019 | Natarajan et al. |
| 2019/0327486 A1 | 10/2019 | Liao et al. |
| 2019/0327501 A1 | 10/2019 | Walters et al. |
| 2019/0329364 A1 | 10/2019 | Billings et al. |
| 2019/0332869 A1 | 10/2019 | Varerkar et al. |
| 2019/0332901 A1 | 10/2019 | Doumbouya et al. |
| 2019/0332926 A1 | 10/2019 | Lie et al. |
| 2019/0333233 A1 | 10/2019 | Hu et al. |
| 2019/0333507 A1 | 10/2019 | Kim et al. |
| 2019/0339784 A1 | 11/2019 | Lemay et al. |
| 2019/0340190 A1 | 11/2019 | Ganteaume |
| 2019/0340314 A1 | 11/2019 | Boesch et al. |
| 2019/0340419 A1 | 11/2019 | Milman et al. |
| 2019/0340470 A1 | 11/2019 | Hsieh et al. |
| 2019/0340492 A1 | 11/2019 | Burger et al. |
| 2019/0340499 A1 | 11/2019 | Burger et al. |
| 2019/0340803 A1 | 11/2019 | Comer |
| 2019/0341025 A1 | 11/2019 | Omote et al. |
| 2019/0341050 A1 | 11/2019 | Diamant et al. |
| 2019/0341152 A1 | 11/2019 | Mellem et al. |
| 2019/0342235 A1 | 11/2019 | Karp et al. |
| 2019/0347388 A1* | 11/2019 | Jiang .................... G06N 3/084 |
| 2019/0347518 A1 | 11/2019 | Shrestha et al. |
| 2019/0347522 A1 | 11/2019 | Nir et al. |
| 2019/0347536 A1 | 11/2019 | David et al. |
| 2019/0347813 A1 | 11/2019 | Gernoth et al. |
| 2019/0350514 A1 | 11/2019 | Purwar et al. |
| 2019/0354173 A1 | 11/2019 | Young et al. |
| 2019/0354174 A1 | 11/2019 | Young et al. |
| 2019/0354344 A1 | 11/2019 | Chen et al. |
| 2019/0354744 A1 | 11/2019 | Chaloux et al. |
| 2019/0354797 A1 | 11/2019 | Nesta et al. |
| 2019/0354829 A1 | 11/2019 | McDonald et al. |

(56) References Cited

U.S. PATENT DOCUMENTS

| | | |
|---|---|---|
| 2019/0354879 A1 | 11/2019 | van Rensburg |
| 2019/0355180 A1 | 11/2019 | Powderly et al. |
| 2019/0355193 A1 | 11/2019 | Kirsch et al. |
| 2019/0355351 A1 | 11/2019 | Kim et al. |
| 2019/0355474 A1 | 11/2019 | Mellem et al. |
| 2019/0356679 A1 | 11/2019 | Sites et al. |
| 2019/0357615 A1 | 11/2019 | Koh et al. |
| 2019/0362058 A1 | 11/2019 | Liu |
| 2019/0362130 A1 | 11/2019 | Othman et al. |
| 2019/0362132 A1 | 11/2019 | Zhang et al. |
| 2019/0362149 A1 | 11/2019 | Mukhopadhyay |
| 2019/0362233 A1 | 11/2019 | Aizawa et al. |
| 2019/0362506 A1 | 11/2019 | Leroyer et al. |
| 2019/0362514 A1 | 11/2019 | Sinha et al. |
| 2019/0362529 A1 | 11/2019 | Wedig et al. |
| 2019/0362557 A1 | 11/2019 | Lacey et al. |
| 2019/0362707 A1 | 11/2019 | Meng et al. |
| 2019/0364039 A1 | 11/2019 | Chandrasekaran et al. |
| 2019/0366153 A1 | 12/2019 | Zhang et al. |
| 2019/0369974 A1 | 12/2019 | Bequet et al. |
| 2019/0370288 A1 | 12/2019 | Bequet et al. |
| 2019/0370529 A1 | 12/2019 | Kumar et al. |
| 2019/0370532 A1 | 12/2019 | Soni et al. |
| 2019/0370577 A1 | 12/2019 | Meng et al. |
| 2019/0370578 A1 | 12/2019 | Meng et al. |
| 2019/0370580 A1 | 12/2019 | Aoi et al. |
| 2019/0370581 A1 | 12/2019 | Cordell et al. |
| 2019/0370652 A1 | 12/2019 | Shen et al. |
| 2019/0370665 A1 | 12/2019 | David |
| 2019/0370695 A1 | 12/2019 | Chandwani et al. |
| 2019/0371028 A1 | 12/2019 | Harrises et al. |
| 2019/0371145 A1 | 12/2019 | McQueen et al. |
| 2019/0373264 A1 | 12/2019 | Chong et al. |
| 2019/0377345 A1 | 12/2019 | Bachrach et al. |
| 2019/0377487 A1 | 12/2019 | Bailey et al. |
| 2019/0377819 A1 | 12/2019 | Filliben et al. |
| 2019/0377840 A1 | 12/2019 | Boesch et al. |
| 2019/0377957 A1 | 12/2019 | Johnston et al. |
| 2019/0378010 A1 | 12/2019 | Morris et al. |
| 2019/0378037 A1 | 12/2019 | Kale et al. |
| 2019/0378049 A1 | 12/2019 | Widmann et al. |
| 2019/0378050 A1 | 12/2019 | Edkin et al. |
| 2019/0378051 A1 | 12/2019 | Widmann et al. |
| 2019/0378171 A1 | 12/2019 | Bhat et al. |
| 2019/0378316 A1 | 12/2019 | Hushchyn et al. |
| 2019/0378423 A1 | 12/2019 | Bachrach et al. |
| 2019/0379682 A1 | 12/2019 | Overby et al. |
| 2019/0379683 A1 | 12/2019 | Overby et al. |
| 2019/0379818 A1 | 12/2019 | Brook |
| 2019/0380792 A1 | 12/2019 | Poltaretskyi et al. |
| 2019/0381401 A1 | 12/2019 | Cappello et al. |
| 2019/0384303 A1 | 12/2019 | Muller et al. |
| 2019/0384304 A1 | 12/2019 | Towal et al. |
| 2019/0384790 A1 | 12/2019 | Bequet et al. |
| 2019/0384954 A1 | 12/2019 | Lyubimov et al. |
| 2019/0384967 A1 | 12/2019 | Sun et al. |
| 2019/0385239 A1 | 12/2019 | Thompson et al. |
| 2019/0385338 A1 | 12/2019 | Estrada et al. |
| 2019/0385430 A1 | 12/2019 | Criado-Perez et al. |
| 2019/0385600 A1 | 12/2019 | Kim |
| 2019/0385711 A1 | 12/2019 | Shriberg et al. |
| 2019/0387168 A1 | 12/2019 | Smith et al. |
| 2019/0390392 A1 | 12/2019 | Lee et al. |
| 2019/0391972 A1 | 12/2019 | Bates et al. |
| 2019/0392122 A1 | 12/2019 | Foster et al. |
| 2019/0392128 A1 | 12/2019 | Conde et al. |
| 2019/0392195 A1 | 12/2019 | Maeng |
| 2019/0392196 A1 | 12/2019 | Sagonas et al. |
| 2019/0392212 A1 | 12/2019 | Sawhney et al. |
| 2019/0392230 A1 | 12/2019 | Welland et al. |
| 2019/0392266 A1 | 12/2019 | Zhong et al. |
| 2019/0392297 A1 | 12/2019 | Lau et al. |
| 2019/0392305 A1 | 12/2019 | Gu et al. |
| 2019/0392643 A1 | 12/2019 | Busto et al. |
| 2019/0392729 A1 | 12/2019 | Lee et al. |
| 2019/0392852 A1 | 12/2019 | Hijazi et al. |
| 2019/0394057 A1 | 12/2019 | Bujnowski et al. |
| 2019/0394153 A1 | 12/2019 | McGregor, Jr. et al. |
| 2019/0394276 A1 | 12/2019 | Dachille et al. |
| 2019/0394420 A1 | 12/2019 | Kim et al. |
| 2020/0000552 A1 | 1/2020 | Mednikov et al. |
| 2020/0003482 A1 | 1/2020 | Kim et al. |
| 2020/0004808 A1 | 1/2020 | Yao et al. |
| 2020/0005060 A1 | 1/2020 | Martin et al. |
| 2020/0005088 A1 | 1/2020 | Joy |
| 2020/0005138 A1 | 1/2020 | Wedig |
| 2020/0005142 A1 | 1/2020 | Lie et al. |
| 2020/0005789 A1 | 1/2020 | Chae |
| 2020/0005794 A1 | 1/2020 | Kim |
| 2020/0007512 A1 | 1/2020 | Kirat et al. |
| 2020/0012806 A1 | 1/2020 | Bates et al. |
| 2020/0065526 A1 | 2/2020 | Berman |
| 2020/0092301 A1 | 3/2020 | Coffing |
| 2020/0145436 A1 | 5/2020 | Brown et al. |
| 2020/0160502 A1 | 5/2020 | Nie ner et al. |
| 2020/0162236 A1 | 5/2020 | Miller et al. |
| 2020/0162266 A1 | 5/2020 | Miller et al. |
| 2020/0175737 A1 | 6/2020 | Barber |
| 2020/0184053 A1 | 6/2020 | Kursun |
| 2020/0210956 A1 | 7/2020 | de Malzac de Sengla et al. |
| 2020/0233060 A1 | 7/2020 | Lull et al. |
| 2020/0259862 A1 | 8/2020 | Daar et al. |
| 2020/0264758 A1 | 8/2020 | Gildert et al. |
| 2020/0285683 A1 | 9/2020 | David |
| 2020/0302609 A1 | 9/2020 | Rong et al. |
| 2020/0327310 A1 | 10/2020 | Palmer |
| 2020/0327410 A1 | 10/2020 | Fairhart |
| 2020/0394281 A1 | 12/2020 | Ur |
| 2020/0402342 A1 | 12/2020 | Kelly et al. |
| 2021/0049366 A1* | 2/2021 | Horton .................. G06N 20/00 |
| 2022/0262148 A1* | 8/2022 | Lee .......................... G06V 20/95 |

OTHER PUBLICATIONS

U.S. Appl. No. 10/160,893, filed Dec. 25, 2018, Stevens et al.
U.S. Appl. No. 10/420,698, filed Sep. 24, 2019, Jones Jr. et al.
U.S. Appl. No. 10/552,667, filed Feb. 4, 2020, Bogan III et al..
U.S. Appl. No. 10/658,005, filed May 19, 2020, Bogan III et al.
U.S. Appl. No. 10/671,240, filed Jun. 2, 2020, Gildert et al.
U.S. Appl. No. 10/671,838, filed Jun. 2, 2020, Bogan III et al.
U.S. Appl. No. 10/715,329, filed Jul. 14, 2020, Wellman.
U.S. Appl. No. 10/747,837, filed Aug. 18, 2020, Goldenstein et al.
U.S. Appl. No. 10/803,646, filed Oct. 13, 2020, Bogan III et al.
U.S. Appl. No. 10/810,725, filed Oct. 20, 2020, Dolhansky et al.
U.S. Appl. No. 10/817,134, filed Oct. 27, 2020, Gildert et al.
U.S. Appl. No. 10/860,692, filed Dec. 8, 2020, Ur.
U.S. Appl. No. 10/881,748, filed Jan. 5, 2021, Voss et al.

\* cited by examiner

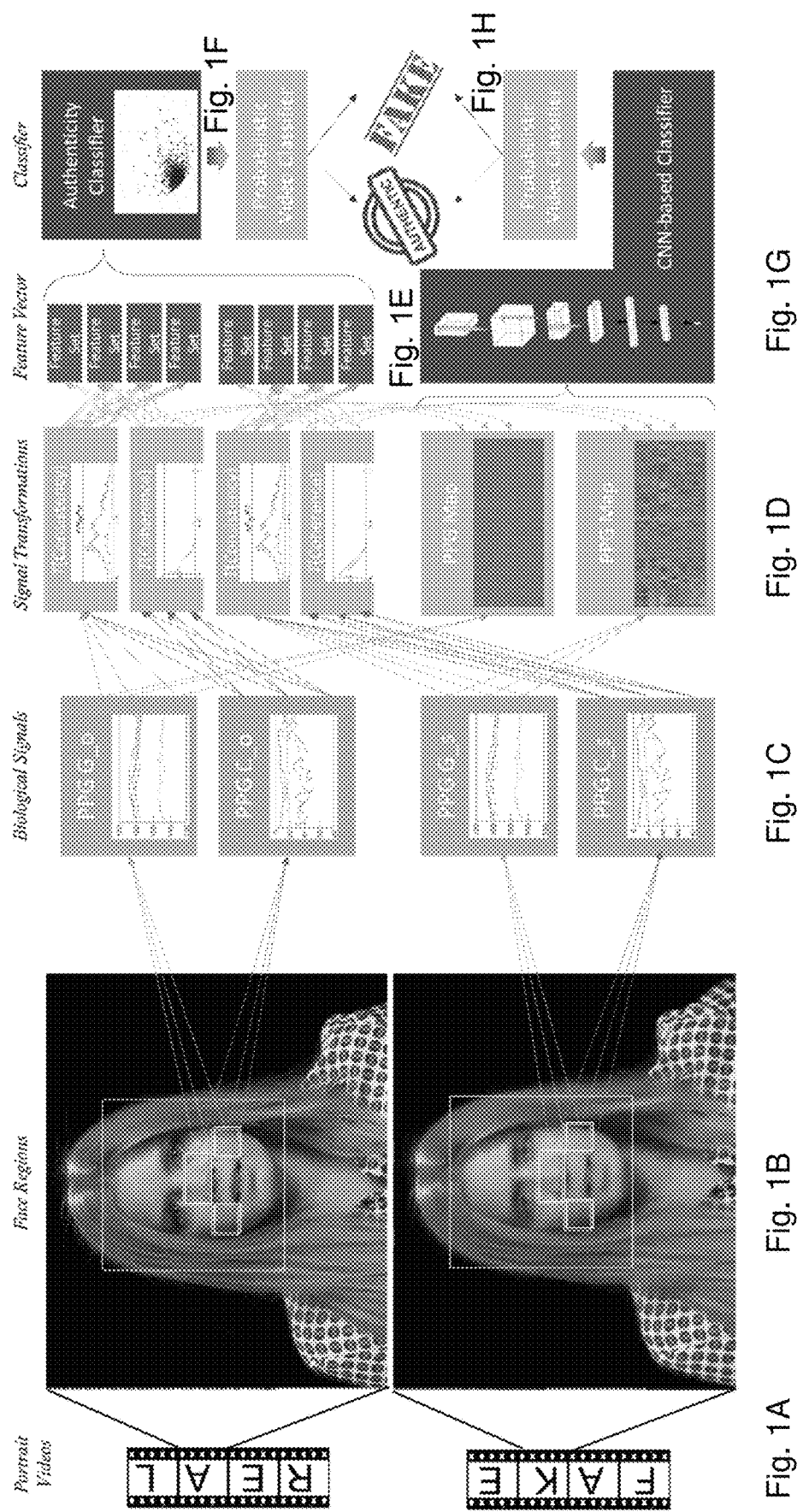

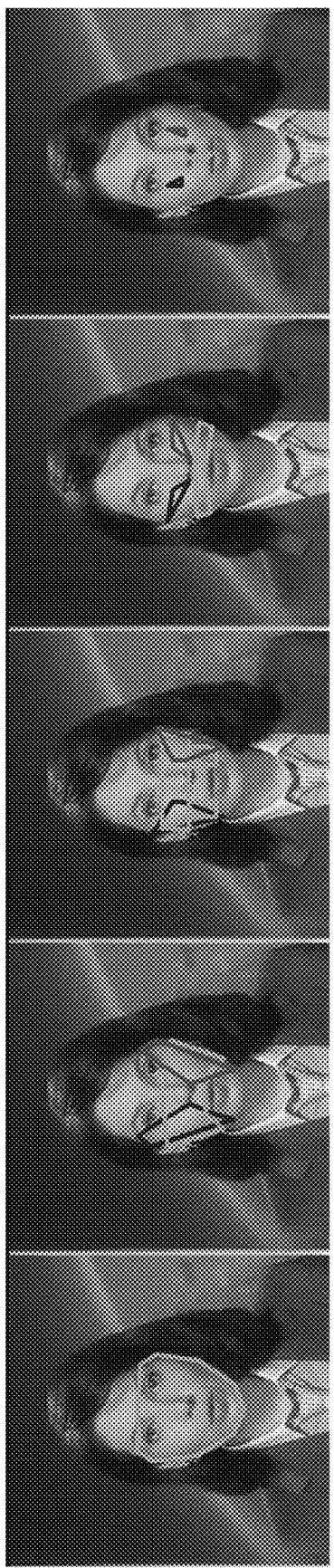
Fig. 8A  Fig. 8B  Fig. 8C  Fig. 8D  Fig. 8E
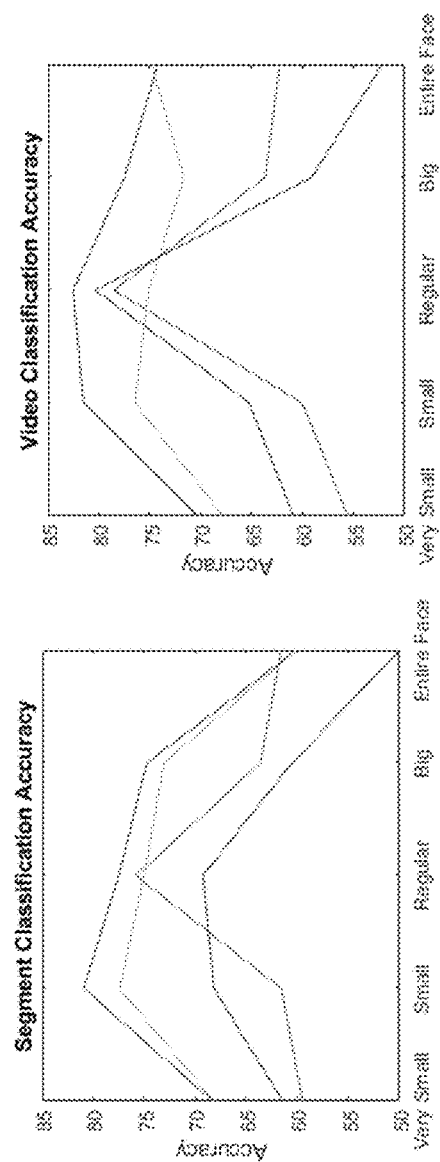
Fig. 9A
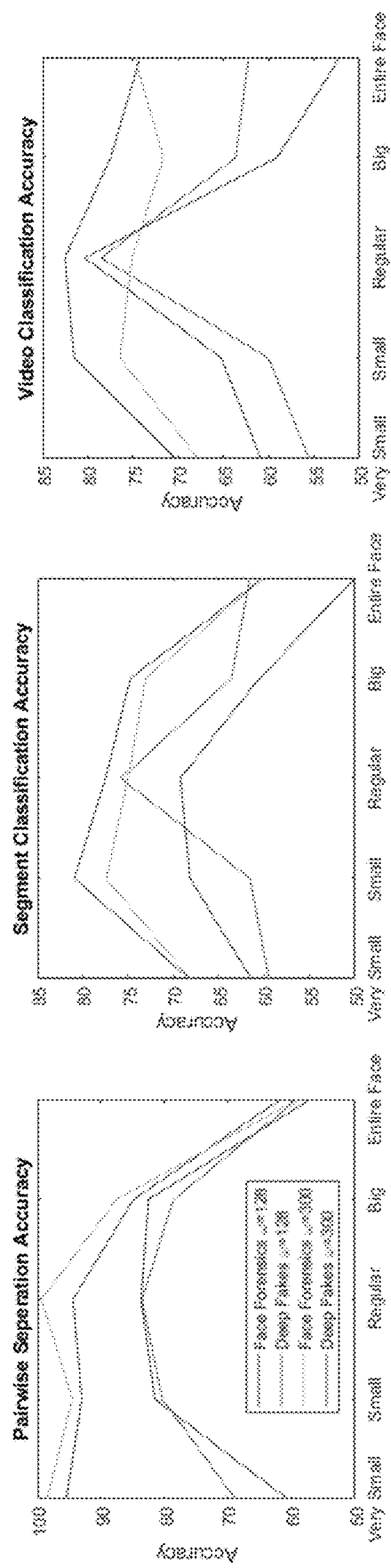
Fig. 9B
Fig. 9C

FAKECATCHER: DETECTION OF SYNTHETIC PORTRAIT VIDEOS USING BIOLOGICAL SIGNALS

CROSS REFERENCE TO RELATED APPLICATIONS

The present application is a non-provisional of, and claims benefit of priority from, U.S. Provisional Patent Application No. 62/957,775, filed Jan. 6, 2020, the entirety of which is expressly incorporated by reference.

1 BACKGROUND OF THE INVENTION

Each reference cited herein is expressly incorporated herein by reference in its entirety, as if fully set forth herein, for all purposes. It is in particular noted that the cited references are intended to supply further detail for the implementation of the technologies discussed, as well as the context, implementation, and related applications for the technologies disclosed herein. The present description should therefore be interpreted as extending the disclosures of the cited references consistent with the discussion herein, and therefore the scope of this disclosure is not limited to detection of deepfake video in the particular manner described, and is rather extended to the application of components of the present disclosure to augment the existing technologies.

Entering into the artificial intelligence (AI) era, the technological advancements in deep learning started to revolutionize the perspective on solving difficult problems in computer vision, robotics, and related areas. Common deep learning models for recognition, classification, and segmentation tasks tend to improve how machines perceive, learn, and analyze the world. In addition, the developments in generative models (i.e., [5], [6], [7], [8]) empower machines to increase the photorealism in the generated data and mimic the world more accurately. Even though it is easy to speculate dystopian scenarios based on both analysis and synthesis approaches, the latter brought the immediate threat on information integrity by disabling "natural detectors": humans cannot simply look at a video to determine its authenticity.

Following the recent initiatives for democratization of AI, generative models become increasingly popular and accessible. The widespread use of generative adversarial networks (GAN) is positively impacting some technologies: it is very easy to create personalized avatars [9], to produce animations [10], and to complete and stylize images [11]. Unfortunately, they are also used with malicious intent. The famous deep fake Obama video warning us about deep fakes going viral [12] may be the most innocent example, but there are far more devastating real-world examples which impact the society by introducing inauthentic content such as fake celebrity porn [13], political misinformation through fake news [14], and counterfeiting art using AI [15]. This lack of authenticity and increasing information obfuscation pose real threats to individuals, criminal system, and information integrity. Although there are recent purely deep learning approaches to detect fake content, those are limited by the specific generative model [20], dataset [2], people [21], or hand-crafted features [22]. In contrast, the present technology chooses to search for some natural priors in authentic content, instead of putting some assumptions on fake content.

Counterfeiting money may be considered as an analogy. Actual bills are stamped with an unknown process so that fake money cannot contain that special mark. That special mark is ought in authentic videos, which are already stamped by physics and biology of the real world, but generative models yet to replicate in image space because they "do not know" how the stamp works. As an example of such special marks, the chaotic order of the real world is found as an authenticity stamp by the study of Benes et al. [16]. As another example, Pan et al. [17] defend the same idea and propose integrating physics-based models for GANs to improve the realism of the generated samples. Biological signals (such as heart rate) have already been exploited for medical [18] and security purposes [19].

Even though GANs learn and generate photorealistic visual and geometric signals beyond the discriminative capabilities of human eyes, biological signals hidden by nature are still not easily replicable. Biological signals are also intuitive and complimentary ingredients of facial videos—which is the domain of deep fakes. Moreover, videos, as opposed to images, contain another layer of complexity to becloud fake synthesis: the consistency in the time dimension. Together with the signals' spatial coherence, temporal consistency is the key prior to detect authentic content. To complete this narrative, the approach exploits biological signals to detect fake content in portrait videos, independent of the source of creation.

Main features of the present technology include: formulations and experimental validations of signal transformations to exploit spatial coherence and temporal consistency of biological signals for both pairwise and general authenticity classification, a generalized and interpretable deep fake detector that operates in-the-wild, a novel biological signal map construction to train neural networks for authenticity classification, and a diverse dataset of portrait videos to create a test bed for fake content detection in the wild.

The system processes input videos (FIG. 1A) by collecting video segments with facial parts, defining regions of interests within each face (FIG. 1B), and extracting several biological signals (FIG. 1C) from those regions in those segments.

The pairwise separation problem is scrutinized where video pairs are given but the fake one is not known. A solution is formulated by examining the extracted biological signals, their transformations to different domains (time, frequency, time-frequency), and their correlations (FIG. 1D). The revelations from the pairwise context and interpretable feature extractors in the literature (FIG. 1E) are combined to develop a generalized authenticity classifier working in a high dimensional feature space (FIG. 1F). The signals are then transformed into novel signal maps of those segments to train a simple convolutional deep fake detector network (FIG. 1G). The class probabilities of segments are aggregated in a video into a binary "fake or authentic" decision (FIG. 1H).

To further evaluate FakeCatcher for in-the-wild scenarios, over 140 online videos were collected, totaling up to a "Deep Fakes" dataset of 30 GB. It is important to note that, unlike existing datasets, the dataset includes "in the wild" videos, independent of the generative model, resolution, compression, content, and context. The simple CNN achieves 91.07% accuracy for detecting inauthentic content on this dataset, and 96% accuracy on Face Forensics dataset (FF) [2], and 94.65% Face Forensics++(FF++) [3], outperforming all baseline architectures compared against. The effects of segment durations, facial regions, and dimensionality reduction techniques were analyzed on the feature sets, and on the mentioned datasets.

2 BACKGROUND INFORMATION

Relevant terminology and background information is provided below for better understanding of the concepts and techniques discussed herein.

2.1 Convolution

A Convolutional Neural Network is a class of artificial neural network that uses convolutional layers to filter inputs for useful information. The convolution operation involves combining input data (feature map) with a convolution kernel (filter) to form a transformed feature map. The filters in the convolutional layers (cony layers) are modified based on learned parameters to extract the most useful information for a specific task. Convolutional networks adjust automatically to find the best feature based on the task. The CNN would filter information about the shape of an object when confronted with a general object recognition task but would extract the color of the bird when faced with a bird recognition task. This is based on the CNN's understanding that different classes of objects have different shapes but that different types of birds are more likely to differ in color than in shape.

Convolution is an important concept in deep learning. A convolution is the mixing of information, and is defined mathematically. When employed in a neural network, instead of a fixed kernel matrix convolutional operator, parameters are assigned to kernels based on training on the data. As the convolutional net is trained, the kernel will get better and better at filtering a given image (or a given feature map) for relevant information. This is called feature learning. Feature learning automatically generalizes to each new task. Usually, single kernel is not learned in convolutional nets, and instead a hierarchy of multiple kernels is learned at the same time. For example a 32×16×16 kernel applied to a 256×256 image would produce 32 feature maps of size 241×241 (image size−kernel size+1). So automatically 32 new features are learned that have relevant information for the task in them. These features then provide the inputs for the next kernel which filters the inputs again. Once the hierarchical features are learned, they are passed to a fully connected, simple neural network that combines them in order to classify the input image into classes.

The convolution theorem, relates convolution in the time/space domain to a mere element-wise multiplication in the frequency/Fourier domain.

$$h(x) = f \otimes g = \int_{-\infty}^{\infty} f(x-u)g(u)du = \mathcal{F}^{-1}(\sqrt{2\pi}\,\mathcal{F}[f]\mathcal{F}[g]) \quad (\text{x})$$

$$\text{feature map} = \text{input} \otimes \text{kernel} =$$

$$\sum_{y=0}^{columns} \left( \sum_{x=0}^{rows} \text{input}(x-a, y-b)\text{kernel}(x, y) \right) =$$

$$\mathcal{F}^{-1}(\sqrt{2\pi}\,\mathcal{F}[\text{input}]\mathcal{F}[\text{kernel}])$$

The first equation is the one dimensional continuous convolution theorem of two general continuous functions; the second equation is the 2D discrete convolution theorem for discrete image data. Here ⊗ denotes a convolution operation, $\mathcal{F}$ denotes the Fourier transform, $\mathcal{F}$ the inverse Fourier transform, and $\sqrt{2\pi}$ is a normalization constant. Note that "discrete" here means that the data consists of a countable number of variables (pixels); and 1D means that the variables can be laid out in one dimension in a meaningful way, e.g., time is one dimensional (one second after the other), images are two dimensional (pixels have rows and columns), videos are three dimensional (pixels have rows and columns, and images come one after another).

2.2 Fast Fourier Transform

The fast Fourier transform is an algorithm that transforms data from the space/time domain into the frequency or Fourier domain. The Fourier transform describes the original function in a sum of wave-like cosine and sine terms. The Fourier transform is generally complex valued. If an original image is transformed with a Fourier transform and then multiplied it by a circle padded by zeros, in the Fourier domain, all high frequency values are filtered out (they will be set to zero, due to the zero padded values). The circle need not define a simple pattern, and rather may be a more complex convolution kernel.

A normalization may be applied that turns the convolution kernel into a probability density function. This is just like computing the softmax for output values in a classification tasks.

Convolution is closely related to cross-correlation:

$$\text{convoluted } x = f \otimes g = \int_{-\infty}^{\infty} f(x-u)g(u)du = F^{-1}(\sqrt{2\pi}f[f]F[g])$$

$$\text{cross-correlated } x = f \star g = \int_{-\infty}^{\infty} f(x-u)g(u)^* du = F^{-1}(\sqrt{2\pi}f[f](F[g])^*)$$

$$f(x) \in g(x) = f^*(-x) \lfloor g(x)$$

2.3 Support Vector Machines

In machine learning, support-vector machines (SVMs, also support-vector networks [89]) are supervised learning models with associated learning algorithms that analyze data for classification and regression analysis. SVMs are one of the most robust prediction methods, being based on statistical learning frameworks or VC theory. Given a set of training examples, each marked as belonging to one of two categories, an SVM training algorithm builds a model that assigns new examples to one category or the other, making it a non-probabilistic binary linear classifier (although methods such as Platt scaling exist to use SVM in a probabilistic classification setting). An SVM maps training examples to points in space so as to maximize the width of the gap between the two categories. New examples are then mapped into that same space and predicted to belong to a category based on which side of the gap they fall.

In addition to performing linear classification, SVMs can efficiently perform a non-linear classification using what is called the kernel trick, implicitly mapping their inputs into high-dimensional feature spaces. When data are unlabelled, supervised learning is not possible, and an unsupervised learning approach is required, which attempts to find natural clustering of the data to groups, and then map new data to these formed groups. The support-vector clustering algorithm, applies the statistics of support vectors, developed in the support vector machines algorithm, to categorize unlabeled data, and is one of the most widely used clustering algorithms in industrial applications.

A support-vector machine constructs a hyperplane or set of hyperplanes in a high- or infinite-dimensional space, which can be used for classification, regression, or other tasks like outliers detection. Intuitively, a good separation is achieved by the hyperplane that has the largest distance to the nearest training-data point of any class (so-called functional margin), since in general the larger the margin, the lower the generalization error of the classifier.

Whereas the original problem may be stated in a finite-dimensional space, it often happens that the sets to discriminate are not linearly separable in that space. For this reason, the original finite-dimensional space may be mapped into a much higher-dimensional space, presumably making the separation easier in that space. To keep the computational load reasonable, the mappings used by SVM schemes are often designed to ensure that dot products of pairs of input data vectors may be computed easily in terms of the variables in the original space, by defining them in terms of a kernel function k(x,y) selected to suit the problem. The with a vector in that space is constant, where such a set of vectors is an orthogonal (and thus minimal) set of vectors that defines a hyperplane. The vectors defining the hyperplanes can be chosen to be linear combinations with parameters of images of feature vectors that occur in the data base. With this choice of a hyperplane, the points x in the feature space that are mapped into the hyperplane are defined by the relation $\Sigma i\alpha_i k(x_i, x)$ constant, Note that if k(x,y) becomes small as y grows further away from x, each term in the sum measures the degree of closeness of the test point x to the corresponding data base point $x_i$. In this way, the sum of kernels above can be used to measure the relative nearness of each test point to the data points originating in one or the other of the sets to be discriminated. Note the fact that the set of points x mapped into any hyperplane can be quite convoluted as a result, allowing much more complex discrimination between sets that are not convex at all in the original space. See Support Vector Machine References.

A radial basis function (RBF) is a real-valued function $\varphi$ whose value depends only on the distance between the input and some fixed point, either the origin, so that $\varphi(x)=\varphi(\|x\|)$, or some other fixed point c, called a center, so that $\varphi(x)=\varphi(\|x-c\|)$. Any function $\varphi$ that satisfies the property $\varphi(x)=\varphi(\|x\|)$ is a radial function. The distance is usually Euclidean distance, although other metrics are sometimes used. They are often used as a collection $\{\varphi_k\}_k$ which forms a basis for some function space of interest, hence the name. See Radial Basis Function References.

Support Vector Machines (SVMs) are well known in classification problems. The use of SVMs in regression is known as Support Vector Regression (SVR). In most linear regression models, the objective is to minimize the sum of squared errors. Take Ordinary Least Squares (OLS) for example. Lasso, Ridge, and ElasticNet are all extensions of OLS, with an additional penalty parameter that aims to minimize complexity and/or reduce the number of features used in the final model. Regardless, the aim—as with many models—is to reduce the error of the test set. SVR gives us the flexibility to define how much error is acceptable in the model and will find an appropriate line (or hyperplane in higher dimensions) to fit the data. In contrast to OLS, the objective function of SVR is to minimize the coefficients—more specifically, the l2-norm of the coefficient vector—not the squared error. The error term is instead handled in the constraints, where the absolute error is set less than or equal to a specified margin, called the maximum error, $\epsilon$ (epsilon). Epsilon is tuned to gain the desired model accuracy.

2.4 Source Separation

Source separation, blind signal separation (BSS) or blind source separation, is the separation of a set of source signals from a set of mixed signals, without the aid of information (or with very little information) about the source signals or the mixing process. It is most commonly applied in digital signal processing and involves the analysis of mixtures of signals; the objective is to recover the original component signals from a mixture signal.

This problem is in general highly underdetermined, but useful solutions can be derived under a surprising variety of conditions. Blind signal separation is now routinely performed on multidimensional data, such as images and tensors.

The set of individual source signals, $s(t)=(s_1(t), \ldots, s_n(t))^T$, is 'mixed' using a matrix, $A=[a_{ij}] \in \mathbb{R}^{m \times n}$, to produce a set of 'mixed' signals, $x(t)=(x_1(t), \ldots, x_m(t))^T$ as follows. Usually, n is equal to m. If m>n, then the system of equations is overdetermined and thus can be unmixed using a conventional linear method. If n>m, the system is underdetermined and a non-linear method must be employed to recover the unmixed signals. The signals themselves can be multidimensional.

$$x(t)=A \cdot s(t) x(t)=A \cdot s(t)$$

The above equation is effectively 'inverted' as follows. Blind source separation separates the set of mixed signals, x(t), through the determination of an 'unmixing' matrix, $B=[B_{ij}] \in \mathbb{R}^{n \times m}$ to 'recover' an approximation of the original signals, $y(t)=(y_1(t), \ldots y_n(t))^T$, $$y(t)=B \cdot x(t) y(t)=B \cdot x(t).$$

See Signal Separation References.

Principal Component Analysis is a dimension reduction technique that has many useful applications in data analysis/statistics. Dimension reduction is achieved by forming new variables which are linear combinations of the variables in the original data set. These linear combinations are chosen to account for as much of the original variance-covariance/correlation structure in the original variables as possible. The new variables formed by these linear combinations are uncorrelated which is desirable property.

The $i^{th}$ principal component ($Y_i$) is a linear combination of the original of the p variables in the data set.

$$Y_i=a_{i1}X_1+a_{i2}X_2+\ldots+a_{ip}X_p i=1,\ldots,p$$

The coefficients ($a_{ij}$) are called the loadings for the $i^{th}$ principal component ($Y_i$). Interpretation of the loadings can be an important aspect of the PCA. First, important insights may be gained into how the original variables relate to one another from them. Also examining the loadings leads to an understanding what the scores (values) for the $i^{th}$ principal component ($Y_i$) are measuring. Much of the information can be captured in the original variables ($X_1, \ldots, X_p$) with a much smaller number of principal components ($Y_1, \ldots, Y_k$) where k<<p.

The principal components are particular linear combinations of the columns of a data matrix. Principal components depend solely on the variance/covariance matrix (or more generally on the correlation matrix) of the original p variables $X_1, X_2, \ldots, X_p$.

Consider the following linear combinations of X (the data matrix) that has variance/covariance matrix $\Sigma$ $$Y_1=a'_1 X=a_{11}X_1+a_{12}X_2+a_{13}X_3+\ldots+a_{1p}X_p$$

$$Y_2=a'_2 X=a_{21}X_1+a_{22}X_2+a_{23}X_3+\ldots+a_{2p}X_p$$

.

.

.

$$Y_p=a'_p X=a_{p1}X_1+a_{p2}X_2+a_{p3}X_3+\ldots+a_{pp}X_p$$

The variance/covariance term for each linear combination is given by $$\text{Var}(Y_1)=a'_1\Sigma a_1, \text{Var}(Y_2)=a'_2\Sigma a_2, \ldots, \text{Var}(Y_p)=a'_p\Sigma a_p$$

and $$\text{Cov}(Y_1,Y_2)=a'_1\Sigma a_2, \text{Cov}(Y_1,Y_3)=a'_1\Sigma a_2, \ldots, \text{Cov}(Y_1,Y_p)=a'_p\Sigma a_p$$

$$\text{Cov}(Y_2,Y_3)=a'_2\Sigma a_3, \ldots, \text{etc.}$$

etc.

The principal components are defined to be the uncorrelated linear combinations that achieve maximum variances for $\text{Var}(Y_1), \text{Var}(Y_2), \ldots, \text{Var}(Y_p)$. In particular, First Principal Component: The linear combination $a'_1X$ that maximizes $\text{Var}(a'_1X)$ subject to the constraint of $a'_1a_1=1$ Second Principal Component: The linear combination $a'_2X$ that maximizes $\text{Var}(a'_2X)$ subject to the constraint of $a'_2a_2=1$ AND $\text{Cov}(a'_1X, a'_2X)=0$ Third Principal Component: The linear combination $a'_3X$ that maximizes $\text{Var}(a'_3X)$ subject to the constraint of $a'_3a_3=1$ AND $\text{Cov}(a'_1X,a'_3X)=0$ AND $\text{Cov}(a'_2X,a'_3X)=0$ etc.

Let $\hat{\Sigma}$ be the sample variance/covariance matrix associated with X (the data matrix). Let $(\lambda_1,e_1), (\lambda_2,e_2) \ldots, (\lambda_p,e_p)$ be the eigenvalues/eigenvectors of $\Sigma$ where it is assumed $\lambda_1 \geq \lambda_2 \geq \ldots \geq \lambda_p \geq 0$, then the principal components are given by $$Y_1=e'_1 X \text{Var}(Y_1)=e'_1\hat{\Sigma}e_1=\lambda_1$$

$$Y_2=e'_2 X \text{Var}(Y_2)=e'_2\hat{\Sigma}e_2=\lambda_1$$

. .

. .

. .

$$Y_p=e'_p X \text{Var}(Y_p)=e'_p\hat{\Sigma}e_p=\lambda_p$$

and because the eigenvectors are orthogonal, the desired covariance result is obtained, namely $\text{Cov}(e'_jX, e'_kX)=0$ for all $j \neq k$. Also, if the variables are standardized, first then $\hat{\Sigma}=R$, the sample correlation matrix.

Let be the variance/covariance matrix associated with X (the data matrix) and let $(\lambda_1,e_1), (\lambda_2, e_2), \ldots (\lambda_p,e_p)$ be the eigenvalues/eigenvectors of $\Sigma$ where it is assumed $\lambda_1 \geq \lambda_2 \geq \ldots \geq \lambda_p \geq 0$.

$$\sum_{j=1}^{p} Var(X_j) = \sigma_{11} + \sigma_{22} + \ldots + \sigma_{22} = \lambda_1 + \lambda_2 + \ldots + \lambda_p$$

Result 2 implies that $\lambda_1$ can be interpreted as the contribution to the total variance that is due to the $1^{st}$ principal component (i.e. the linear combination of the original variables with maximal variance), $\lambda_2$ can be interpreted as the contribution to the total variance that is due to the $2^{nd}$ principal component, etc.

As seen above, the principal components can be derived by performing a spectral decomposition (i.e., eigenanalysis of the variance/covariance matrix or the correlation matrix). As an alternative, Singular Value Decomposition (SVD) may be considered.

Singular value decomposition will decompose a n×p data matrix X into a product of three matrices, X=UDV', where, U=n×n matrix containing the eigenvectors of XX'.

D=n×p matrix containing the singular values in a p×p submatrix.

The singular values are the square roots of the non-zero eigenvalues of XX'.

V=p×p matrix containing the eigenvectors of X'X.

Typically, the first few singular values are large relative to the rest. An approximation to the original matrix X may be achieved by retaining the k largest singular values and their corresponding eigenvectors contained in U & V (k<p). Alternatively, the SVD of X may be completed by finding completing the eigenanalysis of XX' & X'X and then using the results to form U, D, and V'.

SVD can be used to reduce the dimensionality of data set and examining the components (rows and columns) of the U and V matrices can help gain insight to underlying structure in the data matrix X.

Independent Component Analysis (ICA) is a multivariate statistical technique that seeks to uncover the hidden variables in high-dimensional data. As such, it belongs to what is called the latent variable class of models. A classic problem that Independent Component Analysis (ICA) can solve is the "Cocktail Party" problem where separate microphones record the ambient sound in at a cocktail party. Each microphone will pick up several different conversations and sounds in the room producing an audio stream with several different sound components combined. ICA will break apart the sound signals from each microphone into the independent underlying sound components. See Principal Component Analysis References In signal processing, independent component analysis (ICA) is a computational method for separating a multivariate signal into additive subcomponents. This is done by assuming that the subcomponents are non-Gaussian signals and that they are statistically independent from each other. ICA is a special case of blind source separation. See Independent Component Analysis References Linear discriminant analysis (LDA), normal discriminant analysis (NDA), or discriminant function analysis is a generalization of Fisher's linear discriminant, a method used in statistics and other fields, to find a linear combination of features that characterizes or separates two or more classes of objects or events. The resulting combination may be used as a linear classifier, or, more commonly, for dimensionality reduction before later classification. LDA is closely related to analysis of variance (ANOVA) and regression analysis, which also attempt to express one dependent variable as a linear combination of other features or measurements. However, ANOVA uses categorical independent variables and a continuous dependent variable, whereas discriminant analysis has continuous independent variables and a categorical dependent variable (i.e., the class label).

LDA is also closely related to principal component analysis (PCA) and factor analysis in that they both look for linear combinations of variables which best explain the data. LDA explicitly attempts to model the difference between the classes of data. PCA, in contrast, does not take into account any difference in class, and factor analysis builds the feature combinations based on differences rather than similarities. Discriminant analysis is also different from factor analysis in that it is not an interdependence technique: a distinction between independent variables and dependent variables (also called criterion variables) must be made. LDA works when the measurements made on independent variables for each observation are continuous quantities. When dealing with categorical independent variables, the equivalent technique is discriminant correspondence analysis. Discriminant analysis is used when groups are known a priori (unlike in cluster analysis). Each case must have a score on one or more quantitative predictor measures, and a score on a group measure. Discriminant function analysis is classification—the act of distributing things into groups, classes or categories of the same type.

Consider a set of observations $\vec{x}$ (also called features, attributes, variables or measurements) for each sample of an object or event with known class y. This set of samples is called the training set. The classification problem is then to find a good predictor for the class y of any sample of the same distribution (not necessarily from the training set) given only an observation $\vec{x}$. LDA approaches the problem by assuming that the conditional probability density functions $P(\vec{x}|y=0)$ and $p(\vec{x}|y=1)$ are both normally distributed with mean and covariance parameters ($\vec{\mu}_0, \Sigma_0$) and ($\mu_1, \Sigma_1$), respectively. Under this assumption, the Bayes optimal solution is to predict points as being from the second class if the log of the likelihood ratios is bigger than some threshold T, so that:

$$(\vec{x}-\vec{\mu}_0)^T\Sigma_0^{-1}(\vec{x}-\vec{\mu}_0)+\ln|\Sigma_0|-(\vec{x}-\vec{\mu}_1)-\ln|\Sigma_1|>T$$

Without any further assumptions, the resulting classifier is referred to as QDA (quadratic discriminant analysis). LDA instead makes the additional simplifying homoscedasticity assumption (i.e., that the class covariances are identical, so $\Sigma_0=\Sigma_1=\Sigma$ and that the covariances have full rank). In this case, several terms cancel:

$$\vec{x}^T\Sigma_0^{-1}\vec{x}=\vec{x}^T\Sigma_1^{-1}\vec{x}$$

$$\vec{x}^T\Sigma_i^{-1}\vec{\mu}_i=\vec{\mu}_i^T\Sigma_i^{-1}\vec{x}$$

because $\Sigma_i$ is Hermitian and the above decision criterion becomes a threshold on the dot product $\vec{w}\cdot\vec{x}<c$ for some threshold constant c, where $$\vec{w}=\Sigma^{-1}(\vec{\mu}_1-\vec{\mu}_0), c=\vec{w}\cdot\tfrac{1}{2}(\vec{\mu}_1+\vec{\mu}_0)$$

This means that the criterion of an input x being in a class y is purely a function of this linear combination of the known observations.

It is often useful to see this conclusion in geometrical terms: the criterion of an input being in a class y is purely a function of projection of multidimensional-space point x onto vector $\vec{w}$ (only its direction considered). In other words, the observation belongs to y if corresponding z is located on a certain side of a hyperplane perpendicular to $\vec{w}$. The location of the plane is defined by the threshold c.

Discriminant analysis works by creating one or more linear combinations of predictors, creating a new latent variable for each function. These functions are called discriminant functions. The number of functions possible is either $N_g-1$ where $N_g$=number of groups, or p (the number of predictors), whichever is smaller. The first function created maximizes the differences between groups on that function. The second function maximizes differences on that function, but also must not be correlated with the previous function. This continues with subsequent functions with the requirement that the new function not be correlated with any of the previous functions.

The terms Fisher's linear discriminant and LDA are often used interchangeably.

Suppose two classes of observations have means $\vec{\mu}_0, \vec{\mu}_1$ and covariances $\Sigma_0, \Sigma_1$. Then the linear combination of features $\vec{w}\cdot\vec{x}$ will have means $\vec{w}\cdot\vec{\mu}_i$ and variances $\vec{w}^T\Sigma_i\vec{w}$ for i=0, 1. Fisher defined the separation between these two distributions to be the ratio of the variance between the classes to the variance within the classes:

$$S=\sigma_{between}^2/\sigma_{within}^2=(\vec{w}\cdot(\vec{\mu}_1-\vec{w}\cdot\vec{\mu}_0)^2/\vec{w}^T\Sigma_1\vec{w}+\vec{w}^T\Sigma_0\vec{w}=(\vec{w}\cdot(\vec{\mu}_1-\vec{\mu}_0))^2/\vec{w}^T(\Sigma_0+\Sigma_1)\vec{w}$$

This measure is, in some sense, a measure of the signal-to-noise ratio for the class labelling. It can be shown that the maximum separation occurs when $$\vec{w}\propto(\Sigma_0+\Sigma_1)^{-1}(\vec{\mu}_1-\vec{\mu}_0)$$

When the assumptions of LDA are satisfied, the above equation is equivalent to LDA. The vector $\vec{w}$ is the normal to the discriminant hyperplane. As an example, in a two dimensional problem, the line that best divides the two groups is perpendicular to $\vec{w}$. Generally, the data points to be discriminated are projected onto $\vec{w}$; then the threshold that best separates the data is chosen from analysis of the one-dimensional distribution. There is no general rule for the threshold. However, if projections of points from both classes exhibit approximately the same distributions, a good choice would be the hyperplane between projections of the two means, $\vec{w}\cdot\mu_0$ and $\vec{w}\cdot\vec{\mu}_1$. In this case the parameter c in threshold condition $\vec{w}\cdot\vec{x}>c$ can be found explicitly:

$$c=\vec{w}\cdot\frac{1}{2}(\vec{\mu}_0+\vec{\mu}_1)=\frac{1}{2}\vec{\mu}_1^T\Sigma_1^{-1}\vec{\mu}_1-\frac{1}{2}\vec{\mu}_0^T\Sigma_0^{-1}\vec{\mu}_0$$

In the case where there are more than two classes, the analysis used in the derivation of the Fisher discriminant can be extended to find a subspace which appears to contain all of the class variability. Suppose that each of C classes has a mean $\mu_i$ and the same covariance $\Sigma$. Then the scatter between class variability may be defined by the sample covariance of the class means $$\sum_b = \frac{1}{C}\sum_{i=1}^{C}(\mu_i-\mu)(\mu_i-\mu)^T$$

where $\mu$ is the mean of the class means. The class separation in a direction $\vec{w}$ in this case will be given by $$S = \frac{\vec{w}^T\sum_b\vec{w}}{\vec{w}^T\sum\vec{w}}$$

This means that when $\vec{w}$ is an eigenvector of $\Sigma^{-1}\Sigma_b$, the separation will be equal to the corresponding eigenvalue. If $\Sigma^{-1}\Sigma_b$ is diagonalizable, the variability between features will be contained in the subspace spanned by the eigenvectors corresponding to the C−1 largest eigenvalues (since $\Sigma_b$ is of rank C−1 at most). These eigenvectors are primarily used in feature reduction, as in PCA. The eigenvectors corresponding to the smaller eigenvalues will tend to be very sensitive to the exact choice of training data, and it is often necessary to use regularization.

If classification is required, instead of dimension reduction, there are a number of alternative techniques available. For instance, the classes may be partitioned, and a standard Fisher discriminant or LDA used to classify each partition. A common example of this is "one against the rest" where the points from one class are put in one group, and everything else in the other, and then LDA applied. This will result in C classifiers, whose results are combined. Another common method is pairwise classification, where a new classifier is created for each pair of classes (giving C(C−1)/2 classifiers in total), with the individual classifiers combined to produce a final classification. See Linear Discriminant Analysis References.

Common spatial pattern (CSP) is a mathematical procedure used in signal processing for separating a multivariate signal into additive subcomponents which have maximum differences in variance between two windows. Let $X_1$ of size $(n, t_1)$ and $X_2$ of size $(n, t_2)$ be two windows of a multivariate signal, where n is the number of signals and $t_1$ and $t_2$ are the respective number of samples. The CSP algorithm determines the component $w^T$ such that the ratio of variance (or second-order moment) is maximized between the two windows:

$$w = \arg\max_w \|wX_1\|^2 / \|wX_2\|^2$$

The solution is given by computing the two covariance matrices:

$$R_1 = X_1 X_1^T / t_1, \quad R_2 = X_2 X_2^T / t_2$$

Then, the simultaneous diagonalization of those two matrices (also called generalized eigenvalue decomposition) is realized. The matrix of eigenvectors $P = [p_1 \ldots p_n]$ is found and the diagonal matrix D of eigenvalues $\{\lambda_1, \ldots, \lambda_n\}$ sorted by decreasing order such that: $P^T R_1 P = D$ and $P^T R_2 P = I_n$, with $I_n$ the identity matrix. This is equivalent to the eigendecomposition of $R_2^{-1} R_1$: $R_2^{-1} R$, $= w^T$ will correspond to the first column of P: $w = p_1^T$ The eigenvectors composing P are components with variance ratio between the two windows equal to their corresponding eigenvalue:

$$\lambda_i \leq \|P_i^T X_1\|^2 / \|p_i^T X_2\|^2$$

The vectorial subspace $E_1$ generated by the i first eigenvectors $[p_1 \ldots p_i]$ will be the subspace maximizing the variance ratio of all components belonging to it:

$$E_i = \arg\max_E (\min_{p \in E} \|p^T X_1\|^2 / \|p^T X_2\|^2)$$

In the same way, the vectorial subspace $F_j$ generated by the j last eigenvectors $[p_{n-j+1} \ldots p_n]$ will be the subspace minimizing the variance ratio of all components belonging to it:

$$F_j = \arg\max_F (\max_{p \in F} \|p^T X_1\|^2 / \|p^T X_2\|^2)$$

CSP can be applied after a mean subtraction (a.k.a. "mean centering") on signals in order to realize a variance ratio optimization. Otherwise CSP optimizes the ratio of second-order moment. See Common Spatial Pattern References.

2.5 Deep Learning

Deep learning (also known as deep structured learning) is part of a broader family of machine learning methods based on artificial neural networks with representation learning. Learning can be supervised, semi-supervised or unsupervised. Deep-learning architectures such as deep neural networks, deep belief networks, recurrent neural networks and convolutional neural networks have been applied to fields including computer vision, machine vision, speech recognition, natural language processing, audio recognition, social network filtering, machine translation, bioinformatics, drug design, medical image analysis, material inspection and board game programs, where they have produced results comparable to and in some cases surpassing human expert performance. The adjective "deep" in deep learning comes from the use of multiple hidden layers in the network. Early work showed that a linear perceptron cannot be a universal classifier, and then that a network with a nonpolynomial activation function with one hidden layer of unbounded width can on the other hand so be. Deep learning is a modern variation which is concerned with an unbounded number of layers of bounded size, which permits practical application and optimized implementation, while retaining theoretical universality under mild conditions. In deep learning the layers are also permitted to be heterogeneous and to deviate widely from biologically informed connectionist models, for the sake of efficiency, trainability and understandability, whence the "structured" part. See Deep Learning References.

2.6 Convolutional Neural Network

Convolutional networks are composed of an input layer, an output layer, and one or more hidden layers. A convolutional network is different than a regular neural network in that the neurons in its layers are arranged in three dimensions (width, height, and depth dimensions). This allows the CNN to transform an input volume in three dimensions to an output volume. The hidden layers are a combination of convolution layers, pooling layers, normalization layers, and fully connected layers. CNNs use multiple cony layers to filter input volumes to greater levels of abstraction. The CNN may also be extended into an arbitrary number of dimensions, i.e., 3D plus time.

CNNs improve their detection capability for unusually placed objects by using pooling layers for limited translation and rotation invariance. Pooling also allows for the usage of more convolutional layers by reducing memory consumption. Normalization layers are used to normalize over local input regions by moving all inputs in a layer towards a mean of zero and variance of one. Other regularization techniques such as batch normalization, where activations for the entire batch, or dropout, are normalized, where randomly chosen neurons are ignored during the training process, can also be used. Fully-connected layers have neurons that are functionally similar to convolutional layers (compute dot products) but are different in that they are connected to all activations in the previous layer.

An activation function in a neural network applies a non-linear transformation on weighted input data. A popular activation function for CNNs is ReLU or rectified linear function which zeros out negative inputs and is represented as output=max(0, weighted$_d$ata). The rectified linear function speeds up training while not compromising significantly on accuracy.

Inception modules in CNNs allow for deeper and larger cony layers while also speeding up computation. This is done by using 1×1 convolutions with small feature map size, for example, 192 28×28 sized feature maps can be reduced to 64 28×28 feature maps through 64 1×1 convolutions. Because of the reduced size, these 1×1 convolutions can be followed up with larger convolutions of size 3×3 and 5×5. In addition to 1×1 convolution, max pooling may also be used to reduce dimensionality. In the output of an inception module, all the large convolutions are concatenated into a big feature map which is then fed into the next layer (or inception module).

Pooling is a procedure that reduces the input over a certain area to a single value (subsampling). In convolutional neural networks, this concentration of information provides similar information to outgoing connections with reduced memory consumption. Pooling provides basic invariance to rotations and translations and improves the object detection capability of convolutional networks. For example, the face on an image patch that is not in the center of the image but slightly translated, can still be detected by the convolutional filters because the information is funneled into the right place by the pooling operation. The larger the size of the pooling area, the more information is condensed, which leads to slim networks that fit more easily into GPU memory. However, if the pooling area is too large, too much information is thrown away and predictive performance decreases.

Like multi-layer perceptrons and recurrent neural networks, convolutional neural networks can also be trained using gradient-based optimization techniques. Stochastic, batch, or mini-batch gradient descent algorithms can be used to optimize the parameters of the neural network. Once the CNN has been trained, it can be then used for inference to accurately predict outputs for a given input.

Deep learning frameworks allow researchers to create and explore Convolutional Neural Networks (CNNs) and other Deep Neural Networks (DNNs) easily, while delivering the high speed needed for both experiments and industrial deployment. The deep learning frameworks run faster on GPUs and scale across multiple GPUs within a single node. A GPU provides a single-instruction-multiple data (SIMD) multiprocessor which achieves efficiency by sharing instruction decoding across a plurality of arithmetic logic units (ALUs), and therefore is efficient where the same instructions are executed concurrently on multiple data entries.

Neural networks may be trained by back propagation of errors, which is a statistical optimization technique to minimize the error in the output over the training data.

Let $\delta(l+1)$ be the error term for the $(l+1)$-st layer in the network with a cost function $(W,b;x,y)$ here $(W,b)$ are the parameters and $(x,y)$ are the training data and label pairs. If the l-th layer is densely connected to the $(l+1)$-st layer, then the error for the l-th layer is computed as $$\delta^{(l)} = ((W^{(l)})^T \delta^{(l+1)}) \cdot f'(z^{(l)})$$

and the gradients are $$\nabla_{W^{(l)}} J(W,b;x,y) = \delta^{(l+1)}(a^{(l)})^T,$$

$$\nabla_{b^{(l)}} J(W,b;x,y) = \delta^{(l+1)}.$$

If the l-th layer is a convolutional and subsampling layer then the error is propagated through as $$\delta_k^{(l)} = \text{upsample}((W_k^{(l)})^T \delta_k^{(l+1)}) \cdot f'(z_k^{(l)})$$

Where k indexes the filter number and f $f'(z_k^{(l)})$ is the derivative of the activation function. The upsample operation has to propagate the error through the pooling layer by calculating the error w.r.t to each unit incoming to the pooling layer. For example, if case of mean pooling, then upsample simply uniformly distributes the error for a single pooling unit among the units which feed into it in the previous layer. In max pooling the unit which was chosen as the max receives all the error since very small changes in input would perturb the result only through that unit.

Finally, to calculate the gradient w.r.t to the filter maps, the border handling convolution operation is relied on again and flip the error matrix $\delta_k^{(l)}$ the same way the filters are flipped in the convolutional layer.

$$\nabla_{W_k^{(l)}} J(W,b;x,y) = \sum_{i=1}^{m} (a_i^{(l)}) * rot90(\delta_k^{(l+1)}, 2),$$

$$\nabla_{b_k^{(l)}} J(W,b;x,y) = \sum_{a,b} (\delta_k^{(l+1)})_{a,b}.$$

Where $a^{(l)}$ is the input to the l-th layer, and $a^{(l)}$ is the input image. The operation $(a_i(l) * \delta_k^{(l+1)})$ is the "valid" convolution between i-th input in the l-th layer and the error w.r.t. the k-th filter.

See, Deep Learning References.

2.7 Generative Adversarial Network

A generative adversarial network (GAN) is a class of machine learning frameworks designed by Ian Goodfellow and his colleagues in 2014. Two neural networks contest with each other in a game (in the form of a zero-sum game, where one agent's gain is another agent's loss).

Given a training set, this technique learns to generate new data with the same statistics as the training set. For example, a GAN trained on photographs can generate new photographs that look at least superficially authentic to human observers, having many realistic characteristics. Though originally proposed as a form of generative model for unsupervised learning, GANs have also proven useful for semi-supervised learning, fully supervised learning, and reinforcement learning. The core idea of a GAN is based on the "indirect" training through the discriminator, which itself is also being updated dynamically. This basically means that the generator is not trained to minimize the distance to a specific image, but rather to fool the discriminator. This enables the model to learn in an unsupervised manner.

The generative network generates candidates while the discriminative network evaluates them. The contest operates in terms of data distributions. Typically, the generative network learns to map from a latent space to a data distribution of interest, while the discriminative network distinguishes candidates produced by the generator from the true data distribution. The generative network's training objective is to increase the error rate of the discriminative network (i.e., "fool" the discriminator network by producing novel candidates that the discriminator thinks are not synthesized (are part of the true data distribution)).

A known dataset serves as the initial training data for the discriminator. Training it involves presenting it with samples from the training dataset, until it achieves acceptable accuracy. The generator trains based on whether it succeeds in fooling the discriminator. Typically, the generator is seeded with randomized input that is sampled from a predefined latent space (e.g. a multivariate normal distribution). Thereafter, candidates synthesized by the generator are evaluated by the discriminator. Independent backpropagation procedures are applied to both networks so that the generator produces better images, while the discriminator becomes more skilled at flagging synthetic images. The generator is typically a deconvolutional neural network, and the discriminator is a convolutional neural network.

Bidirectional GAN (BiGAN) aims to introduce a generator model to act as the discriminator, whereby the discriminator naturally considers the entire translation space so that the inadequate training problem can be alleviated. To satisfy this property, generator and discriminator are both designed to model the joint probability of sentence pairs, with the difference that, the generator decomposes the joint probability with a source language model and a source-to-target translation model, while the discriminator is formulated as a target language model and a target-to-source translation model. To further leverage the symmetry of them, an auxiliary GAN is introduced and adopts generator and discriminator models of original one as its own discriminator and generator respectively. Two GANs are alternately trained to update the parameters. The resulting learned feature representation is useful for auxiliary supervised discrimination tasks, competitive with contemporary approaches to unsupervised and self-supervised feature learning.

2.8 Variational AutoEncoders

Variational Autoencoders (VAEs) may be used to design complex generative models of data, and fit them to large datasets. Variational autoencoders (VAEs) were defined in 2013 by Kingma et al (2013) and Rezende et al. (2014). In neural net language, a variational autoencoder consists of an encoder, a decoder, and a loss function.

The encoder is a neural network. Its input is a datapoint x, its output is a hidden representation z, and it has weights and biases θ. The encoder 'encodes' the data from a high dimensional space into a latent (hidden) representation space z, which is lower dimensionality. This is typically referred to as a 'bottleneck' because the encoder must learn an efficient compression of the data into this lower-dimensional space. The decoder is another neural net. Its input is the representation z, it outputs the parameters to the probability distribution of the data, and has weights and biases φ. The loss function of the variational autoencoder is the negative log-likelihood with a regularizer. Because there are no global representations that are shared by all datapoints, the loss function can be decomposed into only terms that depend on a single datapoint. This allows us to use stochastic gradient descent with respect to the parameters A.

Variational Autoencoder (VAE): in neural net language, a VAE consists of an encoder, a decoder, and a loss function. In probability model terms, the variational autoencoder refers to approximate inference in a latent Gaussian model where the approximate posterior and model likelihood are parametrized by neural nets (the inference and generative networks).

Loss function: in neural net language, consider loss functions. Training means minimizing these loss functions. But in variational inference, the ELBO is maximized (which is not a loss function). This leads to awkwardness like calling optimizer.minimize(-elbo) as optimizers in neural net frameworks only support minimization.

Encoder: in the neural net world, the encoder is a neural network that outputs a representation z of data x. In probability model terms, the inference network parametrizes the approximate posterior of the latent variables z. The inference network outputs parameters to the distribution q(z|x).

Decoder: in deep learning, the decoder is a neural net that learns to reconstruct the data x given a representation z. In terms of probability models, the likelihood of the data xx given latent variables z is parametrized by a generative network. The generative network outputs parameters to the likelihood distribution p(x|z).

Local latent variables: these are the $z_i$ for each datapoint $x_i$. There are no global latent variables. Because there are only local latent variables, the ELBO can be easily decomposed into terms $\mathcal{L}$ that depend only on a single datapoint $x_i$. This enables stochastic gradient descent.

Inference: in neural nets, inference usually means prediction of latent representations given new, never-before-seen datapoints. In probability models, inference refers to inferring the values of latent variables given observed data.

Mean-field variational inference refers to a choice of a variational distribution that factorizes across the NN data points, with no shared parameters:

$$q(z) = \prod_i^N q(z_i; \lambda_i)$$

This means there are free parameters for each datapoint $\lambda_i = (\mu_i; \sigma_i)$ for Gaussian latent variables). ELBO is maximized for each new datapoint, with respect to its mean-field parameter(s) $\lambda_i$.

Amortized inference refers to 'amortizing' the cost of inference across datapoints. One way to do this is by sharing (amortizing) the variational parameters A across datapoints. For example, in the variational autoencoder, the parameters 0 of the inference network. These global parameters are shared across all datapoints. To see what the approximate posterior $q(z_i)$ of a new datapoint looks like, a variational inference can be run again (maximizing the ELBO until convergence), or the shared parameters trusted as being 'good-enough'. This can be an advantage over mean-field.

3. SUMMARY OF THE INVENTION

The recent proliferation of fake portrait videos poses direct threats on society, law, and privacy [1]. Believing the fake video of a politician, distributing fake pornographic content of celebrities, fabricating impersonated fake videos as evidence in courts are just a few real-world consequences of deep fakes. Fakecatcher, a novel approach to detect synthetic content in portrait videos is provided, as a preventive solution for the emerging threat of deep fakes. In other words, the present technology provides a deep fake detector. Detectors blindly utilizing deep learning are not effective in catching fake content, as generative models produce formidably realistic results. Biological signals hidden in portrait videos can be used as an implicit descriptor of authenticity, because they are neither spatially nor temporally preserved in fake content. Several signal transformations are formulated and engaged for the pairwise separation problem, achieving 99.39% accuracy. Those findings were used to formulate a generalized classifier for fake content, by analyzing proposed signal transformations and corresponding feature sets. Signal maps are generated, and a CNN is employed to improve on a traditional classifier for detecting synthetic content. FakeCatcher was evaluated on several datasets, resulting with 96%, 94.65%, 91.50%, and 91.07% accuracies, on Face Forensics [2], Face Forensics++[3], CelebDF [4], and on a new Deep Fakes Dataset respectively. In addition, FakeCatcher produces a significantly superior detection rate against baselines, and does not depend on the source generator, or properties of the fake content. Signals from various facial regions are analyzed, under image distortions, with varying segment durations, from different generators, against unseen datasets, and using several dimensionality reduction techniques.

Traditionally, image spoofing and forgery has been an important topic in forensics and security, with corresponding pixel and frequency analysis solutions to detect visual artifacts [23]. These methods, in addition to early deep generative models, were able to create some inauthentic content. However, results were easily classified as fake or real by humans, as opposed to deep fakes.

3.1. GAN Empowerment

Following GANs proposed by Goodfellow et al. [5], deep learning models have been advancing in generative tasks for inpainting [24], translation [7], and editing [25]. Inherently, all generative approaches suffer from the control over generation. In the context of GANs, this problem is mostly explored by Variational Autoencoders (VAE) [26] and Conditional GANs [27] to control the generation by putting constraints in the latent space. In addition to the improvements in controlling GANs, other approaches improved training efficiency, accuracy, and realism of GANs by deep convolutions [6], Wasserstein distances [28], least squares [29], and progressive growing [30]. It is arguable that these developments, in addition to the availability of such models, seeded the authenticity problem.

3.2. Synthetic Faces

Since Viola-Jones [31], computer vision community treasures the domain of facial images and videos as one of the primary application areas. Therefore, numerous applications and explorations of GANs emerged for face completion [11], facial attribute manipulation [32], [33], [34], frontal view synthesis [35], facial-reenactment [36], [37], [38], identity-preserving synthesis [39], and expression editing [40]. In particular, advancements in generative power, realism, and efficiency of VAEs and GANs for facial reenactment and video synthesis resulted in the emergence of the "deep fake" concept, which is replacing the face of a target person with another face in a given video, as seamless as possible. The exact approach is not published, however the deep fake generator is assumed to consist of two autoencoders trained on source and target videos: Keeping the encoder weights similar, so that general features can be embedded in the encoder and face-specific features can be integrated by the decoder. Another approach, Face2Face [37], reconstructs a target face from a video and then warps it with the blend shapes obtained by the source video in real-time. Deep Video Portraits [36] and vid2vid [8] follow this approach and employ GANs instead of blend shapes. Overall, the results are realistic, but there are still skipped frames and face misalignments due to illumination, occlusion, compression, and sudden motions.

3.3. Image Forensics

In par with the increasing number of inauthentic facial images and videos, methods for detecting such have also been proposed. Those are mostly based on finding inconsistencies in images, such as detecting distortions [41], finding compression artifacts [42], and assessing image quality [43]. However, for synthetic images in this context, the noise and distortions are harder to detect due to the non-linearity and complexity of the learning process [44].

There exist two different strategies to tackle this problem, (i) pure deep learning-based approaches that act as a detector of a specific generative model [20], [45], [46], [47], [48], [49], [50], and (ii) semantic approaches that evaluate the generated faces' realism [22], [51], [52]. These are summarized in Table 1. The methods in the first branch investigate the color and noise distributions of specific networks [53], [54], [55] or specific people [21], or train CNNs blindly for synthetic images [20], [45], [50]. However, they are unfit to be accepted as general synthetic portrait video detection mechanisms, as they rely heavily on detecting artifacts inherent to specific models. Semantic approaches, on the other hand, utilize inconsistencies in the biological domain, such as facial attributes [51], [56], mouth movement inconsistency [52], and blink detection [22]. The motivation follows the second stream, however real signals are explored instead of physical attributes. Thus, the input is continuous, complex, and stable; making the system embrace both perspectives.

3.4. Biological Signals

The remote extraction of biological signals roots back to the medical community to explore less invasive methods for patient monitoring. Observing subtle changes of color and motion in RGB videos [65], [66] enable methods such as color based remote photoplethysmography (rPPG or iPPG) [67], [68] and head motion based ballistocardiogram (BCD) [69]. Photoplethysmography (PPG) is a focus, as it is more robust against dynamically changing scenes and actors, while BCD cannot be extracted if the actor is not still (i.e., sleeping). Several approaches proposed improvements over the quality of the extracted PPG signal and towards the robustness of the extraction process. The variations in proposed improvements include using chrominance features [70], green channel components [71], optical properties [72], Kalman filters [73], and different facial areas [67], [71], [72], [74].

All of these PPG variations contain valuable information in the context of fake videos. In addition, inter-consistency of PPG signals from various locations on a face is higher in real videos than those in synthetic ones. Multiple signals also help us regularize environmental effects (illumination, occlusion, motion, etc.) for robustness. Thus, a combination of G channel-based PPG (or G-PPG, or G*) [71] is used, where the PPG signal is extracted only from the green color channel of an RGB image (which is robust against compression artifacts); and chrominance-based PPG (or C-PPG, or C*) [70] which is robust against illumination artifacts. Thus, a combination of aforementioned biological signals is employed, as described in more detail below.

3.5. Deep Fake Collections

As the data dependency of GANs increases, their generative power increases, so detection methods' need for generated samples increases. Such datasets are also essential for the evaluation of novel methodologies. Based on the release date and the generative methods, there are two generations of datasets which significantly differ in size and source.

The first generation includes (i) UADFV [56], which contains 49 real and 49 fake videos generated using Fake-App [75]; (ii) DFTIMIT [64], which includes 620 deep fake videos from 32 subjects using Faceswap-GAN [76]; and (iii) Face Forensics [2] (FF) which has original and synthetic video pairs with the same content and actor, and another compilation of original and synthetic videos, all of which are created using the same generative model [37]. The train/validation/test subsets of FF are given as 704 (70%), 150 (15%) and 150 (15%) real/fake video pairs respectively.

The second generation aims to increase the generative model diversity while also increasing the dataset size. Face Forensics++[3] (FF++) dataset employs 1,000 real YouTube videos and generates the same number of synthetic videos with four generative models, namely Face2Face [37], Deepfakes [57], FaceSwap [59] and Neural Textures [77]. Google/Jigsaw dataset [78] contains 3068 synthetic videos based on 363 originals of 28 individuals using an unrevealed method. Lastly, Celeb-DF [4] dataset consists of 590 real and 5639 synthetic videos of 59 celebrities, generated by swapping faces using [57]. The dataset has class imbalance, which results in side effects in some results.

For the present experiments, analysis, and evaluation, two datasets from each generation were employed; namely UADFV, FF, FF++, and Celeb-DF, in addition to the Deep Fakes Dataset described herein.

4. BIOLOGICAL SIGNAL ANALYSIS ON FAKE AND AUTHENTIC VIDEO PAIRS

The following six signals $S=\{G_L, G_R, G_M, C_L, C_R, C_M\}$ are employed that are combinations of G-PPG [71] and C-PPG [70] on the left cheek, right cheek [72], and mid-region [74]. Each signal is named with channel and face region in subscript.

FIG. 2C shows biological signals: Green (top) and chrom-PPG (middle) extracted from left (L red), middle (M green), and right (R blue) regions; heart rates (bottom); and sample frames of original (left) and synthetic (right) videos. FIGS. 2A and 2B demonstrate those signals extracted from a real (FIG. 2A)-fake (FIG. 2B) video pair, where each signal is color-coded with the facial region it is extracted from. Signal and transformation notations are declared in Table 2 and transformations in Table 3.

In order to understand the nature of biological signals in the context of synthetic content, signal responses in original ($PPG_o$) and synthetic ($PPG_s$) video pairs are first compared using traditional signal processing methods: log scale (L), Butterworth filter [79] (H), power spectral density (P), and combinations (FIGS. 4A and 4B). Signals (top) and their derivatives (bottom) are compared and that distinction formulated (i.e., fourth column shows contrasting structure for their power spectra). Here, the preservation of spatial coherence and temporal consistency is observed in authentic videos, and an error metric that encapsulates these findings in a generalized classifier is desired. This analysis also sets ground for understanding generative systems in terms of biological replicability.

4.1. Statistical Features

FIGS. 3A and 3B show pairwise analysis. Example original and synthetic signal pair CMo and CMs, their derivatives δCM, power spectral densities P (L(CM)), discrete cosine transforms X(CM), cross correlation φ(CM, CL)), and cross power spectral density Ap(SC) (FIG. 3A). Histograms of mean differences of these values for all pairs in the dataset (FIG. 3B). These features are aggregating the whole segment signals into single values that are not representative enough.

FIGS. 4A and 4B show characteristics of raw biological signals (top), same analysis on derivative of signals (bottom), from original (blue) and synthetic (orange) video pairs.

The first task is set as the pairwise separation problem: Given pairs of fake and authentic videos without their labels, can biological signals be taken advantage of for labeling these videos? 150 pairs are used in the test subset of Face Forensics [2] as a base, splitting each video into ω-length windows (the value for co is extensively analyzed below). The analysis starts by comparing simple statistical properties such as mean(μ), standard deviation(σ), and min-max ranges of Gm and CM from original and synthetic video pairs. The values of simple statistical properties between fake and real videos are observed, and selected the optimal threshold as the valley in the histogram of these values (FIGS. 3A and 3B, first row). By simply thresholding, an initial accuracy of 65% is observed for this pairwise separation task. Then, influenced by the signal behavior (FIGS. 4A and 4B), another histogram of these metrics is formulated on all absolute values of differences between consecutive frames for each segment (i.e., $\mu(G_M(t_n)G_M(t_{n+1}))$), achieving 75.69% accuracy again by finding a cut in the histogram (FIGS. 3A and 3B, second row). Although histograms of the implicit formulation per temporal segment is informative, a generalized detector can benefit from multiple signals, multiple facial areas, multiple frames in a more complex space. Instead of reducing all of this information to a single number, exploring the feature space of these signals can yield a more comprehensive descriptor for authenticity.

4.2. Power Spectra

In addition to analyzing signals in time domain, their behavior is investigated in frequency domain. Thresholding their power spectrum density (P (S)) in linear and log scales results in an accuracy of 79.33% (similar to FIGS. 3A and 3B, third row) using the following formula:

$$\mu_P(G_{Lo})+\sigma_P(G_{Lo})-(\mu_P(G_{Ls})+\sigma_P(G_{Ls})) \quad (1)$$

where the definition of P can be found in Table 3 and $G_L$ can be found in Table 2, and subscripts denote $G_L o$ for original and $G_L s$ for synthetic. Discrete cosine transforms (DCT) (X) of the log of these signals are investigated. Including DC and first three AC components, 77.41% accuracy is obtained.

The accuracy is improved to 91.33% by using only zero-frequency (DC value) of X.

4.3. Spatio-temporal Analysis

Combining the previous discussions, some analysis is also run for the coherence of biological signals within each segment. For robustness against illumination, alternation between $C_L$ and $C_M$ (Table 2), and computing cross-correlation of their power spectral density as $\varphi(P(C_M), P(C_L))$ is employed. Comparing their maximum values gives 94.57% and mean values gives 97.28% accuracy for pairwise separation. This result is improved by first computing power spectral densities in log scale $\varphi(L(P(C_M)), L(P(C_L)))$ (98.79%), and even further by computing cross power spectral densities $\rho(A_p(L(S_Co))-A_p(L(S_Cs)))$ (99.39%). The fourth row in FIGS. 3A and 3B demonstrate that difference, where 99.39% of the pairs have an authentic video with more spatio-temporally coherent biological signals. This final formulation results in an accuracy of 95.06% on the entire Face Forensic dataset (train, test, and validation sets), and 83.55% on the Deep Fakes dataset.

5. GENERALIZED CONTENT CLASSIFIER

The metric to separate pairs of original and synthetic videos with an accuracy of 99.39% is promising to formulate the inconsistency into a generalized binary classifier. In the pairwise setting, comparison of aggregate spatiotemporal features are representative enough. However, as these signals are continuous and noisy, there is no universal hard limit to robustly classify such content. To build a generalized classifier, several signal transformations in time and frequency domains (as defined in Table 3) to explore the artifacts of synthetic content towards characteristic feature sets (Table 4). FIG. 13 shows video classification, and in particular an SVM-based classifier flowchart.

5.1. Feature Sets

Several features to be extracted from the signals are declared in Table 3. Due to the fact that rPPG is mostly evaluated by the accuracy in heart rate, other features used in image authenticity [44], classification of Electroencephalography (EEG) signals [85], [87], statistical analysis [82], [83], [86], and emotion recognition [80], [87]. These feature sets are enumerated in Table 4 together with the reference papers for biological signal classification.

5.2. Authenticity Classification Following the motivation to understand biological signals in the context of fake content, interpretable features with no assumption on the fake content are sought. This is the key that leads us to employ SVMs with an RBF kernel [89] for this binary classification task, instead of a DNN. Many experiments were conducted by training an SVM using feature vectors extracted from the training set, and then report the accuracy of that SVM on the test set. All of these experiments are denoted with F*(T(S)) where F* is the feature extractor from Table 4 applied to (transformed) signal T(S) from Table 3. Both signal transformation and feature extraction can be applied to all elements of the inner set.

For exploration, all subsets of Face Forensics (FF) dataset [2] were combined, and the combined set randomly split to train (1540 samples, 60%) and test sets (1054 samples, 40%). Feature vectors were created with maximum and mean ($F_1$) of cross power spectral densities of $SC(A_p(S_C))$ for all videos in the train set, as it was the feature with the highest accuracy. Unlike pairwise results, SVM accuracy with $f=F_1(A_p(S_C))$ is low (68.93%) but this sets a baseline for next steps. Next, classification by $f=\mu_{P(S)}$ (six features per sample) achieving 68.88% accuracy, and by $f=\mu_{Ap(DC)}\cup\mu_{A(S)}$ (9 features) achieving 69.63% accuracy was performed on the entire FF dataset. Table 5 lists 7 of 70 experiments done using a combination of features. These chronologically higher results indicate the driving points of experimentation, each of these led to either pursuit of a feature set, or to leave it out completely. The other 63 experiments, both on FF dataset and the Deep Fakes dataset, are listed below.

Based on the experiments, a conclusion was formed that "authenticity" (i) is observed both in time and frequency domains, (ii) is highly sensitive to small changes in motion, illumination, and compression if a single signal source is used, and (iii) can be discovered from coherence and consistency of multiple biological signals. The conclusion is inferred that (i) from high classification results when $A(.)$, $\hat{A}(.)$, and $F_4$ in time domain is used in conjunction with $P(.)$, $A_p(.)$, and $F_3$ in frequency domain; (ii) from low true negative numbers when only S is used instead of $D_C$ or D, or only using $F_5$ or $F_6$, and (iii) from high accuracies when $D_C$, $\varphi(.)$ $A_p(.)$ and $F_1$ is used to correlate multiple signals (Table 5). The system is expected to be independent of any generative model, compression/transmission artifact, and content-related influence: a robust and generalized Fake-Catcher, based on the essence of temporal consistency and spatial coherence of biological signals in authentic videos. The experimental results conclude on the following implicit formulation, $$f=F_1(\log(D_C))\cup$$

$$F_3(\log(S)\cup A_p(D_C))\cup$$

$$F_4(\log(S)\cup A_p(D_C))\cup$$

$$\mu\hat{A}(S)\cup\max(\hat{A}(S))$$

where 126 features were gathered combining $F_1$, $F_3$, $F_4$ sets, on log transforms, pairwise cross spectral densities, and spectral autocorrelations, of single source S and multi-source Dc signals. The SVM classifier trained with these 126 features on the FF dataset results in 75% accuracy. The same experiment was performed on the Deep Fakes dataset (with a 60/40 split) obtaining an accuracy of 76.78%.

5.3. Probabilistic Video Classification

As mentioned above, the videos are split into co-interval segments for authenticity classification. Considering that the end goal is to classify videos, the segment labels were aggregated into video labels by majority voting. Majority voting increases the segment classification accuracy of 75% to 78.18% video classification accuracy within Face Forensics dataset, hinting that some hard failure segments can be neglected due to significant motion or illumination changes. Consequently, a weighted voting scheme compensates the effect of these erroneous frames. In order to achieve that, the class confidences are needed instead of discrete class labels, thus SVM is converted to a support vector regression (SVR). Instead of a class prediction of SVM, SVR allowed learning the probability of a given segment to be real or synthetic. The expectation of the probabilities as the true threshold was used to classify authenticity. Also, if there is a tie in majority voting, it was weighed towards the expectation. Using the probabilistic video classification, the video classification accuracy was increased to 82.55% in Face Forensics and to 80.35% in Deep Fakes dataset.

5.4. CNN-Based Classification

In investigating the failure cases of the probabilistic authenticity classifier, the misclassification rate of marking real segments as synthetic segments (false positive, FP) is determined to be higher than the misclassification rate of marking synthetic segments as real segments (false negative, FN). The samples ending up as false positives contain artifacts that corrupt PPG signals, such as camera movement, motion and uneven illumination. In order to improve the resiliency against such artifacts, the coherence of signals can be exploited by increasing the number of regions of interests (ROIs) within a face. Coherence is hypothesized to be observed stronger in real videos, as artifacts tend to be localized into specific regions in the face. However, packing more signals will exponentially grow the already complex feature space for the authenticity classifier. Therefore, a CNN-based classifier is employed, which is more suitable for a higher-dimensional segment classification task. FIG. 5 shows a CNN Architecture, with three convolutional layers with max pooling, followed by dense layers. FIG. 14 shows video classification, and in particular a CNN-based classifier flowchart.

5.4.1. PPG Maps $C_M$ signals are extracted from the mid-region of faces, as it is robust against non-planar rotations. To generate same size subregions, the non-rectangular ROI is mapped into a rectangular one using Delaunay Triangulation [90], therefore each pixel in the actual ROI (each data point for $C_M$) corresponds to the same pixel in the generated rectangular image. The rectangular image is divided into 32 same size sub-regions. For each of these sub-regions, $C_M=\{C_M0, \ldots, C_M\omega\}$ is calculated, and normalized to [0, 255] interval. These values are combined for each sub-region within $\omega$ frame window into an $\omega\times32$ image, called PPG map, where each row holds one sub-region and each column holds one frame. Example real and synthetic PPG maps are shown in FIG. 6, in the first two rows. PPG signals per sub-region per frame are converted into 128×32 images for five synthetic (top) and original (bottom) segments.

5.4.2. Learning Authenticity

A simple three-layer convolutional network with pooling layers in between and two dense connections at the end (FIG. 5) are used. ReLU activations are used except the last layer, which is a sigmoid to output binary labels. A dropout is added before the last layer to prevent overfitting. No data augmentation is performed, and PPG maps are fed directly. The model achieves 88.97% segment and 90.66% video classification accuracy when trained on FF train set and tested on the FF test set with $\omega=128$. Similarly, the model obtains 80.41% segment and 82.69% video classification accuracy when trained on the Deep Fakes Dataset with a random split of 60/40.

5.4.3. Spectral PPG Maps

The frequency domain also holds important consistency information for detecting authentic content. Thus, the PPG maps are enhanced with the addition of encoding binned power spectral densities $P(C_M)=\{P(C_M)_0, \ldots, P(C_M)_{107}\}$ from each sub-region, creating $\omega \times 64$ size images. Examples of the real and synthetic spectral PPG maps are shown in the last two rows of FIG. 6. This attempt to exploit temporal consistency improves the accuracy for segment and video classification to 94.26% and 96% in Face Forensics, and 87.42% and 91.07% in Deep Fakes Dataset. Further classification results on different datasets are reported in Tables 15 and 10, such as 91.50% on Celeb-DF, 94.65% on FF++, and 97.36% on UADFV.

6. OBJECTS OF THE INVENTION

It is therefore an object of the invention to provide a method of analyzing a portrait video for indicia of synthetic origin, comprising: receiving video information; determining a spatial coherence and temporal consistency of biological signals of a subject of the portrait represented in the video information; and producing an output dependent on the determined spatial and temporal consistency.

The determining may be performed with a synthetic video classifier, which is preferably a neural network, and more preferably a convolutional neural network.

It is also an object to provide a method of increasing a perceived authenticity of a portrait video, comprising: receiving video information; determining biological signals of the subject of the video; modifying the biological signals to increase spatial coherence and temporal consistency; and outputting the video information having the modified biological signals.

It is a further object to provide a method of analyzing a video comprising exposed skin for indicia of synthetic origin, comprising: receiving the video; determining a spatial coherence and temporal consistency of biological signals represented in the video of the skin; and producing an output dependent on the determined spatial and temporal consistency.

The determining may be performed with a synthetic video classifier The synthetic video classifier may comprise a convolutional neural network.

The video may comprise color images, further comprising extracting the biological signals using photoplethysmography. The spatial coherence may be is responsive differences in cyclic cardiac cycles over regions of the skin. The skin may comprise a human face.

The method may further comprise performing pattern recognition of the video to identify a region of the skin, and tracking movement of the region of the skin over time, wherein the spatial coherence is normalized for the position of the region of the skin.

The determining may be performed by a convolutional neural network trained with synthetic video training examples. The determining may be performed by a convolutional neural network trained with natural video training examples and corresponding synthetically modified natural video training examples, to detect synthetically modified natural video within a set of unclassified video.

The method may further comprise extracting a feature vector from at least biological signals in the video, and classifying the video dependent on the feature vector with a probabilistic video classifier.

It is also an object to provide a method of increasing a realism of a portrait video, comprising: receiving video information; determining biological signals of the subject of the video; modifying the biological signals to increase spatial coherence and temporal consistency; and outputting the video information having the modified biological signals.

The determining may be performed with a synthetic video classifier comprising a convolutional neural network. The determining may also be performed with a synthetic video classifier comprising a support vector network.

The video may comprise color images, the method further comprising extracting the biological signals using photoplethysmography, wherein the modifying increases the spatial and temporal consistency of photoplethysmography signals from regions of exposed skin in the video. The skin may comprise a human face. In order to increase the spatial and temporal consistency of photoplethysmography signals, at least two options are available; first, generating a deepfake with an underlying cardiovascular model, such that the synthesis is biologically accurate in that regard, and second, inverting the detector and detection technology as described herein, to reduce the spatiotemporal indicia of fake origin below a statistical detection threshold, which may be performed without a cardiovascular model per se.

The method may further comprise performing pattern recognition of the video to identify a region of the skin; tracking movement of the region of the skin over time; determining the spatial and temporal coherence of the skin normalized for the position of the region of the skin; and said modifying comprising synthesizing a pattern of normalized spatial and temporal coherence of the skin to correspond to a natural spatial and temporal coherence of the skin.

The method may further comprise extracting a feature vector from the video, and classifying the video dependent on the feature vector with a probabilistic video classifier.

It is also an object to provide a non-transitory computer readable medium storing instructions for controlling a programmable processor to analyze a received video comprising exposed skin for indicia of synthetic origin, comprising: instructions for determining a spatial coherence and temporal consistency of biological signals represented in the video of the skin; and instructions for producing an output dependent on the determined spatial and temporal consistency of the biological signals. The instructions for determining may comprise: instructions for extracting a feature vector from the video comprising biological signal features; instructions for classifying the feature vector; and instructions for implementing a convolutional neutral network trained to distinguish between video modified with synthetic elements corresponding to exposed skin and natural video of exposed skin. The instructions for determining comprise extracting the biological signals from the video using photoplethysmography.

It is a further object to provide a system for of analyzing a video comprising exposed skin for indicia of synthetic origin, comprising: an input port configured to receive the video; at least one automated processor responsive to a spatial coherence and temporal consistency of biological signals represented in the video of the skin, configured to extract a feature vector from the video comprising biological signals; classify the feature vector; and determine a likelihood of synthetic origin with a probabilistic video classifier; and an output port configured to communicate a signal selectively responsive to a probability of synthetic origin of the video, dependent on the determined spatial and temporal consistency.

The probabilistic video classifier may comprise a convolutional neural network.

The video may comprise color images, and the at least one automated processor is configured to comprising the feature vector comprising the biological signals by photoplethysmography.

The video of the skin may comprise an image of a live human face, and the photoplethysmography may be performed on facial skin.

The at least one automated processor may be further configured to perform pattern recognition of the video to identify a region of the skin, and to determine the spatial and temporal coherence of the skin dependent on the pattern recognition.

7. BRIEF DESCRIPTION OF THE DRAWINGS

FIGS. 1A-1E show a schematic overview of a preferred embodiment of a process according to the present invention, in which biological signals (FIG. 1C) are extracted from facial regions (FIG. 1B) on authentic and fake portrait video pairs (FIG. 1A). Transformations are applied to compute spatial coherence and temporal consistency (FIG. 1D), capture signal characteristics in feature sets and PPG maps (FIG. 1E), and train a probabilistic SVM and a CNN (FIGS. 1F and 1G). Then, authenticity probabilities are aggregated to decide whether the video is fake or authentic (FIG. 1H).

FIGS. 2A-2C show a comparison of biological signals from original and synthetic video pairs. FIG. 2A shows a sample frame of the original video. FIG. 2B shows a sample frame of the synthetic video. FIG. 2C shows Green PPG (top) and chrom-PPG (middle) extracted from left (L red), middle (M green), and right (R blue) regions, and heart rates (bottom).

FIGS. 3A and 3B show a pairwise analysis, in which FIG. 3A shows original and synthetic signal pair CMo and CMs, their derivatives δCM, power spectral densities P (L(CM)), discrete cosine transforms X(CM), cross correlation φ(CM, CL)), and cross power spectral density Ap(SC). Histograms of mean differences of these values for all pairs in the dataset (right).

FIGS. 8A-8E show region of interest (ROI) Contours, which may be whole face (FIG. 8A), big ROI (FIG. 8B), default (FIG. 8C), small ROI (FIG. 8D), and few pixels (FIG. 8E), for $G_L$ and $C_L$ (blue), for GM and CM (green), and for GR and CR (red).

FIGS. 9A-9C show an ROI Comparison, with Pairwise separation (FIG. 9A), segment (FIG. 9B), and video (FIG. 9C) classification accuracy per several ROIs, on FF and DF datasets.

Figures 11A, 11B, 11C:
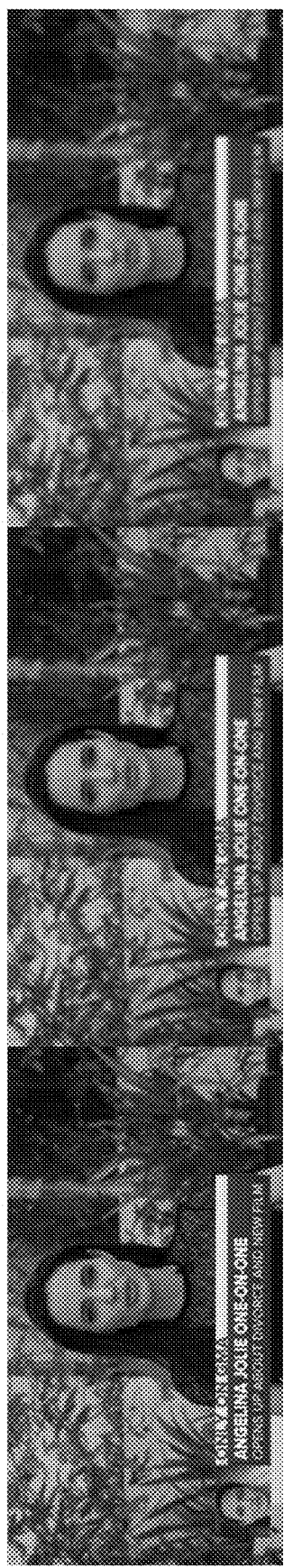

FIGS. 11A-11C demonstrate robustness, for the original (FIG. 11A) and blurred images with 7×7 (FIG. 11B) and 11×11 (FIG. 11C) kernels.

Figures 12A, 12B, 12C:
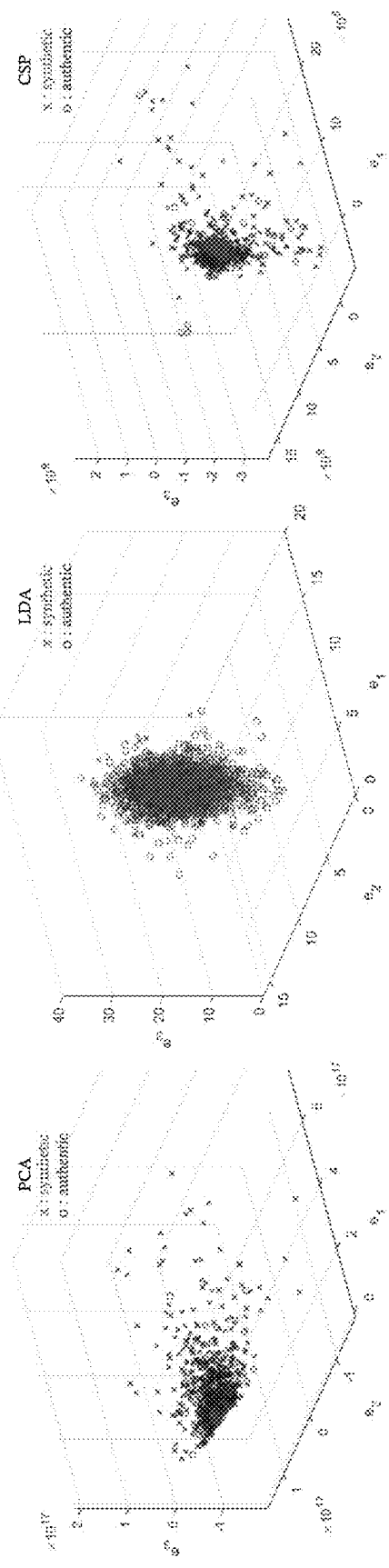

FIGS. 12A-12C shows the feature space, with original (red) and synthetic (blue) samples in three dominant component space, extracted using PCA (FIG. 12A), LDA (FIG. 12B), and CSP (FIG. 12C).

Figure 13:
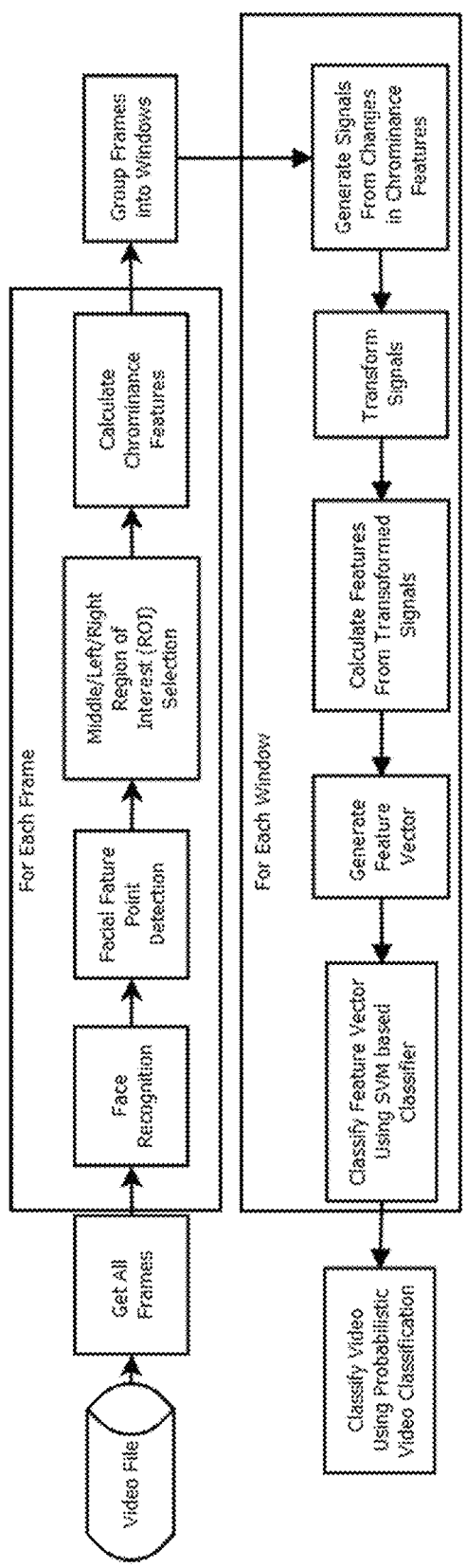

FIG. 13 shows a schematic representation of a video classification process, with an SVM-based classifier flowchart.

Figure 14:
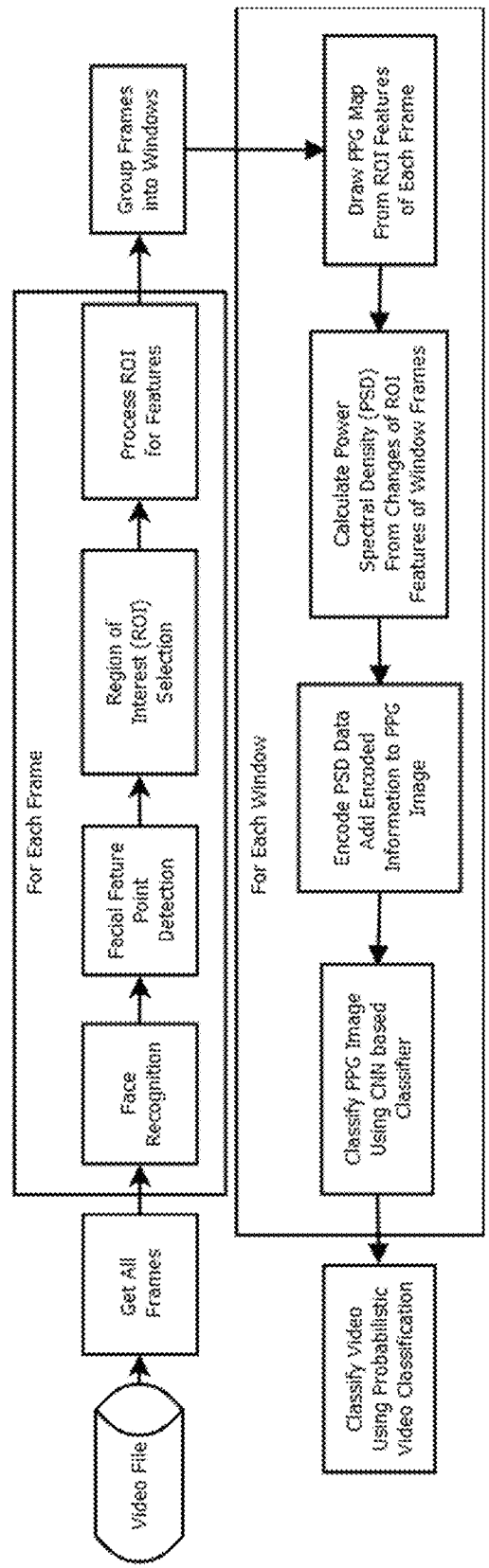

FIG. 14 shows a schematic representation of a video classification process, with an CNN-based classifier flowchart.

Figure 15:
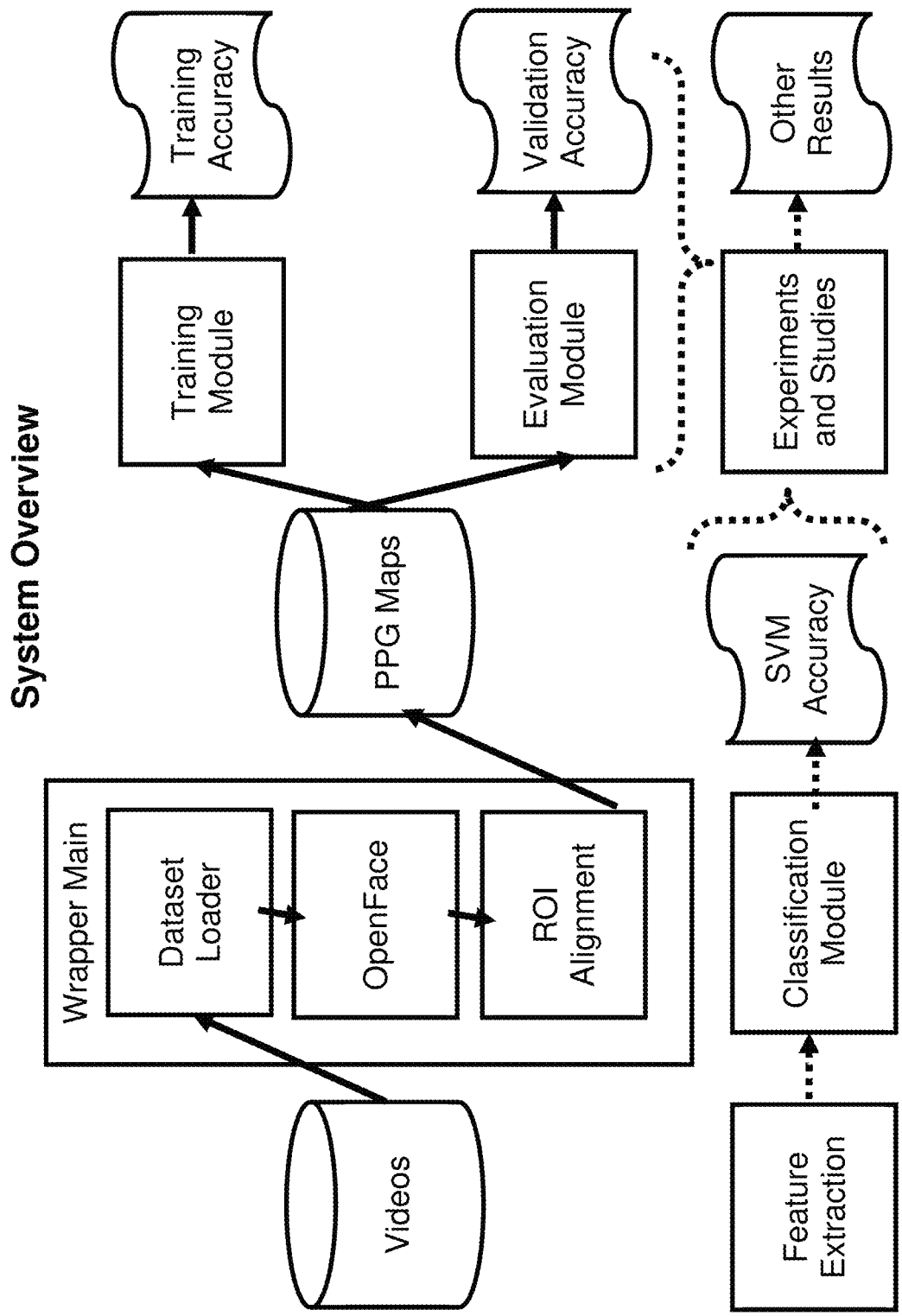

FIG. 15 shows a schematic system overview of a system according to the present invention.

8. DETAILED DESCRIPTION OF THE PREFERRED EMBODIMENTS

In recent years, technology development of deep learning has advanced to the level of high realism in creating synthetic videos. Such deep fake videos posted a big threat to video authentication for security, safety, privacy protection, as well as health-care safety. A novel approach is presented to detect synthetic content in portrait videos, as a preventive solution for the emerging threat of deep fakes.

Biological signals (e.g., vital sign heart rate) hidden in portrait videos can be used as an implicit descriptor of authenticity, because they are neither spatially nor temporally preserved in fake content. Signal transformation is used to formulate a generalized classifier for fake content, by analyzing those signals and corresponding feature sets. Then, novel signal maps are generated and a CNN employed to improve the traditional classifier for detecting synthetic content.

The system utilizes Matlab [91] for signal processing, Open Face library [92] for face detection, libSVM [93] for the classification experiments, Wavelab [94] for Wavelet transformation and $F_5$ feature set, and Keras [95] for network implementations.

8.1. Deep Fakes Dataset

The external datasets employed are explained above. Although FF is a clean dataset perfect for initial experiments, the generalizability of the findings need be assessed. For this purpose, a new database (so-called Deep Fakes Dataset (DF)) was created, which is a set of portrait videos collected "in the wild". The videos in the dataset are diverse real-world samples in terms of the source generative model, resolution, compression, illumination, aspect-ratio, frame rate, motion, pose, cosmetics, occlusion, content, and context, as it originates from various sources such as media sources, news articles, and research presentations; totaling up to 142 videos, 32 minutes, and 30 GBs. For each synthetic video, the original counterpart was searched for, if it is not presented with its source. For example, if a synthetic video is generated from a movie, the real movie was found and cropped the corresponding segment. When the source could not be located, a similar video was included to preserve the class balance (i.e., for a given fake award speech, a similar (in size, location, and length) original award speech was included). This variation does not only increase the diversity of the synthetic samples, but it also makes the dataset more challenging by breaking possible real-fake associations.

Figure 2A:
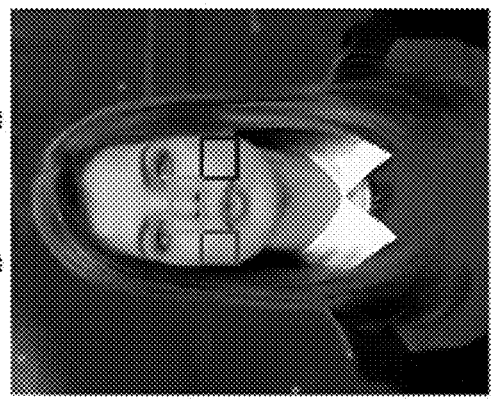
Figure 2B:
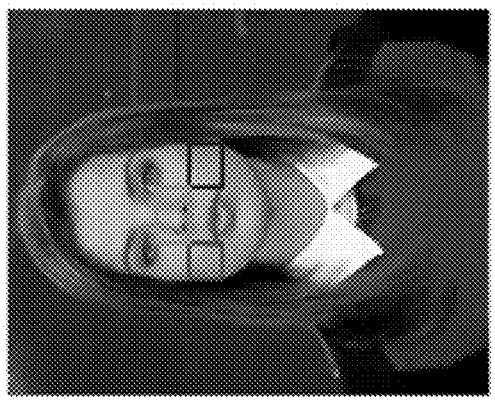
Figure 2C:
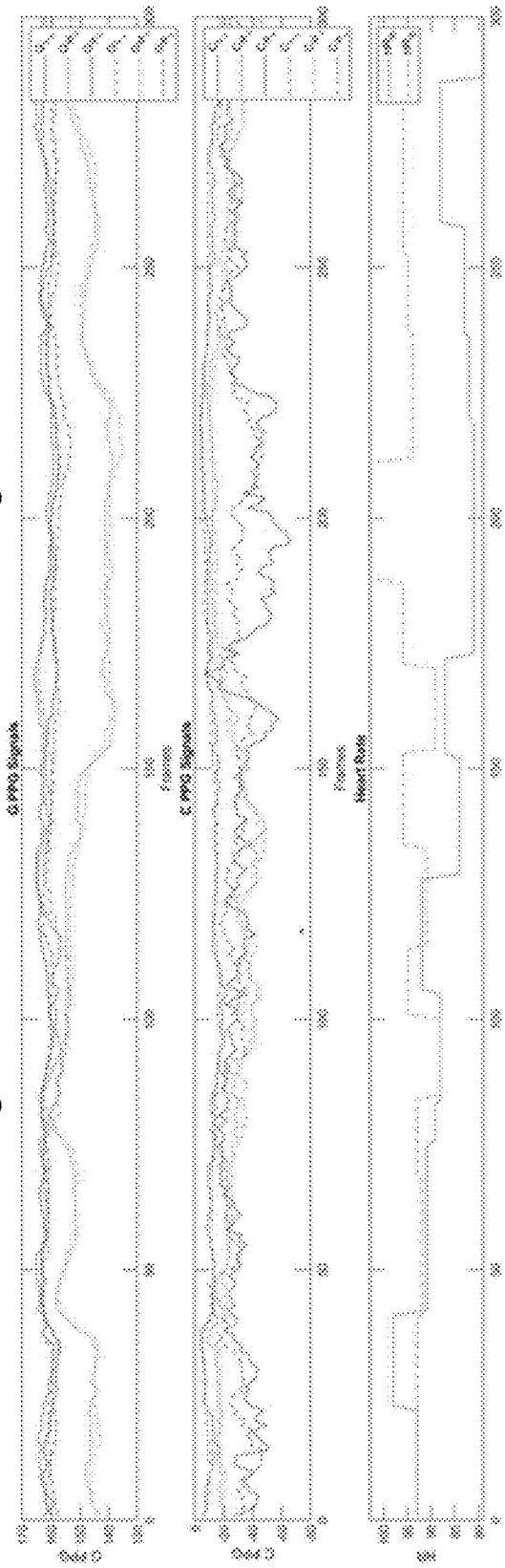
Figure 3A:
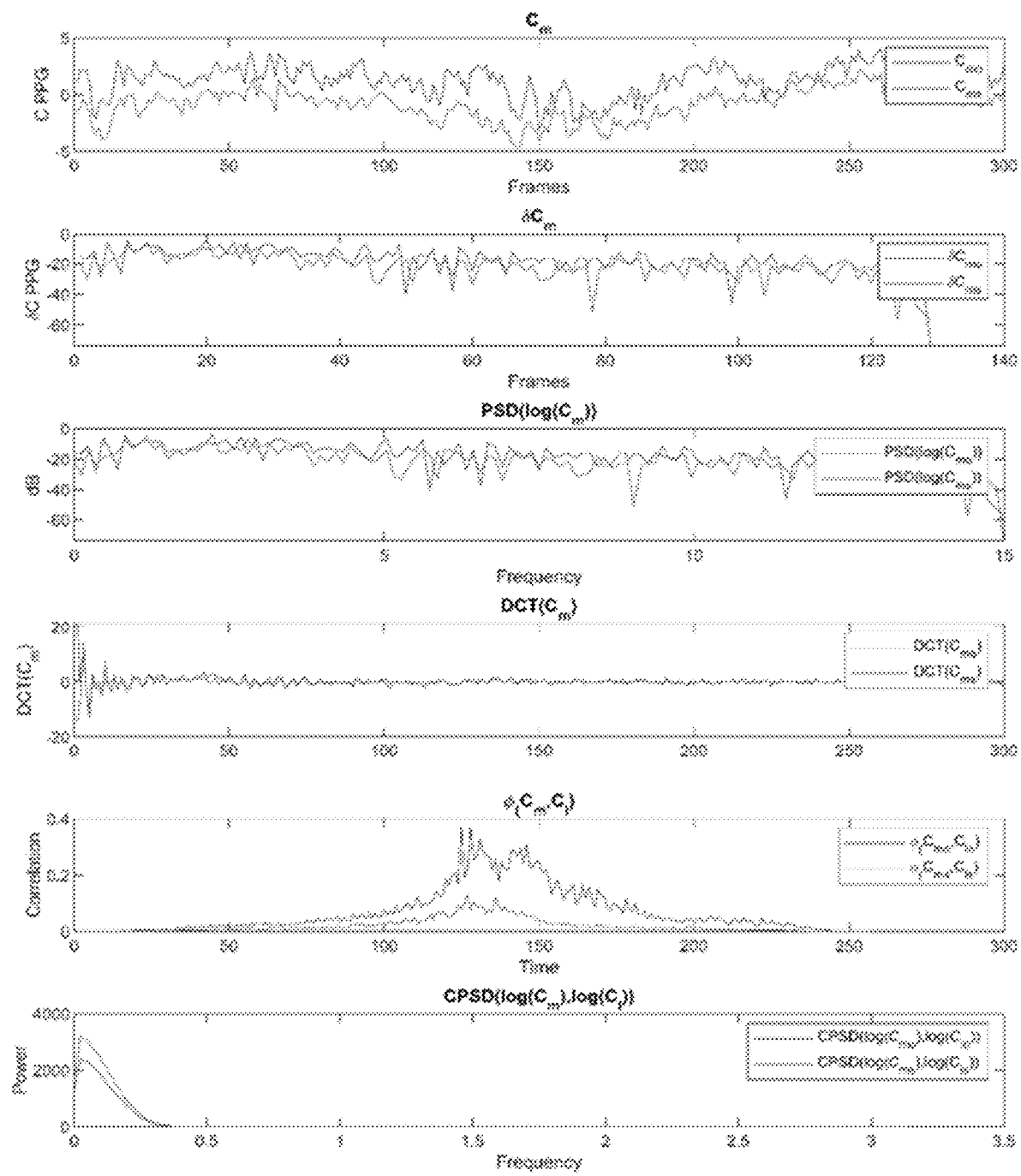
Figure 3B:
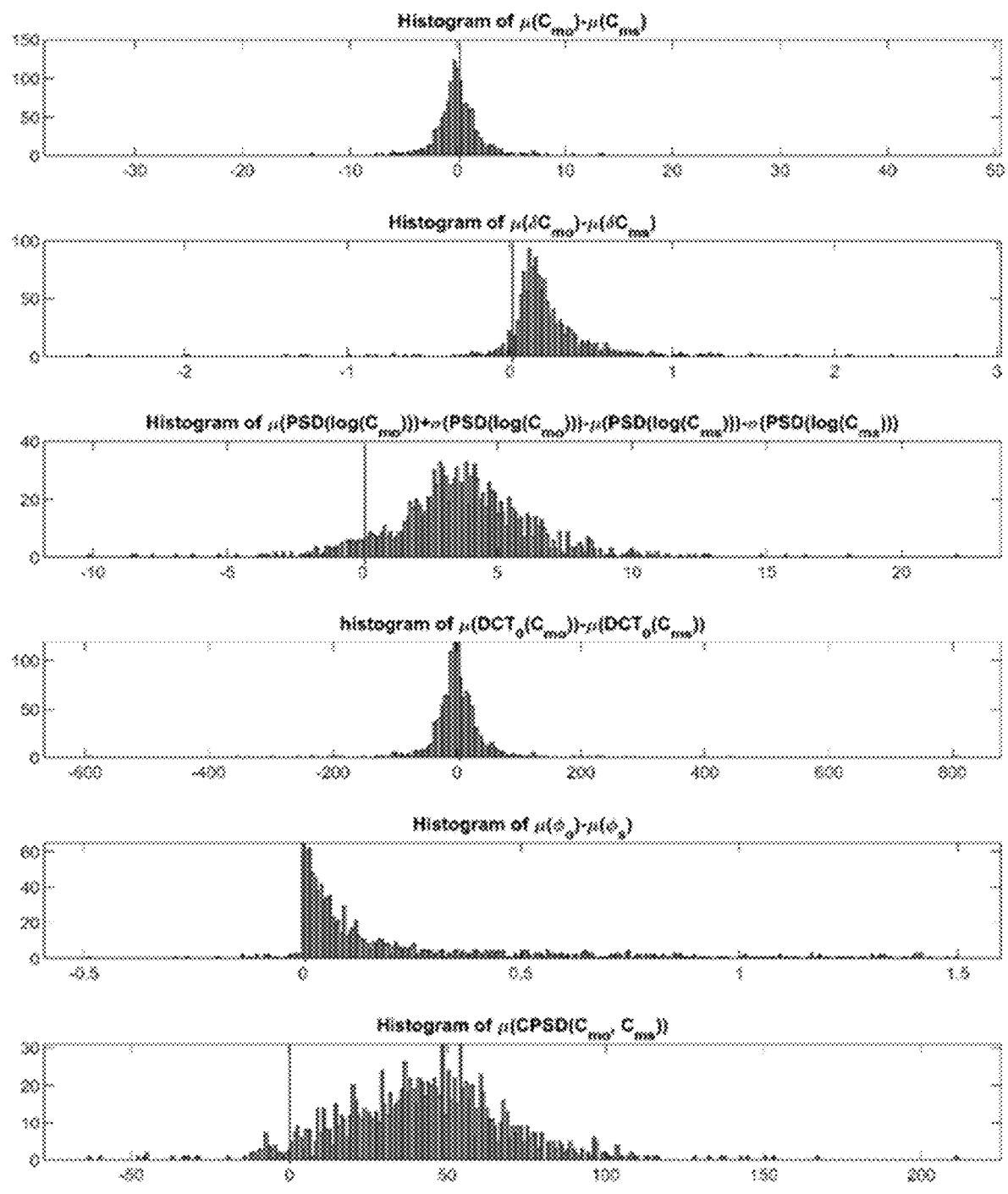
Figure 4A:
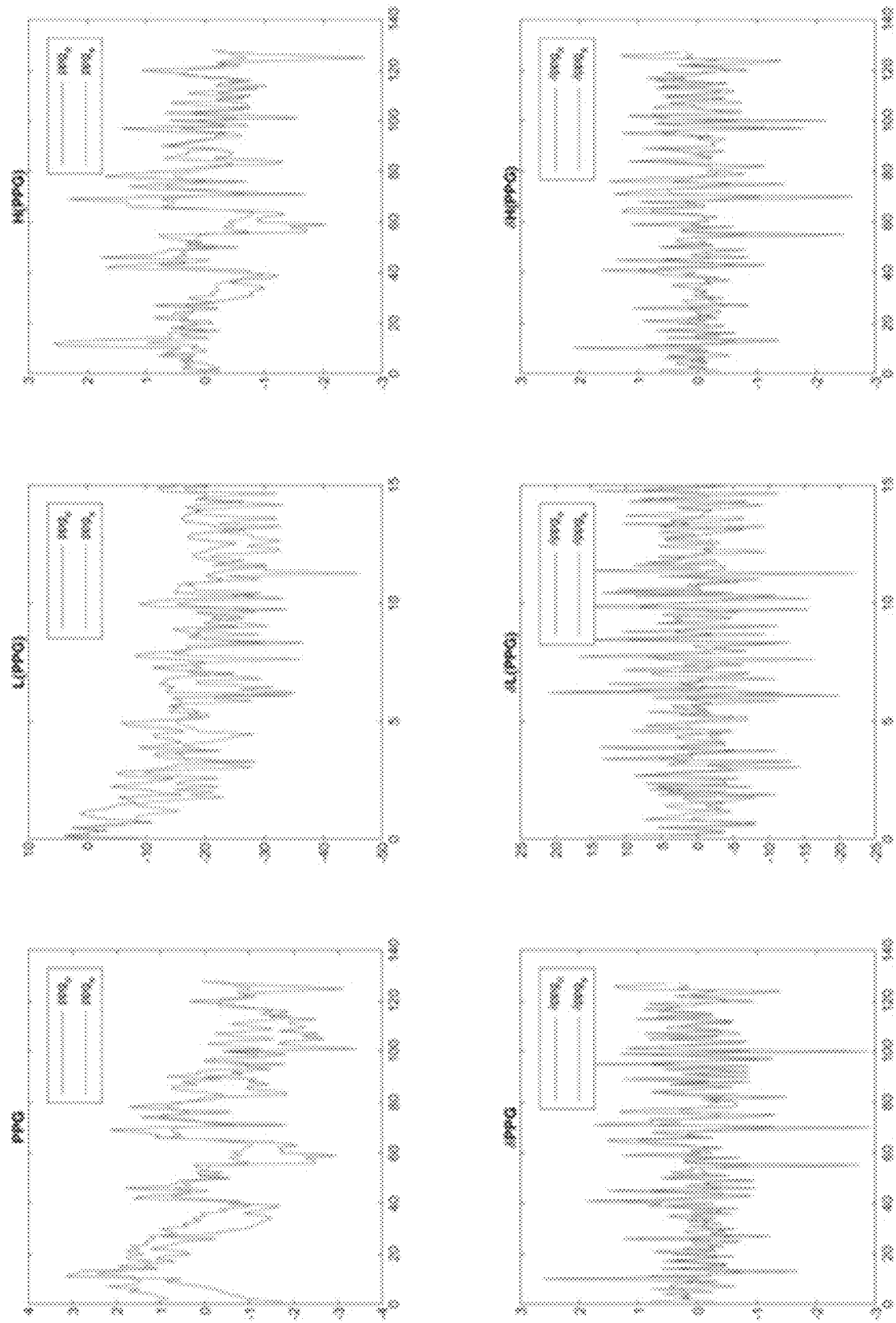
FIGS. 4A and 4B show characteristics of raw biological signals (top), same analysis on derivative of signals (bottom), from original (blue) and synthetic (orange) video pairs.
Figure 4B:
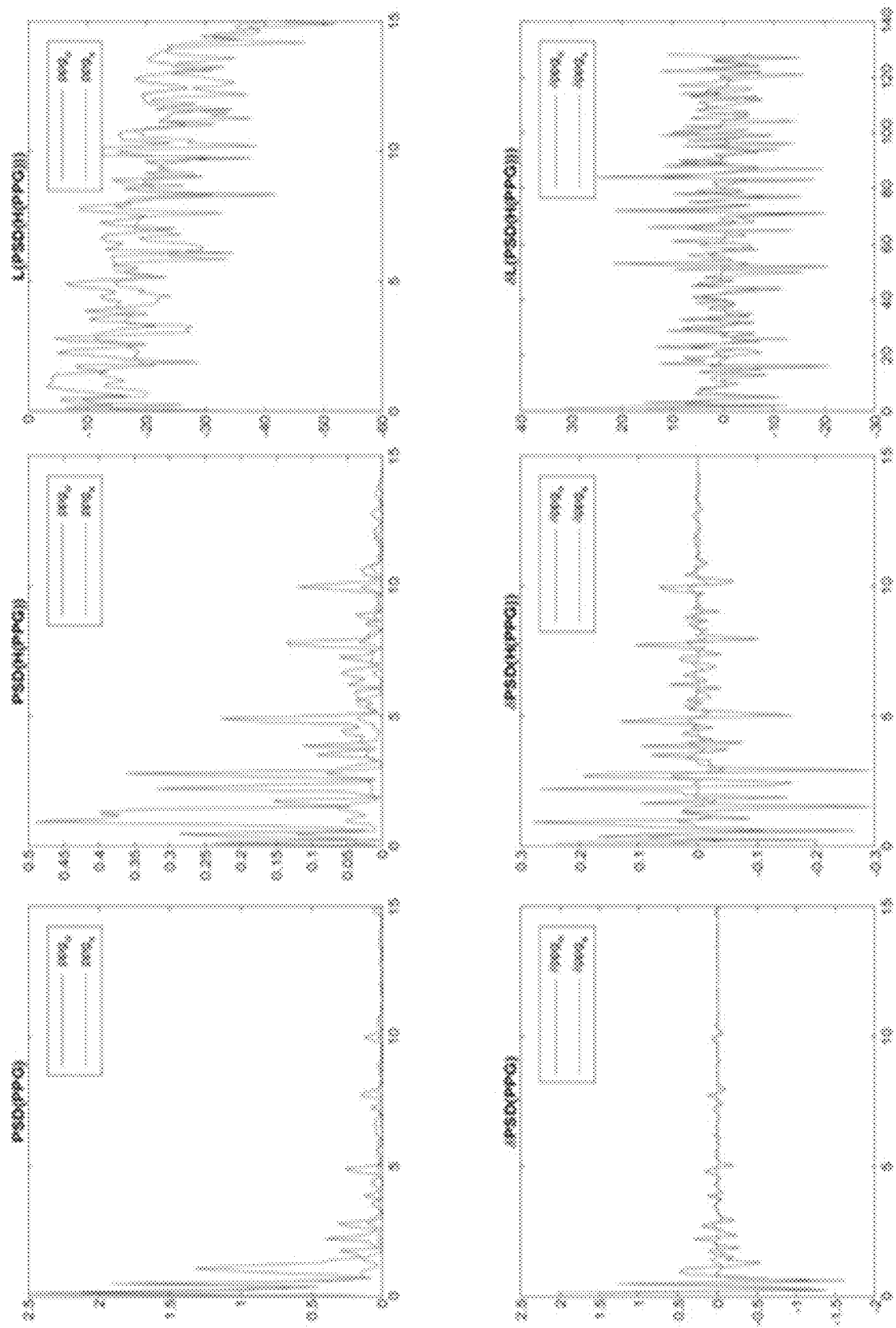
Figure 5:
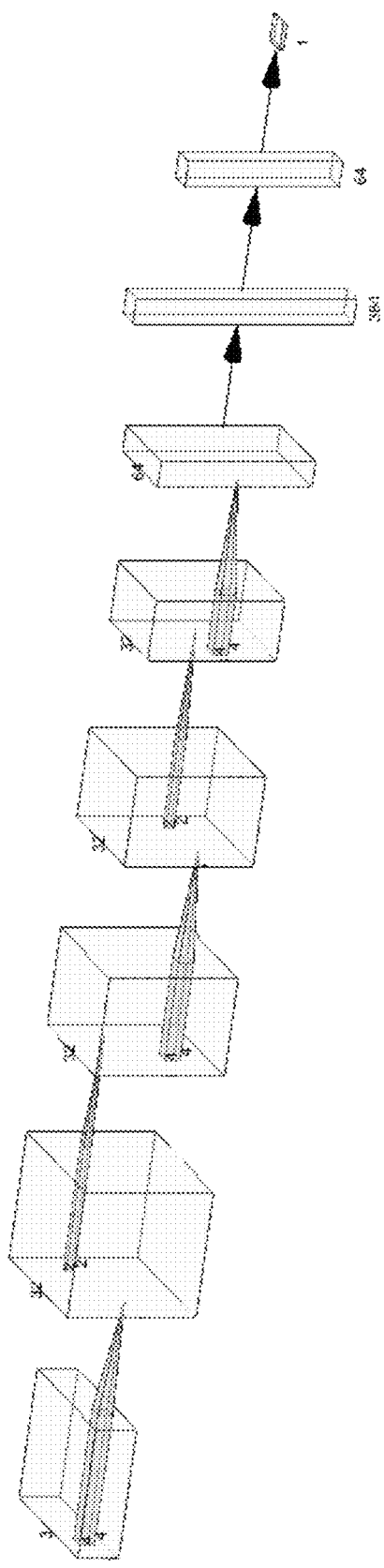
FIG. 5 shows an exemplary convolutional neural network (CNN) architecture, having three convolutional layers with max pooling, followed by dense layers.
Figure 6:
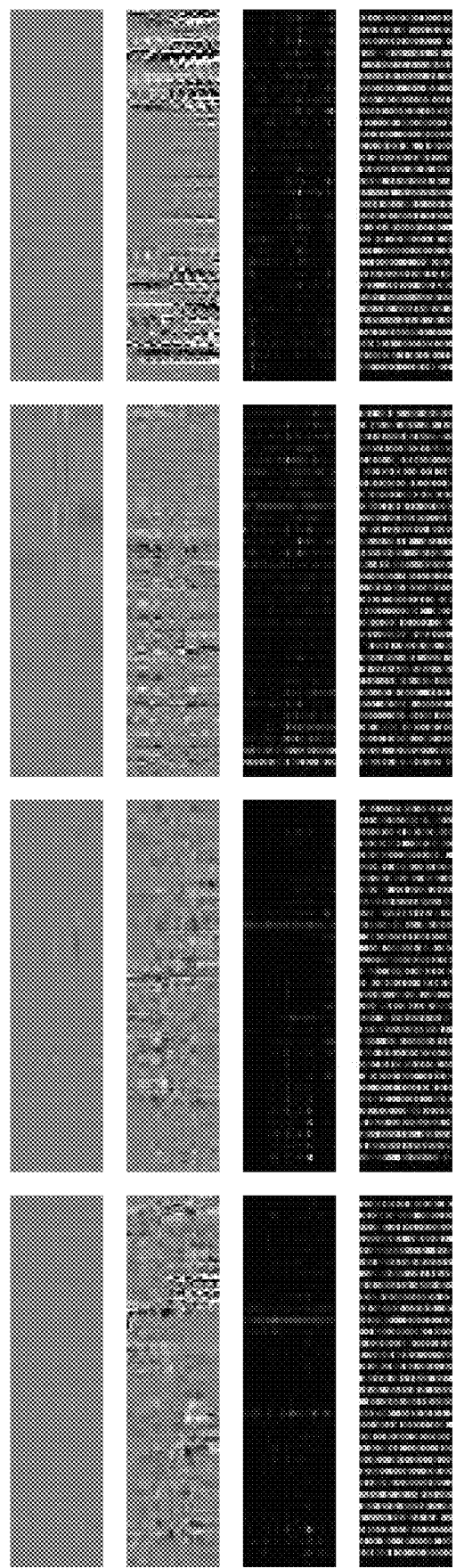
FIG. 6 shows PPG Maps, in which PPG signals per sub-region, per frame, are converted into 128×32 images for five synthetic (top) and original (bottom) segments.
Figure 7:
FIG. 7 shows representative of a Deep Fakes Dataset, in which a diverse dataset of original (top) and fake (bottom) video pairs is introduced from online sources.

FIG. 7 demonstrates a subset of the Deep Fakes Dataset, original videos placed in the top half and fakes in the bottom half. High accuracy on Deep Fakes Dataset substantiates that FakeCatcher is robust to low-resolution, compression, motion, illumination, occlusion, pose, and cosmetics artifacts; that enrich the input and slightly reduce the accuracy, without preprocessing. Cross-dataset evaluations were performed, which support the aforementioned claims about generalizability.

8.2. Evaluations

Several evaluations were conducted to establish the approach as state-of-the-art solution for deep fake detection. First, the use of biological signals was justified by several comparisons to off the shelf deep learning solutions and to other fake detectors. Second, several crucial experiments are listed to guide the combinatorial signal-feature space. Third, experimental findings are summarized and related to each result.

8.2.1. Quantitative Comparisons

In order to promote the effect of biological signals on the detection rate, experiments are performed with several networks: (i) a simple CNN, (ii) Inception V3 [96], (iii) Xception [97], (iv) ConvLSTM [98], (v-vii) three best networks proposed in [45], and (viii) an approach according to the present technology.

All experiments in Table 6 are performed on the same 60% train and 40% test split of the Deep Fakes Dataset, with same meta parameters. The Deep Fakes Dataset was chosen for comparison, because it is more generalizable as discussed in the previous section. For ConvLSTM and the present technology, "Frame" and "Face" indicate segment accuracy, for others they indicate frame accuracy. The last column is video accuracy. [45] was not run on face images because their approach utilizes background, and the present technology was not run on entire frames because there is no biological signal in the background. FakeCatcher outperforms the best baseline architecture by 8.85%.

8.2.2. Qualitative Comparisons

Even though "deep fakes" is a relatively new problem, there are a few papers in this domain. [2] employs a generative model for detection, but their model is restricted to their generative method in [37]. [20] also claims a high detection rate if the synthetic content is generated by [37] or the VAE used in the FakerApp. [22] reports high accuracy, however their approach is dependent on eye detection and parameterization. All of these [2], [20], [45] employ neural networks blindly and do not make an effort to understand the generative noise is experimentally characterized using biological signals.

Biological signals are not well-preserved in deep fakes. PPG maps encode authenticity using their spatial coherence and temporal consistency. Input frames are provided to a CNN, with faces cropped from input frames, and the PPG Maps per Table 6. Approaches incorporating biological signals are quantitatively more descriptive for deep fake detection compared to pure machine learning based approaches. Both spatial and temporal properties of biological signals are important. These enable the network to perform significantly better than complex and deeper networks without the present features.

8.2.3. Validation Experiments

The combination of signals and feature sets used are experimentally validated, namely 6 signals, in 11 transformations, in 126 features; explored in over 70 experiments. All experiments are documented with the signal transformation (Table 3), feature set (Table 4), and SVM classification accuracy, trained on FF (Table 8) and on DF datasets (Table 7), with $\omega=128$.

Furthermore, in Table 9, experiments are documented where specific subsets of Face Forensics were selected (FFT for train, FFX for test, and FFC for validation sets).

8.2.4. Summary of Experimental Outcomes and Findings

Spatial coherence: Biological signals are not coherently preserved in different synthetic facial parts.

Temporal consistency: Synthetic content does not contain frames with stable PPG. A and P of PPGs significantly differ. However, inconsistency is not separable into frequency bands.

Combined artifacts: Spatial inconsistency is augmented by temporal incoherence (Experiments in 5.2.3($S_C$)).

Artifacts as features: These artifacts can be captured in explainable features by transforming biological signals (Tables 2, 3 and 4). However there exists no clear reduction of these feature sets into lower dimensions, thus CNN performs better than SVM.

Comprehensive analysis: Finally, the classifier has higher accuracy for detection in the wild, for shorter videos, and for mid-size ROIs.

8.3. Cross Dataset/Model Experiments

Training and testing were performed on (i) different datasets, and (i) datasets created by different generative models for the evaluation of the present approach. The cross-dataset experiments are conducted between Deep Fakes, Celeb-DF [4], FF [2], FF++[3], and UADFV [56] datasets where the proposed approach was trained on one dataset and test on another (Table 10). Based on rows 5 and 6, the key observation is that FakeCatcher learns better from small and diverse datasets than on large and single source datasets. On one hand, training on DF and testing on FF is 18.73% higher than the other way around. On the other hand, DF is approximately only 5% of FF. The main difference between these datasets is that FF has a single generative model with no other artifacts, and DF is a completely in-the-wild dataset. If rows 3 and 6 are compared, it is observed that increasing diversity from FF to FF++, increases the accuracy on DF by 16.9%.

As mentioned above, FF++ [3] contains four synthetic videos per original video, where each of them is generated using a different generative model. First, original videos of FF++ are partitioned into train/test sets with 60/40 percentages. Four copies of these sets are created, and all samples generated deleted by a specific model from each set (column 1, Table 11, where each set contains 600 real and 1800 fake videos from three models for training, and 400 real and 400 fake videos from one model for test. Table 11 displays the results of the cross-model evaluation. Significantly accurate predictions are obtained, except NeuralTextures [77], as it is an inherently different generative model.

9. ANALYSIS

As variables are introduced into FakeCatcher, the best values for those parameters are assessed and revealed. Segment duration, face region, and different preprocessing techniques for PPGs are explored below. Furthermore, the explainable feature space for its information content was explored and its reaction to dimensionality reduction techniques observed.

9.1. Segment Duration Analysis

Table 12 documents results on the test set, the entire Face Forensics dataset, and Deep Fakes Dataset, using different segment durations. Top half shows the effect of co on the pairwise classification. The choice of $\omega=300$ (10 sec) is long enough to detect strong correlations without including too many artifacts for video labels.

Preceded by probabilistic video classification, authenticity classifier can be used with different segment sizes. Selecting a long segment size can accumulate noise in biological signals, in contrast incorrectly labeled segments may be compensated in the later step if there are enough segments. Thus, selecting a relatively smaller segment duration $\omega=180$ (6 sec), increases the video classification accuracy while keeping it long enough to extract biological signals. Note that when $\omega$ is increased above a certain threshold, the accuracy drops for Deep Fakes Dataset. This is due to occlusion and illumination artifacts, because the segment covers more facial variety as $\omega$ increases. A correct balance of having sufficient segments versus sufficient length per segment is a crucial result of the present analysis.

9.2. Face Analysis

The dependency of the present technology on different face regions and on face detection accuracy is explored.

9.2.1. Size of Face Regions

For the SVM classifier, biological signals are extracted from three separate regions on the face, and the effects of different sizes for these regions of interests is considered. The ROIs are quantized as very small (a few pixels), small, default, big, and the whole face. Table 13 documents experiments with these ROIs, their corresponding number of pixels, dataset, segment duration ($\omega=128$ and for $\omega=300$), and number of segments, with resulting accuracies for pairwise, segment, and video tasks. The pairwise separation is plotted, segment classification, and video classification accuracies per ROI size, on two datasets in FIGS. 9A-9C. Lastly, these ROIs are shown on a sample video frame in FIGS. 8A-8E, where red contour corresponds to GL and CL, green to GM and CM, and blue to GR and CR. The default ROI is a generalizable choice with a good accuracy for all cases.

9.2.2. Face Detection Dependency

The method needs some visible skin to extract biological signals. A perfect face detector is not required, however some facial area must be found to extract the signal. The implementation is modular enough to enable using other face detectors and handle multiple faces, both of which affects the accuracy but not significantly. In order to assess the robustness against face detection accuracy, results are shown when (i) the face detection accuracy is very low, and (ii) the video has multiple faces.

Figure 10:
FIG. 10 shows face detection dependency, where Fake-Catcher catches a fake video with multiple faces (top) as 91.7% fake, a fake video with 3% face detection confidence (left) as 99.97% fake, and a real video with 17% face detection confidence (right) as 65.47% real.

In FIG. 10, the results on unmodified but edge-case videos are shown. The top video contains two faces, they may be processed separately and each of them found to be fake, with an average confidence of 91.7%. On the left is a fake video, even though its face detection accuracy is 3% (very low compared to the average), FakeCatcher classifies this video as fake with 99.97%. Lastly, the real video on the right has a significant frame ordering problem, thus the face detector has 17% accuracy. Nevertheless, it is classified as real with 65%.

9.3. Image Quality Analysis

In order to estimate an exact heart rate, the PPG signal needs to have very low signal-to-noise-ratio. In contrast, the spatio-temporal inconsistency of PPGs is sufficient for the present approach to detect fakes. Even low quality authentic videos can still preserve this consistency, differentiating the dependency on low noise condition compared to the heart rate estimation task. To support this postulation, the detection accuracy is analyzed with images processed with two commonly used image processing operations: Gaussian blur and median filtering. The Celeb-DF [4] dataset is used, with different kernel sizes, fixing $\omega=128$ segment duration (Table 14). The accuracy stays relatively unaffected up to a kernel size of 7×7. Then, as expected, the larger the filter kernel is used, the lower the accuracy gets. Nevertheless, such large kernel blurs modify the image significantly enough that it does not matter if the image is authentic or fake (FIGS. 11A-11C).

9.4. Blind Source Separation

To better understand the features, feature sets, and their relative importance, the Fisher criterion detection [99] of linearly separable features is computed, if any. No significantly high ratio was observed, neither for LDA (linear discriminant analysis) [100], guiding us towards kernel based SVMs and more feature space exploration. PCA (principal component analysis) [101] and CSP (common spatial patterns) [102] were also applied to reduce the dimensionality of the feature spaces. FIGS. 12A-12C show 3D distribution of original (red) and synthetic (blue) samples by the most significant three components found by PCA (FIG. 12A), LDA (FIG. 12B), and CSP (FIG. 12C), without clear class boundaries. The feature vector was sought to be condensed with the best classification accuracy. However, 71% accuracy after PCA and 65.43% accuracy after CSP was achieved.

10. EXPERIMENTS

10.1. Datasets

First, the Face Forensics (FF) dataset [1] is used, which has (i) original and synthetic pairs of videos with same content and actor, and (ii) a compilation of original and synthetic videos, both of which are created using the same generative model [31]. The train/validation/test sets of [1] contain 704, 150 and 150 videos.

Although [1] is a clean dataset perfect for initial experiments, the generalizability of the findings need to be assessed. For this purpose, a new database (so-called Deep Fakes Dataset (DF)) was created, which is set of portrait videos collected "in the wild", more than half of them being synthetic. The videos in the dataset are diverse real-world samples in terms of the source generative model, resolution, compression, illumination, aspect-ratio, frame rate, motion, pose, cosmetics, occlusion, content, and context, as it originates from various sources such as news articles and research presentations; totaling up to 142 videos, 32 minutes, and 30 GBs. Synthetic videos are matched with their original counterparts when possible. FIG. 7 demonstrates a subset of the Deep Fakes dataset, in which the original (top) and fake (bottom) video pairs are from online sources.

10.2. Class Accuracies

Dataset accuracy is used as a metric in order to simplify the explanation of results. However, catching fake videos (true positives) is as important as passing real videos through (true negatives). In some defensive systems, detecting real videos as fake (false positive) is more tolerable than letting fake videos slip (false negatives), because there is a secondary manual detection process. On the other hand, too many false positives may overwhelm the system towards manually checking everything.

In order to assess the system towards these concerns, the class accuracies of FakeCatcher were analyzed in different datasets. Table 15 lists all dataset, real, and synthetic accuracies on all datasets, and with specific generative models of FF++[3]. All models use $\omega=128$ and a 60/40 split, except the one trained on Celeb-DF using the given subsets. There is a slight general tendency of creating false positives. The special case of Celeb-DF that its class imbalance of 6.34:1 fake to real ratio bumps up this tendency. This disturbance is the side effect of the head motion, lighting, color artifacts, and other environment changes on the PPG signal. However, the probabilistic video classification, incorporating frequency domain, and appropriate segment durations negate these side effects. Automatic monitoring systems would prefer false positives over false negatives as long as it is not overwhelming the secondary manual process; which makes FakeCatcher a good candidate for deployment to production.

High accuracy on Deep Fakes dataset substantiates that FakeCatcher is robust to low-resolution, compression, motion, illumination, occlusion, pose, and cosmetics; that enrich the input and slightly reduce the accuracy, without preprocessing. Cross-dataset evaluations were performed (train on Deep Fakes/Face Forensics and test on Face Forensics/Deep Fakes) which support the aforementioned claims about generalizability.

Several evaluations were conducted to set the approach as state-of-the-art solution for deep fake detection. The use of biological signals is justified by several comparisons to off the shelf deep learning solutions and to other fake detectors. Several crucial experiments are listed to guide the combinatorial signal-feature space.

10.3. Numerical Comparisons

In order to promote the effect of biological signals on the detection rate, experiments were performed with several networks: (i) a simple CNN, (ii) Inception V3 [74], (iii) Xception [75], (iv) ConvLSTM [76], (v-vii) three best networks proposed in [39], and (viii) the approach.

All experiments in Table 7 are performed on the same train/test split of the Deep Fakes dataset, with same meta parameters. Deep Fakes dataset was selected, because it is more generalizable as discussed in the previous section. For ConvLSTM and the approach, "Frame" and "Face" indicate segment accuracy, for others they indicate frame accuracy. The last column is video accuracy for all. [39] was not run on face images because their approach utilizes background, and the present technology did not run on entire frames because there is no biological signal in the background. [1] employs a generative model for detection, but their model is restricted to their previous generative method. [12] also claims a high detection rate if the synthetic content is generated by [31] or the VAE used in the FakerApp. [14] reports high accuracy, however their approach is dependent on eye detection and parameterization. All of these [1], [12], [39] employ neural networks blindly and do not make an effort to understand the generative noise experimentally characterized using biological signals.

Based on the comprehensive experiments, biological signals are not well-preserved in deep fakes, however, is the contribution of biological signals significant against pure ML approaches? PPG maps encode authenticity using their spatial coherence and temporal consistency. To prove this, the CNN is trained with (i) input frames (46.89%), (ii) faces cropped from input frames (54.56%), and (iii) the PPG Maps (87.62%) as shown in Table 6. To ensure that this jump is not only the result of temporal consistency, it was compared to the classification accuracy of ConvLSTM on entire and face frames (47.65% and 44.82%), which are even lower than frame-based methods. Thus, (1) biological signals are quantitatively more descriptive for deep fake detection, (2) both spatial and temporal properties of biological signals are important, and (3) these enable the network to perform significantly better than complex and deeper networks.

The combination of signals and feature sets used is experimentally validated. All experiments are documented with the signal definition and transformation (Tables 2 and 3), feature set (Table 4), and SVM classification accuracy, trained on FF (Table 8) and on DF datasets (Table 7), with $\omega=128$. Furthermore, in Table 5, experiments are documented where specific subsets of Face Forensics were selected (FFT for train, FFX for test, and FFC for validation sets).

$\hat{A}$ and P of PPGs significantly differ. However, inconsistency is not separable into frequency bands. However there exists no clear reduction of these feature sets into lower dimensions, thus CNN performs better than SVM.

Comprehensive analysis: Finally, the classifier has higher accuracy for detection in the wild, for shorter videos, and for mid-size ROIs.

Variables are introduced into the automatic FakeCatcher, and the values for these parameters are considered below. Segment duration, face region, and different preprocessing techniques for PPGs are also considered below. Furthermore, the explainable feature space was analyzed for its information content and observed its reaction to dimensionality reduction techniques.

Table 8 documents results on the test set, the entire [1] dataset, and Deep Fakes dataset, using different segment durations. Top half preceded by probabilistic video classification, authenticity classifier has flexible segment size, as incorrectly labeled segments may be compensated in the later step. Selecting a relatively smaller segment duration $\omega=180$ (6 sec), increases the video classification accuracy while keeping it long enough to extract biological signals. Note that when $\omega$ is increased above a certain threshold, the accuracy drops for Deep Fakes dataset. This is due to occlusion and illumination artifacts, because the segment covers more facial variety as $\omega$ increases.

10.4. Face Region Analysis

For the SVM classifier, biological signals are extracted from three separate regions on the face. The effects of different sizes are assessed for these regions of interests. The ROIs is quantized as very small (a few pixels), small, default, big, and the whole face. Table 9 documents experiments with these ROIs, their corresponding number of pixels, dataset, segment duration ($\omega=128$ and for $\omega=300$), and number of segments, with resulting accuracies for pairwise, segment, and video tasks. The pairwise separation, segment classification, and video classification accuracies per ROI size, are plotted on two datasets in FIGS. 9A-9C, which show an ROI Comparison, including a pairwise separation (FIG. 9A), segment (FIG. 9B), and video (FIG. 9C) classification accuracy per several ROIs, on FF and DF datasets.

Lastly, these ROIs are shown on a sample video frame in FIGS. 8A-8E, which show ROI contours, where red contour corresponds to $G_L$ and $C_L$, green to $G_M$ and $C_M$, and blue to GR and $C_R$. The default ROI is a generalizable choice with a good accuracy for all cases, i.e., whole face (FIG. 8A), big ROI (FIG. 8B), default (FIG. 8C), small ROI (FIG. 8D), few pixels (FIG. 8E), for GL and CL (blue), for GM and CM (green), and for GR and CR (red).

10.5. Signal Processing Enhancements

The representativeness of several possible pre/post processing of feature sets and signals by small experiments while keeping the signal and feature set the same are now documented.

10.5.1. Normalization

The most representative pairwise segmentation result was evaluated with different normalizations on the signals before computing their cross power spectral densities (Table 15). The same toy FF dataset was used and $\omega=300$ kept constant, producing 387 segments. In this specific separation task, this analysis demonstrated that all frequencies and their ranges are needed as normalization may remove some characteristics of the signals to differentiate original and fake signals.

10.5.2. Band Pass Filtering

Different frequency bands were analyzed to determine whether they contributed in the generative noise. The spectrum was divided into below (f<1.05 Hz), acceptable (1.05 Hz<f<3.04 Hz), and high heart rate frequency bands (3.04 Hz<f<4.68 Hz) as well as an additional high frequency band (f>4.68 Hz). Table 16 documents pair-wise separation accuracies of the most representative feature, for segment size $\omega$=300 on entire FF dataset (1320 segments).

10.5.3. Frequency Quantization

The effect of quantization was analyzed after taking the inverse Fourier Transform of the signal. In Table 17 256 bins were verified to be the optimum choice on the best configuration, on the entire FF dataset.

10.5.4. DCT Coefficients as Features

Use of the DCT of the signal ($C_M$ in this case) up to N={1, 2, 3, 4} elements as a feature set was employed, however the accuracy was surpassed. The settings below in Table 18 correspond to the summation of DCT values up to N, respectively.

11. IMPLEMENTATION DETAILS

For each video segment, a Butterworth filter is applied [79] with frequency band of [0.7, 14]. The signal was quantized using Welch's method [103]. Then, frequencies collected between [hlow, hhigh], which correspond to below, in, and high ranges for heart-beat.

There is no clear frequency interval that accumulated generative noise, so all frequencies were included. The PPG extraction methods in [71] were followed for GL, GM, GR and [70] for CL, CM, CR.

It is worth discussing that PPG signals extracted for heart rate and for the detection task are not of the same quality. For accurate heart rate estimation, PPG signal goes through significant denoising and componentization steps to fit the signal into expected ranges and periods. It was observed that some signal frequencies and temporal changes that may be considered as noise for heart rate extraction actually contains valuable information in terms of fake content. Only their coherence among facial regions and their consistency across segments was employed, achieving 99.39% pair separation accuracy on Face Forensics. Therefore, some steps of cleaning the PPG signals were not followed with the motivation of keeping subtle generative noise. Also, even though videos undergo some transformations (e.g., illumination, resolution, and/or compression), raw PPG correlation does not change in authentic videos.

While the present technology has been demonstrated with biological signals, in the more general case, including fake videos without humans, the technology may be applied to discover and exploit formulations of other spatiotemporal signals (i.e., synthetic illumination, wind, turbulence, etc.) that can be faithfully extracted from original videos.

Further, the CNN structure employed in the examples herein may be provided as a more complex architecture, without departing from the spirit of the invention.

"BioGAN" provides the possibility of a biologically plausible generative model. Although this may be possible by introducing an extra discriminator whose loss incorporates the findings to preserve biological signals, formulating a differentiable loss function that follows the proposed signal processing steps is not straightforward. Mimicking biological signals may be possible by introducing an extra discriminator whose loss incorporates the present technology to preserve biological signals. This necessitates the extraction process to be approximated with a differentiable function in order to enable backpropagation.

For the generalizability of a detector, the data should not be biased towards known generative models. Learning from pairs enables reduction of the effects of other variants and makes the model focus on the generative differences, even though there is compression, as well as motion and illumination artifacts. All pure machine learning based algorithms (as shown in Table 6) have a drop in accuracy compared to the present technology due to blindly exploiting this generative noise. On the other hand, the projection of this noise in biological signal domain was investigated, as a more descriptive interpretation, enabling outperformance of deeper models.

11.1. Module List

An embodiment of FakeCatcher includes the following Modules: Dataset Loader(s), Face Detection, ROI Alignment, PPG Map Creation, Training Module, Evaluation Module, Wrapper Main, (additional) Feature Extraction, (additional) Classification, and (additional) Experimental Modules.

The Dataset Loader loads videos from a dataset in a sequential manner and apply preprocessing to each individual frame if needed (for smooth study). For each dataset tested, there is a dataset module. This dataset module loads the files from the original downloaded dataset and puts them into a FakeCatcher specific folder structure. After that it loads video one by one for training and testing videos. The module has as Input: Dataset, Output: Video Files, and Functions: fPrepareDataset, fGetVideosAndPaths.

The OpenFace Module runs OpenFace [92] for each Video provided from the dataset module and load the generated landmark information. It has Input: Video File, Output: Facial Landmark locations, Face Detection Success Rate, and Functions: fRunOpenFaceOnVideo, fGetOpenFaceData.

The ROI Alignment module extracts region of interest (ROI) from each frame of a video using facial landmarks, then converts to grid-like structure and aligns them. OpenCV and NumPy modules are needed for python for this module to work. It has Input: Video File, Facial Landmark data, Output: Aligned region of images for the Video, and Functions: fGetROIImages.

The PPG Map Creation module calculates PPG Map images from the region of interest Images, and has Input: Aligned ROI images, Output: PPG Map Images, and Functions: fGetPPGMaps, OpenCV, SciPy and NumPy modules are needed for python for this module to work.

The Training Module uses PPG Maps to train the FakeCatcher neural network model, and has Input: A set of PPG Maps from the dataset split, Output: Training accuracy, trained model, and Functions: fDetectFakeACC, NumPy, TensorFlow and Keras modules are needed for python for this module to work.

The Evaluation Module uses PPG Maps to evaluate the FakeCatcher neural network model, and has Input: A set of PPG Maps from the dataset split, Output: Classification accuracy on validation set, and Functions: fDetectFakeACC, NumPy, TensorFlow and Keras modules are needed for python for this module to work.

The Wrapper Main module is a binder module that connects the other modules and creates a data connection link among them. It has no substantive inputs or outputs, and Functions: fMain.

The (additional) Feature Extraction module extracts Facial Features for the classification module, and has Input:

Video File, and Output: Segments of 126 features for the video. MATLAB with wavelet, computer vision and signal modules are needed for this module to work.

The (additional) Classification module classifies Real and Fake videos, and has Input: Features, and Output: Classification accuracy. LibSVM needs to be installed on the computer for this module to work.

The (additional) Experiments and Studies is for conducting experiments, ablation studies, and more, by changing hyper parameters, data distributions, and preprocessing, and has Input: Videos, and Output: e.g., Classification accuracy. MATLAB with wavelet, computer vision and signal modules may be employed for various modules, e.g., the additional modules.

12. CONCLUSION

FakeCatcher, a fake portrait video detector based on biological signals is presented, and experimentally validated to demonstrate that spatial coherence and temporal consistency of such signals are not well preserved in GAN-erated content. Following the statistical analysis, a robust synthetic video classifier may be created based on physiological changes. Furthermore, those signals are encapsulated in novel PPG maps to allow developing a CNN-based classifier, which further improves the accuracy and is agnostic to any generative model. The approach for pairwise separation and authenticity classification is evaluated, of segments and videos, on Face Forensics [1] and newly introduced Deep Fakes datasets, achieving 99.39% pairwise separation accuracy, 96% constrained video classification accuracy, and 91.07% in the wild video classification accuracy. These results also verify that FakeCatcher detects fake content with high accuracy, independent of the generator, content, resolution, and quality of the video.

Apart from the FakeCatcher and the Deep Fakes dataset, an in-depth analysis of deep fakes in the wild is provided. Generative models have not been generally explored by biological signals before, and the first experimental study is presented for understanding and explaining human signals in synthetic portrait videos.

13. HELPER SOFTWARE

The following software may be used to implement portions of the system:

OpenFace, Used for its executables for feature point detection,

Matlab with computer vision and signal processing toolboxes

OpenCV library—Used for Reading and Writing images and videos, opencv.org/

Python, Used as the main development environment and language, winpython.github.io/

Keras, Used for the development of the neural network model, keras.io/

NumPY, Used in order to satisfy the Keras and OpenCV dependencies, numpy.org/

SciPy, Used for various signal and image processing methods, scipy.org/

LibSVM—used for the SVM classification, www.csie.ntu.edu.tw/~cjlin/libsvm/

Applications of the invention described herein can take the form of a computer program product accessible from a computer-usable or computer-readable medium (e.g., a non-transitory computer-readable medium) providing program code for use by or in connection with a computer or any instruction execution system, such as an x64 architecture processor system having SIMD GPU coprocessors. For the purpose of this description, a computer-usable or computer readable medium can be any apparatus that can comprise, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. In some embodiments, the computer-usable or computer readable medium is a non-transitory computer-usable or computer readable medium. Examples of a computer-readable medium include a semiconductor or solid-state memory (e.g., flash memory), a random-access memory (RAM), a read-only memory (ROM), a magnetic disk and an optical disk. For some applications, cloud storage, and/or storage in a remote server is used, which typically include similar memory/storage options.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. The system can read the inventive instructions on the program storage devices and follow these instructions to execute the methodology of the embodiments of the invention. Network adapters may be coupled to the processor to enable the processor to become coupled to other processors or remote printers or storage devices through intervening private or public networks. Modems, cable modem and Ethernet cards are just a few of the currently available types of network adapters. Computer program code for carrying out operations of the present invention may be written in any combination of one or more programming languages, including an object-oriented programming language such as MathCAD, Python, Java, Smalltalk, C++ or the like and conventional procedural programming languages, such as the C programming language or similar programming languages.

It will be understood that the methods described herein can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the methods described in the present application. These computer program instructions may also be stored in a computer-readable medium (e.g., a non-transitory computer-readable medium) that can direct a computer or other programmable data processing apparatus to function in a particular manner, such that the instructions stored in the computer-readable medium produce an article of manufacture including instruction means which implement the function/act specified in the methods described in the present application. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the methods described in the present application.

The processor is typically a hardware device programmed with computer program instructions to produce a special purpose computer. For example, when programmed to perform the methods described herein, the computer processor typically acts as a special purpose synthetic video detection computer processor. Typically, the operations described herein that are performed by computer processors transform the physical state of a memory, which is a real physical article, to have a different magnetic polarity, electrical charge, or the like depending on the technology of the memory that is used. The processor may take the form of a field programmable gate array (FPGA), an application-specific integrated circuit (ASIC), or a neural network implemented on a specialized chip.

The computing device may include a network interface device for communicating with a network, e.g., the Internet or a LAN. A user accessible terminal for the computing device may also may include a user interface unit (e.g., a liquid crystal display (LCD), an alphanumeric input device (e.g., a keyboard), and a cursor control device (e.g., a mouse). The data storage device may include a machine-readable storage medium (or more specifically a non-transitory computer-readable storage medium) on which is stored one or more sets of instructions embodying any one or more of the methodologies or functions described herein. A non-transitory storage medium refers to a storage medium other than a carrier wave. The instructions may also reside, completely or at least partially, within the main memory and/or within the processing device during execution thereof by the computer device, the main memory and the processing device also constituting computer-readable storage media. While the computer-readable storage may be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media.

Processing unit may comprise one or more processors, or other control circuitry or any combination of processors and control circuitry that provide, overall control according to the disclosed embodiments. Memory may be implemented as any type of as any type of computer readable storage media, including non-volatile and volatile memory.

The example embodiments disclosed herein may be described in the general context of processor-executable code or instructions stored on memory that may comprise one or more computer readable storage media (e.g., tangible non-transitory computer-readable storage media such as memory). As should be readily understood, the terms "computer-readable storage media" or "non-transitory computer-readable media" include the media for storing of data, code and program instructions, such as memory, and do not include portions of the media for storing transitory propagated or modulated data communication signals.

While the functionality disclosed herein has been described by illustrative example using descriptions of the various components and devices of embodiments by referring to functional blocks and processors or processing units, controllers, and memory including instructions and code, the functions and processes of the embodiments may be implemented and performed using any type of processor, circuit, circuitry or combinations of processors and or circuitry and code. This may include, at least in part, one or more hardware logic components. For example, and without limitation, illustrative types of hardware logic components that can be used include field programmable gate arrays (FPGAs), application specific integrated circuits (ASICs), application specific standard products (ASSPs), system-on-a-chip systems (SOCs), complex programmable logic devices (CPLDs), etc. Use of the term processor or processing unit in this disclosure is mean to include all such implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example embodiments, implementations, and forms of implementing the claims and these example configurations and arrangements may be changed significantly without departing from the scope of the present disclosure. Moreover, although the example embodiments have been illustrated with reference to particular elements and operations that facilitate the processes, these elements, and operations may be combined with, or be replaced by, any suitable devices, components, architecture or process that achieves the intended functionality of the embodiment. Numerous other changes, substitutions, variations, alterations, and modifications may be ascertained to one skilled in the art and it is intended that the present disclosure encompass all such changes, substitutions, variations, alterations, and modifications a falling within the scope of the appended claims.

The description of embodiments of the disclosure is not intended to be exhaustive or to limit the disclosure to the precise form disclosed. While specific embodiments of, and examples for, the disclosure are described herein for illustrative purposes, various equivalent modifications are possible within the scope of the disclosure, as those skilled in the relevant art will recognize. For example, while method steps or functions are presented in a given order, alternative embodiments may perform functions in a different order, or functions may be performed substantially concurrently. The teachings of the disclosure provided herein can be applied to other procedures or methods as appropriate. The various embodiments described herein can be combined to provide further embodiments. Aspects of the disclosure can be modified, if necessary, to employ the compositions, functions and concepts of the above references and application to provide yet further embodiments of the disclosure. These and other changes can be made to the disclosure in light of the detailed description. All such modifications are intended to be included within the scope of the appended claims.

Specific elements of any of the foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure. Each reference cited herein is expressly incorporated herein in its entirety. Such references provide examples representing aspects of the invention, uses of the invention, disclosure of the context of the invention and its use and application. The various aspects disclosed herein, including subject matter incorporated herein by reference, may be employed, in combination or subcombination and in various permutations, consistent with the claims.

14. REFERENCES (Each reference cited herein is expressly incorporated herein by reference in its entirety)

[1] D. Chu, I. Demir, K. Eichensehr, J. G. Foster, M. L. Green, K. Lerman, F. Menczer, C. OConnor, E. Parson, L. Ruthotto et al., "White paper: Deep fakery—an action plan," Institute for Pure and Applied Mathematics (IPAM), University of California, Los Angeles, Los Angeles, Calif., Tech. Rep. www.ipam.ucla.edu/wp-content/uploads/2020/01/Whitepaper-Deep-Fakery.pdf, January 2020.

[2] A. Rossler, D. Cozzolino, L. Verdoliva, C. Riess, J. Thies, and M. Nießner, "FaceForensics: A Large-scale Video Dataset for Forgery Detection in Human Faces," arXiv, p. arXiv:1803.09179, March 2018.

[3] A. Rössler, D. Cozzolino, L. Verdoliva, C. Riess, J. Thies, and M. Niessner, "Faceforensics++: Learning to detect manipulated facial images," in The IEEE International Conference on Computer Vision (ICCV), October 2019.

[4] Y. Li, P. Sun, H. Qi, and S. Lyu, "Celeb-DF: A Large-scale Challenging Dataset for DeepFake Forensics," in IEEE Conf. on Computer Vision and Patten Recognition (CVPR), Seattle, Wash., United States, 2020.

[5] I. Goodfellow, J. Pouget-Abadie, M. Mirza, B. Xu, D. Warde-Farley, S. Ozair, A. Courville, and Y. Bengio, "Generative adversarial nets," in Advances in Neural Information Processing Systems 27. Curran Associates, Inc., 2014, pp. 2672-2680.

[6] A. Radford, L. Metz, and S. Chintala, "Unsupervised Representation Learning with Deep Convolutional Generative Adversarial Networks," arXiv e-prints, p. arXiv:1511.06434, November 2015.

[7] J.-Y. Zhu, T. Park, P. Isola, and A. A. Efros, "Unpaired image-to-image translation using cycle-consistent adversarial networks," in Computer Vision (ICCV), 2017 IEEE International Conference on, 2017.

[8] T.-C. Wang, M.-Y. Liu, J.-Y. Zhu, G. Liu, A. Tao, J. Kautz, and B. Catanzaro, "Video-to-video synthesis," in Advances in Neural Information Processing Systems (NIPS), 2018.

[9] K. Nagano, J. Seo, J. Xing, L. Wei, Z. Li, S. Saito, A. Agarwal, J. Fursund, and H. Li, "pagan: Real-time avatars using dynamic textures," ACM Transactions on Graphics, 2018.

[10] A. Pumarola, A. Agudo, A. Martinez, A. Sanfeliu, and F. MorenoNoguer, "Ganimation: Anatomically-aware facial animation from a single image," in Proceedings of the European Conference on Computer Vision (ECCV), 2018.

[11] Y. Li, S. Liu, J. Yang, and M.-H. Yang, "Generative face completion," in IEEE Conference on Computer Vision and Pattern Recognition, 2017.

[12] "Fake Obama warning about 'deep fakes' goes viral," www.msnbc.com/hallie-jackson/watch/fake-obama-warning-about-deep-fakes-goes-viral-1214598723984, accessed: 2020 Mar. 15.

[13] "Fake celebrity porn is blowing up on reddit, thanks to artificial intelligence," www.theverge.com/2018/1/24/16929148/fake-celebrity-porn-ai-deepfake-face-/swapping-artificial-intelligence-reddit, accessed: 2018 Nov. 15.

[14] "Deep fakes: A looming crisis for national security, democracy and privacy?" www.lawfareblog.com/deep-fakes-looming-crisis-national-/security-democracy-and-privacy, accessed: 2018 Nov. 15.

[15] "AI art at Christies sells fo $432,500," www.nytimes.com/2018/10/25/arts/design/ai-art-sold-christies.html, accessed: 2018 Nov. 15.

[16] J. Benes, T. Kelly, F. Dechtverenko, J. Krivanek, and P. Mu¨ller, "On realism of architectural procedural models," Computer Graphics Forum, vol. 36, no. 2, pp. 225-234, May 2017.

[17] J. Pan, J. Dong, Y. Liu, J. Zhang, J. Ren, J. Tang, Y. W. Tai, and M.-H. Yang, "Physics-based generative adversarial models for image restoration and beyond," IEEE Transactions on Pattern Analysis and Machine Intelligence, 2020.

[18] L. Scalise, N. Bernacchia, I. Ercoli, and P. Marchionni, "Heart rate measurement in neonatal patients using a webcamera," in 2012 IEEE International Symposium on Medical Measurements and Applications Proceedings, May 2012, pp. 1-4.

[19] M. Rostami, A. Juels, and F. Koushanfar, "Heart-to-heart (h2h): authentication for implanted medical devices," in Proceedings of the 2013 ACM SIGSAC Conference on Computer and Communications Security, ser. CCS '13. New York, N.Y., USA: ACM, 2013, pp. 1099-1112.

[20] D. Afchar, V. Nozick, J. Yamagishi, and I. Echizen, "Mesonet: a compact facial video forgery detection network," in IEEE International Workshop on Information Forensics and Security (WIFS), December 2018, pp. 1-7.

[21] S. Agarwal, H. Farid, Y. Gu, M. He, K. Nagano, and H. Li, "Protecting world leaders against deep fakes," in The IEEE Conference on Computer Vision and Pattern Recognition (CVPR) Workshops, June 2019.

[22] Y. Li, M.-C. Chang, and S. Lyu, "In Ictu Oculi: Exposing AI Generated Fake Face Videos by Detecting Eye Blinking," arXiv e-prints, p. arXiv:1806.02877, June 2018.

[23] N. B. A. Warif, A. W. A. Wahab, M. Y. I. Idris, R. Ramli, R. Salleh, S. Shamshirband, and K.-K. R. Choo, "Copy-move forgery detection: Survey, challenges and future directions," Journal of Network and Computer Applications, vol. 75, pp. 259-278, 2016.

[24] S. Iizuka, E. Simo-Serra, and H. Ishikawa, "Globally and Locally Consistent Image Completion," ACM Transactions on Graphics (Proc. of SIGGRAPH 2017), vol. 36, no. 4, pp. 107:1-107:14, 2017.

[25] A. Brock, T. Lim, J. M. Ritchie, and N. Weston, "Neural Photo Editing with Introspective Adversarial Networks," arXiv e-prints, p. arXiv:1609.07093, September 2016.

[26] D. P. Kingma, T. Salimans, R. Jozefowicz, X. Chen, I. Sutskever, and M. Welling, "Improved variational inference with inverse autoregressive flow," in Proceedings of the 30th International Conference on Neural Information Processing Systems, ser. NIPS'16, 2016, pp. 4743-4751.

[27] A. Tewari, M. Zollhofer, H. Kim, P. Garrido, F. Bernard, P. Perez, and C. Theobalt, "Mofa: Model-based deep convolutional face autoencoder for unsupervised monocular reconstruction," in The IEEE International Conference on Computer Vision (ICCV), October 2017.

[28] I. Gulrajani, F. Ahmed, M. Arjovsky, V. Dumoulin, and A. C. Courville, "Improved training of wasserstein gans," in Advances in Neural Information Processing Systems 30, I. Guyon, U. V. Luxburg, S. Bengio, H. Wallach, R. Fergus, S. Vishwanathan, and R. Garnett, Eds., 2017, pp. 5767-5777.

[29] X. Mao, Q. Li, H. Xie, R. Y. Lau, Z. Wang, and S. Paul Smolley, "Least squares generative adversarial networks," in *The IEEE International Conference on Computer Vision (ICCV)*, October 2017.

[30] T. Karras, T. Aila, S. Laine, and J. Lehtinen, "Progressive growing of GANs for improved quality, stability, and variation," in *Proc. International Conference on Learning Representations (ICLR)*, 2018.

[31] P. Viola and M. J. Jones, "Robust real-time face detection," *Int. J. Comput. Vision*, vol. 57, no. 2, pp. 137-154, May 2004.

[32] W. Shen and R. Liu, "Learning residual images for face attribute manipulation," 2017 *IEEE Conference on Computer Vision and Pattern Recognition (CVPR)*, pp. 1225-1233, 2017.

[33] Y. Choi, M. Choi, M. Kim, J.-W. Ha, S. Kim, and J. Choo, "Stargan: Unified generative adversarial networks for multi-domain image-toimage translation," in *The IEEE Conference on Computer Vision and Pattern Recognition (CVPR)*, June 2018.

[34] Z. He, W. Zuo, M. Kan, S. Shan, and X. Chen, "Arbitrary facial attribute editing: Only change what you want," *arXiv*:1711.10678, 2017.

[35] R. Huang, S. Zhang, T. Li, and R. He, "Beyond face rotation: Global and local perception gan for photorealistic and identity preserving frontal view synthesis," in *The IEEE International Conference on Computer Vision (ICCV)*, October 2017.

[36] H. Kim, P. Garrido, A. Tewari, W. Xu, J. Thies, M. Niessner, P. Pe'rez, C. Richardt, M. Zollho¨er, and C. Theobalt, "Deep video portraits," *ACM Trans. Graph.*, vol. 37, no. 4, pp. 163:1-163:14, July 2018.

[37] J. Thies, M. Zollho¨fer, M. Stamminger, C. Theobalt, and M. Nießner, "Face2Face: Real-time Face Capture and Reenactment of RGB Videos," in *Proc. Computer Vision and Pattern Recognition (CVPR), IEEE*, 2016.

[38] R. Xu, Z. Zhou, W. Zhang, and Y. Yu, "Face Transfer with Generative Adversarial Network," *arXiv e-prints*, p. arXiv:1710.06090, October 2017.

[39] J. Bao, D. Chen, F. Wen, H. Li, and G. Hua, "Towards open-set identity preserving face synthesis," in *The IEEE Conference on Computer Vision and Pattern Recognition (CVPR)*, June 2018.

[40] H. Ding, K. Sricharan, and R. Chellappa, "Exprgan: Facial expression editing with controllable expression intensity," *AAAI*, 2018.

[41] Z. Boulkenafet, J. Komulainen, and A. Hadid, "Face spoofing detection using colour texture analysis," *IEEE Transactions on Information Forensics and Security*, vol. 11, no. 8, pp. 1818-1830, August 2016.

[42] M. Barni, L. Bondi, N. Bonettini, P. Bestagini, A. Costanzo, M. Maggini, B. Tondi, and S. Tubaro, "Aligned and non-aligned double jpeg detection using convolutional neural networks," *J. Vis. Comun. Image Represent.*, vol. 49, no. C, pp. 153-163, November 2017.

[43] J. Galbally and S. Marcel, "Face anti-spoofing based on general image quality assessment," in 2014 *22nd International Conference on Pattern Recognition*, August 2014, pp. 1173-1178.

[44] V. Kushwaha, M. Singh, R. Singh, M. Vatsa, N. Ratha, and R. Chellappa, "Disguised faces in the wild," in *IEEE Conf. on Computer Vision and Pattern Recognition (CVPR) Workshops*, June 2018.

[45] S. Tariq, S. Lee, H. Kim, Y. Shin, and S. S. Woo, "Detecting both machine and human created fake face images in the wild," in *Proceedings of the 2Nd International Workshop on Multimedia Privacy and Security*, ser. MPS '18. New York, N.Y., USA: ACM, 2018, pp. 81-87.

[46] D. Gera and E. J. Delp, "Deepfake video detection using recurrent neural networks," in 15*th IEEE International Conference on Advanced Video and Signal Based Surveillance (AVSS)*, November 2018, pp. 1-6.

[47] A. Khodabakhsh, R. Ramachandra, K. Raja, P. Wasnik, and C. Busch, "Fake face detection methods: Can they be generalized?" in 2018 *International Conference of the Biometrics Special Interest Group (BIOSIG)*, September 2018, pp. 1-6.

[48] Y. Zhang, L. Zheng, and V. L. L. Thing, "Automated face swapping and its detection," in 2017 *IEEE 2nd International Conference on Signal and Image Processing (ICSIP)*, August 2017, pp. 15-19.

[49] P. Zhou, X. Han, V. I. Morariu, and L. S. Davis, "Two-stream neural networks for tampered face detection," in 2017 *IEEE Conference on Computer Vision and Pattern Recognition Workshops (CVPRW)*, July 2017, pp. 1831-1839.

[50] H. H. Nguyen, J. Yamagishi, and I. Echizen, "Capsule-forensics: Using capsule networks to detect forged images and videos," in *ICASSP* 2019 2019 *IEEE International Conference on Acoustics, Speech and Signal Processing (ICASSP)*, 2019, pp. 2307-2311.

[51] F. Matern, C. Riess, and M. Stamminger, "Exploiting visual artifacts to expose deepfakes and face manipulations," in *IEEE Winter Applications of Computer Vision Workshops (WACVW)*, January 2019, pp. 83-92.

[52] P. Korshunov and S. Marcel, "Speaker inconsistency detection in tampered video," in 2018 26th *European Signal Processing Conference (EUSIPCO)*, September 2018, pp. 2375-2379.

[53] H. Li, B. Li, S. Tan, and J. Huang, "Detection of Deep Network Generated Images Using Disparities in Color Components," *arXiv eprints*, p. arXiv:1808.07276, August 2018.

[54] A. Roy, D. Bhalang Tariang, R. Subhra Chakraborty, and R. Naskar, "Discrete cosine transform residual feature based filtering forgery and splicing detection in jpeg images," in *The IEEE Conference on Computer Vision and Pattern Recognition (CVPR) Workshops*, June 2018.

[55] Y. Li and S. Lyu, "Exposing deepfake videos by detecting face warping artifacts," in *The IEEE Conference on Computer Vision and Pattern Recognition (CVPR) Workshops*, June 2019.

[56] X. Yang, Y. Li, and S. Lyu, "Exposing deep fakes using inconsistent head poses," in *IEEE International Conference on Acoustics, Speech and Signal Processing (ICASSP)*, 2019, pp. 8261-8265.

[57] "Deepfakes," github.com/deepfakes/faceswap, accessed: 2020 Mar. 16.

[58] Z. Liu, P. Luo, X. Wang, and X. Tang, "Deep learning face attributes in the wild," in *Proceedings of International Conference on Computer Vision (ICCV)*, December 2015.

[59] "Faceswap," github.com/MarekKowalski/FaceSwap, accessed: 2020 Mar. 16.

[60] P. Zhou, X. Han, V. I. Morariu, and L. S. Davis, "Two-stream neural networks for tampered face detection," in *IEEE Conf. on Computer Vision and Pattern Recognition Workshops (CVPRW)*, 2017, pp. 1831-1839.

[61] N. Le and J.-M. Odobez, "Learning multimodal temporal representation for dubbing detection in broadcast media," in *Proceedings of the 24th ACM International Conference on Multimedia*, ser. MM 16. New York, N.Y., USA: Association for Computing Machinery, 2016, p. 202206.

[62] J. S. Chung, A. Senior, O. Vinyals, and A. Zisserman, "Lip reading sentences in the wild," in *2017 IEEE Conference on Computer Vision and Pattern Recognition (CVPR)*, 2017, pp. 3444-3453.

[63] E. Boutellaa, Z. Boulkenafet, J. Komulainen, and A. Hadid, "Audiovisual synchrony assessment for replay attack detection in talking face biometrics," *Multimedia Tools Appl.*, vol. 75, no. 9, pp. 5329-5343, May 2016.

[64] P. Korshunov and S. Marcel, "Deepfakes: a new threat to face recognition? assessment and detection," *CoRR*, vol. abs/1812.08685, 2018.

[65] H.-Y. Wu, M. Rubinstein, E. Shih, J. Guttag, F. Durand, and W. Freeman, "Eulerian video magnification for revealing subtle changes in the world," *ACM Trans. Graph.*, vol. 31, no. 4, pp. 65:1-65:8, July 2012.

[66] W. Chen and D. McDuff, "Deepphys: Video-based physiological measurement using convolutional attention networks," in *The European Conference on Computer Vision (ECCV)*, September 2018.

[67] P. V. Rouast, M. T. P. Adam, R. Chiong, D. Cornforth, and E. Lux, "Remote heart rate measurement using low-cost rgb face video: a technical literature review," *Frontiers of Computer Science*, vol. 12, no. 5, pp. 858-872, October 2018.

[68] M.-Z. Poh, D. J. McDuff, and R. W. Picard, "Non-contact, automated cardiac pulse measurements using video imaging and blind source separation." *Opt. Express*, vol. 18, no. 10, pp. 10 762-10 774, May 2010.

[69] G. Balakrishnan, F. Durand, and J. Guttag, "Detecting pulse from head motions in video," in *2013 IEEE Conference on Computer Vision and Pattern Recognition*, June 2013, pp. 3430-3437.

[70] G. de Haan and V. Jeanne, "Robust pulse rate from chrominance-based rppg," *IEEE Transactions on Biomedical Engineering*, vol. 60, no. 10, pp. 2878-2886, October 2013.

[71] C. Zhao, C.-L. Lin, W. Chen, and Z. Li, "A novel framework for remote photoplethysmography pulse extraction on compressed videos," in *The IEEE Conference on Computer Vision and Pattern Recognition (CVPR) Workshops*, June 2018.

[72] L. Feng, L. Po, X. Xu, Y. Li, and R. Ma, "Motion-resistant remote imaging photoplethysmography based on the optical properties of skin," *IEEE Transactions on Circuits and Systems for Video Technology*, vol. 25, no. 5, pp. 879-891, May 2015.

[73] S. K. A. Prakash and C. S. Tucker, "Bounded kalman filter method for motion-robust, non-contact heart rate estimation," *Biomed. Opt. Express*, vol. 9, no. 2, pp. 873-897, February 2018.

[74] S. Tulyakov, X. Alameda-Pineda, E. Ricci, L. Yin, J. F. Cohn, and N. Sebe, "Self-adaptive matrix completion for heart rate estimation from face videos under realistic conditions," in *The IEEE Conference on Computer Vision and Pattern Recognition (CVPR)*, June 2016.

[75] "Fakeapp," www.malavida.com/en/soft/fakeapp/, accessed: 2020 Mar. 16.

[76] "Faceswap-gan," github.com/shaoanlu/faceswap-GAN, accessed: 2020 Mar. 16.

[77] J. Thies, M. Zollhöfer, and M. Nießner, "Deferred neural rendering: Image synthesis using neural textures," *ACM Trans. Graph.*, vol. 38, no. 4, July 2019. [Online]. Available: doi.org/10.1145/3306346.3323035

[78] N. Dufour, A. Gully, P. Karlsson, A. V. Vorbyov, T. Leung, J. Childs, and C. Bregler, "Deepfakes detection dataset by google & jigsaw."

[79] S. Butterworth et al., "On the theory of filter amplifiers, " *Wireless Engineer*, vol. 7, no. 6, pp. 536-541, 1930.

[80] A. S. M. Murugavel, S. Ramakrishnan, K. Balasamy, and T. Gopalakrishnan, "Lyapunov features based eeg signal classification by multiclass svm," in *2011 World Congress on Information and Communication Technologies*, December 2011, pp. 197-201.

[81] S. Pei and J. Ding, "Relations between gabor transforms and fractional fourier transforms and their applications for signal processing," *IEEE Transactions on Signal Processing*, vol. 55, no. 10, pp. 4839-4850, October 2007.

[82] M. Soleymani, J. Lichtenauer, T. Pun, and M. Pantic, "A multimodal database for affect recognition and implicit tagging," *IEEE Trans. Affect. Comput.*, vol. 3, no. 1, pp. 42-55, January 2012.

[83] H. Hu, Y. Wang, and J. Song, "Signal classification based on spectral correlation analysis and svm in cognitive radio," in *22nd International Conference on Advanced Information Networking and Applications (aina 2008)*, March 2008, pp. 883-887.

[84] A. Kampouraki, G. Manis, and C. Nikou, "Heartbeat time series classification with support vector machines," IEEE Trans. on Information Technology in Biomedicine, vol. 13, no. 4, pp. 512-518, July 2009.

[85] N. Jatupaiboon, S. Pan-Ngum, and P. Israsena, "Real-time eeg-based happiness detection system," in *TheScientificWorldJournal*, 2013.

[86] W. Zhang, "Automatic modulation classification based on statistical features and support vector machine," in *2014 XXXIth URSI General Assembly and Scientific Symposium (URSI GASS)*, August 2014, pp. 1-4.

[87] D. Nie, X. Wang, L. Shi, and B. Lu, "Eeg-based emotion recognition during watching movies," in *2011 5th International IEEE/EMBS Conference on Neural Engineering*, April 2011, pp. 667-670.

[88] G. Koren, "Wearable sensor for physiological data acquisi tion in early education," github.com/get/PPG-Heart-RateClassifier/blob/master/thesis %20excerpt.pdf, 2016, accessed: 2018-1115.

[89] C. Cortes and V. Vapnik, "Support-vector networks," *Machine Learning*, vol. 20, no. 3, pp. 273-297, September 1995.

[90] S. Fortune, "Handbook of discrete and computational geometry." Boca Raton, Fla., USA: CRC Press, Inc., 1997, ch. Voronoi Diagrams and Delaunay Triangulations, pp. 377-388.

[91] MATLAB, version R2018a. Natick, Mass.: The MathWorks Inc., 2010.

[92] B. Amos, B. Ludwiczuk, and M. Satyanarayanan, "Openface: A general-purpose face recognition library with mobile applications," CMU-CS-16-118, CMU School of Computer Science, Tech. Rep., 2016.

[93] C.-C. Chang and C.-J. Lin, "Libsvm: A library for support vector machines," *ACM Trans. Intell. Syst. Technol.*, vol. 2, no. 3, pp. 27:1-27:27, May 2011.

[94] J. Buckheit, J. B. Buckheit, D. L. Donoho, and D. L. Donoho, "Wavelab and reproducible research." Springer-Verlag, 1995, pp. 55-81.

[95] F. Chollet et al., "Keras," github.com/fchollet/keras, 2015.

[96] C. Szegedy, V. Vanhoucke, S. loffe, J. Shlens, and Z. Wojna, "Rethinking the inception architecture for computer vision," in *IEEE Conf. on Computer Vision and Pattern Recognition (CVPR)*, June 2016.

[97] F. Chollet, "Xception: Deep learning with depthwise separable convolutions," in *The IEEE Conference on Computer Vision and Pattern Recognition (CVPR)*, July 2017.

[98] X. SHI, Z. Chen, H. Wang, D.-Y. Yeung, W.-k. Wong, and W.-c. WOO, "Convolutional lstm network: A machine learning approach for precipitation nowcasting," in *Advances in Neural Information Processing Systems* 28, 2015, pp. 802-810.

[99] L. Silva, O. P. Bellon, and K. L. Boyer, "Precision range image registration using a robust surface interpenetration measure and enhanced genetic algorithms," *IEEE Transactions on Pattern Analysis & Machine Intelligence*, vol. 23, no. 05, pp. 762-776, may 2005.

[100] S. Mika, G. Ratsch, J. Weston, B. Scholkopf, and K. R. Mullers, "Fisher discriminant analysis with kernels," in *Neural Networks for Signal Processing IX: Proceedings of the 1999 IEEE Signal Processing Society Workshop (Cat. No. 98TH8468)*, August 1999, pp. 41-48.

[101] S. Wold, K. Esbensen, and P. Geladi, "Principal component analysis," *Chemometrics and Intelligent Laboratory Systems*, vol. 2, no. 1, pp. 37-52, 1987, proceedings of the Multivariate Statistical Workshop for Geologists and Geochemists.

[102] Z. J. Koles, M. S. Lazar, and S. Z. Zhou, "Spatial patterns underlying population differences in the background eeg," *Brain Topography*, vol. 2, no. 4, pp. 275-284, June 1990.

[103] P. Welch, "The use of fast fourier transform for the estimation of power spectra: A method based on time averaging over short, modified periodograms," IEEE Transactions on Audio and Electroacoustics, vol. 15, no. 2, pp. 70-73, June 1967.

[104] Fernandes, Steven, Sunny Raj, Eddy Ortiz, Iustina Vintila, Margaret Salter, Gordana Urosevic, and Sumit Jha. "Predicting Heart Rate Variations of Deepfake Videos using Neural ODE." In Proceedings of the IEEE International Conference on Computer Vision Workshops, pp. 0-0. 2019.

[105] Ciftci, Umur Aybars, and Ilke Demir. "FakeCatcher: Detection of Synthetic Portrait Videos using Biological Signals." arXiv preprint arXiv:1901.02212 (2019).

[106] Ross, Arun, Sudipta Banerjee, Cunjian Chen, Anurag Chowdhury, Vahid Mirjalili, Renu Sharma, Thomas Swearingen, and Shivangi Yaday. "Some Research Problems in Biometrics: The Future Beckons." arXiv preprint arXiv:1905.04717 (2019).

[107] Bourquard, Aurélien, and Jeff Yan. "Differential Imaging Forensics." arXiv preprint arXiv:1906.05268 (2019).

[108] Mualla, Karim, and United Leicester. "The Growing Effect of Cloud Computing on Technological Innovation: A Decision-Making Framework for Hybrid Managers." (2018).

[109] Huang, Xuping. "Watermarking Based Data Spoofing Detection Against Speech Synthesis and Impersonation with Spectral Noise Perturbation." In 2018 IEEE International Conference on Big Data (Big Data), pp. 4600-4604. IEEE, 2018.

[110] Cases, Privacy, and Civil Rights Protections. "Using Video Analytics and Sensor Fusion in Law Enforcement."

[111] Knight, Will, "The Defense Department Has Produced the First Tools for Catching Deepfakes", MIT Technology Review, Aug. 7, 2018. As of Oct. 2, 2018: www.technologyreview.com/s/611726/the-defensedepartment-has-produced-the-first-tools-for-catching-deepfakes/

[112] Donner, Herman, Michael Steep, and Todd Peterson. "Crossing the Urban Data Layer: Mobility as a Data Generating Activity." (2019).

[113] Kramer, Reinhold. "Truth or Truths?." In Are We Postmodern Yet?, pp. 13-46. Palgrave Macmillan, Cham, 2019.

[114] Goldenstein, Jean-Claude, and James E. Searing. "Containing disinformation spread using customizable intelligence channels." U.S. patent application Ser. No. 16/268,329, filed Jun. 13, 2019.

Deep Learning References

[115] "Deep Learning in a Nutshell: Core Concepts" Dettmers, Tim. Parallel For All. NVIDIA, 3 Nov. 2015.

[116] "Understanding Convolution in Deep Learning" Dettmers, Tim. TD Blog, 26 Mar. 2015.

[117] "Object Recognition with Neural Nets" Hinton, Geoffrey et al. Coursera, 5 Nov. 2013

[118] "Deep Learning" Nielsen, Michael. Neural Networks and Deep Learning online book, December, 2017.

[119] "Convolutional Neural Networks for Visual Recognition" Li, Fei-Fei et al. Stanford University Courses, Spring 2017.

[120] "Going Deeper with Convolutions" Szegedy, Christian et al. CVPR, 2015.

[121] "Computer vision—pooling and subsampling" Larochelle, Hugo. Neural networks [9.5], 15 Nov. 2013

[122] developer.nvidia.com/discover/convolutional-neural-network

[123] deeplearning.stanford.edu/tutorial/supervised/ConvolutionalNeuralNetwork/

[124] cs231n.github.io/convolutional-networks/

[125] en.wikipedia.org/wiki/Convolutional_neural_network

Generative Adversarial Network References

[126] en.wikipedia.org/wiki/Generative_adversarial_network

[127] Goodfellow, Ian; Pouget-Abadie, Jean; Mirza, Mehdi; Xu, Bing; Warde-Farley, David; Ozair, Sherjil; Courville, Aaron; Bengio, Yoshua (2014). Generative Adversarial Networks (PDF). Proceedings of the International Conference on Neural Information Processing Systems (NIPS 2014). pp. 2672-2680.

[128] Salimans, Tim; Goodfellow, Ian; Zaremba, Wojciech; Cheung, Vicki; Radford, Alec; Chen, Xi (2016). "Improved Techniques for Training GANs". arXiv: 1606.03498 [cs.LG].

[129] Isola, Phillip; Zhu, Jun-Yan; Zhou, Tinghui; Efros, Alexei (2017). "Image-to-Image Translation with Conditional Adversarial Nets". Computer Vision and Pattern Recognition.

[130] Ho, Jonathon; Ermon, Stefano (2016). "Generative Adversarial Imitation Learning". Advances in Neural Information Processing Systems: 4565-4573. arXiv: 1606.03476. Bibcode:2016arXiv160603476H.

[131] "Vanilla GAN (GANs in computer vision: Introduction to generative learning)". theaisummer.com. AI Summer. Archived from the original on 2020 Jun. 3. Retrieved 20 Sep. 2020.

[132] Luc, Pauline; Couprie, Camille; Chintala, Soumith; Verbeek, Jakob (2016 Nov. 25). "Semantic Segmentation using Adversarial Networks". NIPS Workshop on Adversarial Training, Dec, Barcelona, Spain. 2016. arXiv: 1611.08408. Bibcode:2016arXiv161108408L.

[133] Andrej Karpathy; Pieter Abbeel; Greg Brockman; Peter Chen; Vicki Cheung; Rocky Duan; Ian Goodfellow; Durk Kingma; Jonathan Ho; Rein Houthooft; Tim Salimans; John Schulman; Ilya Sutskever; Wojciech Zaremba, Generative Models, OpenAI, retrieved Apr. 7, 2016

[134] Lin, Zinan; et al. (December 2018). "PacGAN: the power of two samples in generative adversarial networks". NIPS'18: Proceedings of the 32nd International Conference on Neural Information Processing Systems. pp. 1505-1514. (also available arXiv:1712.04086)

[135] Caesar, Holger (2019 Mar. 1), A list of papers on Generative Adversarial (Neural) Networks: nightrome/really-awesome-gan, retrieved 2019 Mar. 2

[136] Yu, Jiahui, et al. "Generative image inpainting with contextual attention." Proceedings of the IEEE conference on computer vision and pattern recognition. 2018.

[137] Wong, Ceecee. "The Rise of AI Supermodels". CDO Trends.

[138] Schawinski, Kevin; Zhang, Ce; Zhang, Hantian; Fowler, Lucas; Santhanam, Gokula Krishnan (2017 Feb. 1). "Generative Adversarial Networks recover features in astrophysical images of galaxies beyond the deconvolution limit". Monthly Notices of the Royal Astronomical Society: Letters. 467 (1): L110-L114. arXiv:1702.00403. Bibcode:2017MNRAS.467L.110S. doi:10.1093/mnrasl/s1x008. S2CID 7213940.

[139] Kincade, Kathy. "Researchers Train a Neural Network to Study Dark Matter". R&D Magazine.

[140] Kincade, Kathy (May 16, 2019). "CosmoGAN: Training a neural network to study dark matter". Phys.org.

[141] Mustafa, Mustafa; Bard, Deborah; Bhimji, Wahid; Lukič, Zarija; Al-Rfou, Rami; Kratochvil, Jan M. (2019 May 6). "CosmoGAN: creating high-fidelity weak lensing convergence maps using Generative Adversarial Networks". Computational Astrophysics and Cosmology. 6 (1): 1. arXiv:1706.02390. Bibcode:2019ComAC . . . 6 . . . 1M. doi:10.1186/s40668-019-0029-9. ISSN 2197-7909. S2CID 126034204.

[142] Paganini, Michela; de Oliveira, Luke; Nachman, Benjamin (2017). "Learning Particle Physics by Example: Location-Aware Generative Adversarial Networks for Physics Synthesis". Computing and Software for Big Science. 1: 4. arXiv:1701.05927. Bibcode:2017arXiv170105927D. doi:10.1007/s41781-017-0004-6. S2CID 88514467.

[143] Paganini, Michela; de Oliveira, Luke; Nachman, Benjamin (2018). "Accelerating Science with Generative Adversarial Networks: An Application to 3D Particle Showers in Multi-Layer calorimeters". Physical Review Letters. 120 (4): 042003. arXiv:1705.02355. Bibcode:2018PhRvL.120d2003P. doi:10.1103/PhysRevLett.120.042003. PMID 29437460. S2CID 3330974.

[144] Paganini, Michela; de Oliveira, Luke; Nachman, Benjamin (2018). "CaloGAN: Simulating 3D High Energy Particle Showers in Multi-Layer Electromagnetic calorimeters with Generative Adversarial Networks". Phys. Rev. D. 97 (1): 014021. arXiv:1712.10321. Bibcode:2018PhRvD . . . 97a4021P. doi:10.1103/PhysRevD.97.014021. S2CID 41265836.

[145] Erdmann, Martin; Glombitza, Jonas; Quast, Thorben (2019). "Precise Simulation of Electromagnetic calorimeter Showers Using a Wasserstein Generative Adversarial Network". Computing and Software for Big Science. 3: 4. arXiv:1807.01954. doi:10.1007/s41781-018-0019-7. S2CID 54216502.

[146] Musella, Pasquale; Pandolfi, Francesco (2018). "Fast and Accurate Simulation of Particle Detectors Using Generative Adversarial Networks". Computing and Software for Big Science. 2: 8. arXiv:1805.00850. Bibcode:2018arXiv180500850M. doi:10.1007/s41781-018-0015-y. S2CID 119474793.

[147] ATLAS, Collaboration (2018). "Deep generative models for fast shower simulation in ATLAS".

[148] SHiP, Collaboration (2019). "Fast simulation of muons produced at the SHiP experiment using Generative Adversarial Networks". Journal of Instrumentation. 14 (11): P11028. arXiv:1909.04451. Bibcode:2019JInst . . . 14P1028A. doi:10.1088/1748-0221/14/11/P11028. S2CID 202542604.

[149] Tang, Xiaoou; Qiao, Yu; Loy, Chen Change; Dong, Chao; Liu, Yihao; Gu, Jinjin; Wu, Shixiang; Yu, Ke; Wang, Xintao (2018 Sep. 1). "ESRGAN: Enhanced Super-Resolution Generative Adversarial Networks". arXiv:1809.00219. Bibcode:2018arXiv180900219 W.

[150] msmash (2019 Feb. 14). "'This Person Does Not Exist' Website Uses AI To Create Realistic Yet Horrifying Faces". Slashdot. Retrieved 2019 Feb. 16.

[151] Targett, Ed (May 16, 2019). "California moves closer to making deepfake pornography illegal". Computer Business Review.

[152] Mihalcik, Carrie (2019 Oct. 4). "California laws seek to crack down on deepfakes in politics and porn". cnet.com. CNET. Retrieved 2019 Oct. 13.

[153] Knight, Will (Aug. 7, 2018). "The Defense Department has produced the first tools for catching deepfakes". MIT Technology Review.

[154] Bisneto, Tomaz Ribeiro Viana; de Carvalho Filho, Antonio Oseas; Magãlhaes, Deborah Maria Vieira (February 2020). "Generative adversarial network and texture features applied to automatic glaucoma detection". Applied Soft Computing. 90: 106165. doi:10.1016/j.asoc.2020.106165.

[155] "3D Generative Adversarial Network". 3dgan.csail.mit.edu.

[156] Vondrick, Carl; Pirsiavash, Hamed; Torralba, Antonio (2016). "Generating Videos with Scene Dynamics". carlvondrick.com. arXiv:1609.02612. Bibcode:2016arXiv160902612V.

[154] Antipov, Grigory; Baccouche, Moez; Dugelay, Jean-Luc (2017). "Face Aging With Conditional Generative Adversarial Networks". arXiv:1702.01983 [cs.CV].

[158] Ukkonen, Antti; Joona, Pyry; Ruotsalo, Tuukka (2020). "Generating Images Instead of Retrieving Them: Relevance Feedback on Generative Adversarial Networks". Proceedings of the 43rd International ACM SIGIR Conference on Research and Development in Information Retrieval: 1329-1338. doi:10.1145/3397271.3401129. S2CID 220730163.

[159] Padhi, Radhakant; Unnikrishnan, Nishant (2006). "A single network adaptive critic (SNAC) architecture for optimal control synthesis for a class of nonlinear systems". Neural Networks. 19(10): 1648-1660. doi:10.1016/j.neunet.2006.08.010. PMID 17045458.

[160] Gutmann, Michael; Hyvarinen, Aapo. "Noise-Contrastive Estimation" (PDF). International Conference on AI and Statistics.

[161] Niemitalo, Olli (Feb. 24, 2010). "A method for training artificial neural networks to generate missing data within a variable context". Internet Archive (Wayback Machine). Archived from the original on Mar. 12, 2012. Retrieved Feb. 22, 2019.

[162] Sajjadi, Mehdi S. M.; Schölkopf, Bernhard; Hirsch, Michael (2016 Dec. 23). "EnhanceNet: Single Image Super-Resolution Through Automated Texture Synthesis". arXiv:1612.07919 [cs.CV].

[163] "This Person Does Not Exist: Neither Will Anything Eventually with AI". Mar. 20, 2019.

[164] "StyleGAN: Official TensorFlow Implementation". Mar. 2, 2019—via GitHub.

[165] Paez, Danny (2019 Feb. 13). "This Person Does Not Exist Is the Best One-Off Website of 2019". Retrieved 2019 Feb. 16.

[166] Beschizza, Rob (2019 Feb. 15). "This Person Does Not Exist". Boing-Boing. Retrieved 2019 Feb. 16.

[167] Horev, Rani (2018 Dec. 26). "Style-based GANs—Generating and Tuning Realistic Artificial Faces". Lyrn. AI. Retrieved 2019 Feb. 16.

[168] Elgammal, Ahmed; Liu, Bingchen; Elhoseiny, Mohamed; Mazzone, Marian (2017). "CAN: Creative Adversarial Networks, Generating "Art" by Learning About Styles and Deviating from Style Norms". arXiv: 1706.07068 [cs.AI].

[169] Cohn, Gabe (2018 Oct. 25). "AI Art at Christie's Sells for $432,500". The New York Times.

[170] Mazzone, Marian; Ahmed Elgammal (21 Feb. 2019). "Art, Creativity, and the Potential of Artificial Intelligence". Arts. 8: 26. doi:10.3390/arts8010026.

[171] Kulp, Patrick (May 23, 2019). "Samsung's AI Lab Can Create Fake Video Footage From a Single Headshot". AdWeek.

[172] Yu, Yi; Canales, Simon (Aug. 15, 2019). "Conditional LSTM-GAN for Melody Generation from Lyrics". arXiv: 1908.05551[cs.AI].

[173] "Nvidia's AI recreates Pac-Man from scratch just by watching it being played". The Verge. 2020 May 22.

[174] Seung Wook Kim; Zhou, Yuhao; Philion, Jonah; Torralba, Antonio; Fidler, Sanja (2020). "Learning to Simulate Dynamic Environments with GameGAN". arXiv:2005.12126 [cs.CV].

[175] Zhirui Zhang; Shujie Liu; Mu Li; Ming Zhou; Enhong Chen (October 2018). "Bidirectional Generative Adversarial Networks for Neural Machine Translation" (PDF). pp. 190-199.

Autoencoder References

[176] Kingma, Diederik P., and Max Welling. "Auto-encoding variational bayes." arXiv preprint arXiv:1312.6114 (2013).

[177] Rezende, Danilo Jimenez, Shakir Mohamed, and Daan Wierstra. "Stochastic backpropagation and approximate inference in deep generative models." arXiv preprint arXiv:1401.4082 (2014)

[178] jaan.io/what-is-variational-autoencoder-vae-tutorial/ Support

Vector Machine References

[179] en.wikipedia.org/wiki/Support_vector_machine

[180] Cortes, Corinna; Vapnik, Vladimir N. (1995). "Support-vector networks" (PDF). Machine Learning. 20 (3): 273-297. CiteSeerX 10.1.1.15.9362. doi:10.1007/BF00994018. S2CID 206787478.

[181] Ben-Hur, Asa; Horn, David; Siegelmann, Hava; Vapnik, Vladimir N. ""Support vector clustering" (2001);". Journal of Machine Learning Research. 2: 125-137.

[182] "1.4. Support Vector Machines—scikit-learn 0.20.2 documentation". Archived from the original on 2017 Nov. 8. Retrieved 2017 Nov. 8.

[183] Hastie, Trevor; Tibshirani, Robert; Friedman, Jerome (2008). The Elements of Statistical Learning: Data Mining, Inference, and Prediction (PDF) (Second ed.). New York: Springer. p. 134.

[184] Press, William H.; Teukolsky, Saul A.; Vetterling, William T.; Flannery, Brian P. (2007). "Section 16.5. Support Vector Machines". Numerical Recipes: The Art of Scientific Computing (3rd ed.). New York: Cambridge University Press. ISBN 978-0-521-88068-8. Archived from the original on 2011 Aug. 11.

[185] Joachims, Thorsten (1998). "Text categorization with Support Vector Machines: Learning with many relevant features". Machine Learning: ECML-98. Lecture Notes in Computer Science. Springer. 1398: 137-142. doi:10.1007/BFb0026683. ISBN 978-3-540-64417-0.

[186] Pradhan, Sameer S., et al. "Shallow semantic parsing using support vector machines." Proceedings of the Human Language Technology Conference of the North American Chapter of the Association for Computational Linguistics: HLT-NAACL 2004. 2004.

[187] Vapnik, Vladimir N.: Invited Speaker. IPMU Information Processing and Management 2014).

[188] Barghout, Lauren. "Spatial-Taxon Information Granules as Used in Iterative Fuzzy-Decision-Making for Image Segmentation". Granular Computing and Decision-Making. Springer International Publishing, 2015. 285-318.

[189] A. Malty (2016). "Supervised Classification of RADARSAT-2 Polarimetric Data for Different Land Features". arXiv:1608.00501 [cs.CV].

[190] DeCoste, Dennis (2002). "Training Invariant Support Vector Machines" (PDF). Machine Learning. 46: 161-190. doi:10.1023/A:1012454411458. S2CID 85843.

[191] Maitra, D. S.; Bhattacharya, U.; Parui, S. K. (August 2015). "CNN based common approach to handwritten character recognition of multiple scripts". 2015 13th International Conference on Document Analysis and Recognition (ICDAR): 1021-1025. doi:10.1109/ICDAR.2015.7333916.

[192] Gaonkar, Bilwaj; Davatzikos, Christos; "Analytic estimation of statistical significance maps for support vector machine based multi-variate image analysis and classification".

[193] Cuingnet, Remi; Rosso, Charlotte; Chupin, Marie; Lehéricy, Stéphane; Dormont, Didier; Benali, Habib; Samson, Yves; and Colliot, Olivier; "Spatial regularization of SVM for the detection of diffusion alterations associated with stroke outcome", Medical Image Analysis, 2011, 15 (5): 729-737.

[194] Statnikov, Alexander; Hardin, Douglas; & Aliferis, Constantin; (2006); "Using SVM weight-based methods to identify causally relevant and non-causally relevant variables", Sign, 1, 4.

[195] Boser, Bernhard E.; Guyon, Isabelle M.; Vapnik, Vladimir N. (1992). "A training algorithm for optimal margin classifiers". Proceedings of the fifth annual workshop on Computational learning theory—COLT '92. p. 144. CiteSeerX 10.1.1.21.3818. doi:10.1145/130385.130401. ISBN 978-0897914970. S2CID 207165665.

[196] "Why is the SVM margin equal to $2/\|w\|$". Mathematics Stack Exchange. 30 May 2015.

[197] Aizerman, Mark A.; Braverman, Emmanuel M. & Rozonoer, Lev I. (1964). "Theoretical foundations of the potential function method in pattern recognition learning". Automation and Remote Control. 25: 821-837.
[198] Jin, Chi; Wang, Liwei (2012). Dimensionality dependent PAC-Bayes margin bound. Advances in Neural Information Processing Systems. CiteSeerX 10.1.1.420.3487. Archived from the original on 2015 Apr. 2.
[199] Shalev-Shwartz, Shai; Singer, Yoram; Srebro, Nathan; Cotter, Andrew (2010 Oct. 16). "Pegasos: primal estimated sub-gradient solver for SVM". Mathematical Programming. 127 (1): 3-30. CiteSeerX 10.1.1.161.9629. doi:10.1007/s10107-010-0420-4. ISSN 0025-5610. S2CID 53306004.
[200] Hsieh, Cho-Jui; Chang, Kai-Wei; Lin, Chih-Jen; Keerthi, S. Sathiya; Sundararajan, S. (2008 Jan. 1). A Dual Coordinate Descent Method for Large-scale Linear SVM. Proceedings of the 25th International Conference on Machine Learning. ICML '08. New York, N.Y., USA: ACM. pp. 408-415. CiteSeerX 10.1.1.149.5594. doi:10.1145/1390156.1390208. ISBN 978-1-60558-205-4. S2CID 7880266.
[201] Rosasco, Lorenzo; De Vito, Ernesto; Caponnetto, Andrea; Piana, Michele; Verri, Alessandro (2004 May 1). "Are Loss Functions All the Same?". Neural Computation. 16 (5): 1063-1076. CiteSeerX 10.1.1.109.6786. doi: 10.1162/089976604773135104. ISSN 0899-7667. PMID 15070510. S2CID 11845688.
[202] Meyer, David; Leisch, Friedrich; Hornik, Kurt (September 2003). "The support vector machine under test". Neurocomputing. 55 (1-2): 169-186. doi:10.1016/S0925-2312(03)00431-4.
[203] Hsu, Chih-Wei; Chang, Chih-Chung & Lin, Chih-Jen (2003). A Practical Guide to Support Vector Classification (PDF) (Technical report). Department of Computer Science and Information Engineering, National Taiwan University. Archived (PDF) from the original on 2013 Jun. 25.
[204] Duan, Kai-Bo; Keerthi, S. Sathiya (2005). "Which Is the Best Multiclass SVM Method? An Empirical Study" (PDF). Multiple Classifier Systems. LNCS. 3541. pp. 278-285. CiteSeerX 10.1.1.110.6789. doi:10.1007/11494683_28. ISBN 978-3-540-26306-7.
[205] Hsu, Chih-Wei & Lin, Chih-Jen (2002). "A Comparison of Methods for Multiclass Support Vector Machines" (PDF). IEEE Transactions on Neural Networks. 13 (2): 415-25. doi:10.1109/72.991427. PMID 18244442.
[206] Platt, John; Cristianini, Nello; Shawe-Taylor, John (2000). "Large margin DAGs for multiclass classification" (PDF). In Solla, Sara A.; Leen, Todd K.; Müller, Klaus-Robert (eds.). Advances in Neural Information Processing Systems. MIT Press. pp. 547-553. Archived (PDF) from the original on 2012 Jun. 16.
[207] Dietterich, Thomas G.; Bakiri, Ghulum (1995). "Solving Multiclass Learning Problems via Error-Correcting Output Codes" (PDF). Journal of Artificial Intelligence Research. 2: 263-286. arXiv:cs/9501101. Bibcode:1995cs......1101D. doi:10.1613/jair.105. S2CID 47109072. Archived (PDF) from the original on 2013 May 9.
[208] Crammer, Koby & Singer, Yoram (2001). "On the Algorithmic Implementation of Multiclass Kernel-based Vector Machines" (PDF). Journal of Machine Learning Research. 2: 265-292. Archived (PDF) from the original on 2015 Aug. 29.
[209] Lee, Yoonkyung; Lin, Yi & Wahba, Grace (2001). "Multicategory Support Vector Machines" (PDF). Computing Science and Statistics. 33. Archived (PDF) from the original on 2013 Jun. 17.
[210] Lee, Yoonkyung; Lin, Yi; Wahba, Grace (2004). "Multicategory Support Vector Machines". Journal of the American Statistical Association. 99 (465): 67-81. CiteSeerX 10.1.1.22.1879. doi:10.1198/016214504000000098. S2CID 7066611.
[211] Van den Burg, Gerrit J. J. & Groenen, Patrick J. F. (2016). "GenSVM: A Generalized Multiclass Support Vector Machine" (PDF). Journal of Machine Learning Research. 17 (224): 1-42.
[212] Joachims, Thorsten; "Transductive Inference for Text Classification using Support Vector Machines", Proceedings of the 1999 International Conference on Machine Learning (ICML 1999), pp. 200-209.
[213] Drucker, Harris; Burges, Christ. C.; Kaufman, Linda; Smola, Alexander J.; and Vapnik, Vladimir N. (1997); "Support Vector Regression Machines", in Advances in Neural Information Processing Systems 9, NIPS 1996, 155-161, MIT Press.
[214] Suykens, Johan A. K.; Vandewalle, Joos P. L.; "Least squares support vector machine classifiers", Neural Processing Letters, vol. 9, no. 3, June 1999, pp. 293-300.
[215] Smola, Alex J.; Schölkopf, Bernhard (2004). "A tutorial on support vector regression" (PDF). Statistics and Computing. 14 (3): 199-222. CiteSeerX 10.1.1.41.1452. doi:10.1023/B:STCO.0000035301.49549.88. S2CID 15475. Archived (PDF) from the original on 2012 Jan. 31.
[216] Polson, Nicholas G.; Scott, Steven L. (2011). "Data Augmentation for Support Vector Machines". Bayesian Analysis. 6 (1): 1-23. doi:10.1214/11-BA601.
[217] Wenzel, Florian; Galy-Fajou, Theo; Deutsch, Matthaus; Kloft, Marius (2017). "Bayesian Nonlinear Support Vector Machines for Big Data". Machine Learning and Knowledge Discovery in Databases (ECML PKDD). Lecture Notes in Computer Science. 10534: 307-322. arXiv:1707.05532. Bibcode:2017arXiv170705532 W. doi:10.1007/978-3-319-71249-9_19. ISBN 978-3-319-71248-2. S2CID 4018290.
[218] Florian Wenzel; Matthäus Deutsch; Theo Galy-Fajou; Marius Kloft; "Scalable Approximate Inference for the Bayesian Nonlinear Support Vector Machine"
[219] Ferris, Michael C.; Munson, Todd S. (2002). "Interior-Point Methods for Massive Support Vector Machines" (PDF). SIAM Journal on Optimization. 13 (3): 783-804. CiteSeerX 10.1.1.216.6893. doi:10.1137/S1052623400374379. Archived (PDF) from the original on 2008 Dec. 4.
[220] Platt, John C. (1998). Sequential Minimal Optimization: A Fast Algorithm for Training Support Vector Machines (PDF). NIPS. Archived (PDF) from the original on 2015 Jul. 2.
[221] Shalev-Shwartz, Shai; Singer, Yoram; Srebro, Nathan (2007). Pegasos: Primal Estimated sub-GrAdient SOlver for SVM (PDF). ICML. Archived (PDF) from the original on 2013 Dec. 15.
[222] Fan, Rong-En; Chang, Kai-Wei; Hsieh, Cho-Jui; Wang, Xiang-Rui; Lin, Chih-Jen (2008). "LIB LINEAR: A library for large linear classification" (PDF). Journal of Machine Learning Research. 9: 1871-1874.
[223] Allen Zhu, Zeyuan; Chen, Weizhu; Wang, Gang; Zhu, Chenguang; Chen, Zheng (2009). P-packSVM: Parallel Primal grAdient desCent Kernel SVM (PDF). ICDM. Archived (PDF) from the original on 2014 Apr. 7.
[224] Fradkin, Dmitriy; Muchnik, Ilya (2006). "Support Vector Machines for Classification" (PDF). In Abello, J.; Carmode, G. (eds.). Discrete Methods in Epidemiology.

DIMACS Series in Discrete Mathematics and Theoretical Computer Science. 70. pp. 13-20.
[225] James, Gareth; Witten, Daniela; Hastie, Trevor; Tibshirani, Robert (2013). "Support Vector Machines" (PDF). An Introduction to Statistical Learning: with Applications in R. New York: Springer. pp. 337-372. ISBN 978-1-4614-7137-0.
[226] Scholkopf, Bernhard; Smola, Alexander J. (2002). Learning with Kernels. Cambridge, Mass.: MIT Press. ISBN 0-262-19475-9.
[227] Steinwart, Ingo; Christmann, Andreas (2008). Support Vector Machines. New York: Springer. ISBN 978-0-387-77241-7.
[228] Theodoridis, Sergios; Koutroumbas, Konstantinos (2009). Pattern Recognition (4th ed.). Academic Press. ISBN 978-1-59749-272-0.
[229] towardsdatascience.com/an-introduction-to-support-vector-regression-svr-a3ebc1672c2
[230] scikit-learn.org/stable/modules/generated/sklearn.svm.SVR.html
[231] en.wikipedia.org/wiki/Support-vector_machine#Regression
[232] www.saedsayad.com/support_vector_machine_reg.htm Radial Basis Function References

[233] en.wikipedia.org/wiki/Radial_basis_function
[234] Broomhead, David H.; Lowe, David (1988). "Multivariable Functional Interpolation and Adaptive Networks" (PDF). Complex Systems. 2: 321-355. Archived from the original (PDF) on 2014 Jul. 14.
[235] Michael J. D. Powell (1977). "Restart procedures for the conjugate gradient method". Mathematical Programming. 12 (1): 241-254. doi:10.1007/bf01593790. S2CID 9500591.
[236] Sahin, Ferat (1997). A Radial Basis Function Approach to a Color Image Classification Problem in a Real Time Industrial Application (M.Sc.). Virginia Tech. p. 26. hdl:10919/36847. Radial basis functions were first introduced by Powell to solve the real multivariate interpolation problem.
[237] Broomhead & Lowe 1988, p. 347: "We would like to thank Professor M. J. D. Powell at the Department of Applied Mathematics and Theoretical Physics at Cambridge University for providing the initial stimulus for this work."
[238] VanderPlas, Jake (6 May 2015). "Introduction to Support Vector Machines". [O'Reilly]. Retrieved 14 May 2015.
[239] Buhmann, Martin Dietrich (2003). Radial basis functions: theory and implementations. Cambridge University Press. ISBN 978-0511040207. OCLC 56352083.
[240] Biancolini, Marco Evangelos (2018). Fast radial basis functions for engineering applications. Springer International Publishing. ISBN 9783319750118. OCLC 1030746230.

Deep Learning References

[241] en.wikipedia.org/wiki/Deep_learning.
[242] Bengio, Y.; Courville, A.; Vincent, P. (2013). "Representation Learning: A Review and New Perspectives". IEEE Transactions on Pattern Analysis and Machine Intelligence. 35 (8): 1798-1828. arXiv:1206.5538. doi: 10.1109/tpami.2013.50. PMID 23787338. S2CID 393948.
[243] Schmidhuber, J. (2015). "Deep Learning in Neural Networks: An Overview". Neural Networks. 61: 85-117. arXiv:1404.7828. doi:10.1016/j.neunet.2014.09.003. PMID 25462637. S2CID 11715509.
[244] Bengio, Yoshua; LeCun, Yann; Hinton, Geoffrey (2015). "Deep Learning". Nature. 521 (7553): 436-444. Bibcode:2015Natur.521 . . . 436L. doi:10.1038/nature14539. PMID 26017442. S2CID 3074096.
[245] Ciresan, D.; Meier, U.; Schmidhuber, J. (2012). "Multi-column deep neural networks for image classification". 2012 IEEE Conference on Computer Vision and Pattern Recognition. pp. 3642-3649. arXiv:1202.2745. doi:10.1109/cvpr.2012.6248110. ISBN 978-1-4673-1228-8. S2CID 2161592.
[246] Krizhevsky, Alex; Sutskever, Ilya; Hinton, Geoffry (2012). "ImageNet Classification with Deep Convolutional Neural Networks" (PDF). NIPS 2012: Neural Information Processing Systems, Lake Tahoe, Nev.
[247] Marblestone, Adam H.; Wayne, Greg; Kording, Konrad P. (2016). "Toward an Integration of Deep Learning and Neuroscience". Frontiers in Computational Neuroscience. 10: 94. arXiv:1606.03813. Bibcode: 2016arXiv160603813M. doi:10.3389/fncom.2016.00094. PMC 5021692. PMID 27683554. S2CID 1994856.
[248] Olshausen, B. A. (1996). "Emergence of simple-cell receptive field properties by learning a sparse code for natural images". Nature. 381 (6583): 607-609. Bibcode: 1996Natur.381 . . . 6070. doi:10.1038/381607a0. PMID 8637596. S2CID 4358477.
[249] Bengio, Yoshua; Lee, Dong-Hyun; Bornschein, Jorg; Mesnard, Thomas; Lin, Zhouhan (2015 Feb. 13). "Towards Biologically Plausible Deep Learning". arXiv: 1502.04156 [cs.LG].
[250] Schulz, Hannes; Behnke, Sven (2012 Nov. 1). "Deep Learning". KI—Kunstliche Intelligenz. 26 (4): 357-363. doi:10.1007/s13218-012-0198-z. ISSN 1610-1987. S2CID 220523562.
[251] Deng, L.; Yu, D. (2014). "Deep Learning: Methods and Applications" (PDF). Foundations and Trends in Signal Processing. 7 (3-4): 1-199. doi:10.1561/2000000039.
[252] Bengio, Yoshua (2009). "Learning Deep Architectures for AI" (PDF). Foundations and Trends in Machine Learning. 2 (1): 1-127. CiteSeerX 10.1.1.701.9550. doi: 10.1561/2200000006. Archived from the original (PDF) on 2016 Mar. 4. Retrieved 2015 Sep. 3.
[253] LeCun, Yann; Bengio, Yoshua; Hinton, Geoffrey (28 May 2015). "Deep learning". Nature. 521 (7553): 436-444. Bibcode:2015Natur.521 . . . 436L. doi:10.1038/nature14539. PMID 26017442. S2CID 3074096.
[254] Bengio, Yoshua; Lamblin, Pascal; Popovici, Dan; Larochelle, Hugo (2007). Greedy layer-wise training of deep networks (PDF). Advances in neural information processing systems. pp. 153-160.
[255] Schmidhuber, Jurgen (2015). "Deep Learning". Scholarpedia. 10 (11): 32832. Bibcode:2015SchpJ . . . 1032832S. doi:10.4249/scholarpedia.32832.
[256] Hinton, G. E. (2009). "Deep belief networks". Scholarpedia. 4 (5): 5947. Bibcode:2009SchpJ . . . 4.5947H. doi:10.4249/scholarpedia.5947.
[257] Cybenko (1989). "Approximations by superpositions of sigmoidal functions" (PDF). Mathematics of Control, Signals, and Systems. 2 (4): 303-314. doi:10.1007/bf02551274. S2CID 3958369. Archived from the original (PDF) on 2015 Oct. 10.

[258] Hornik, Kurt (1991). "Approximation Capabilities of Multilayer Feedforward Networks". Neural Networks. 4 (2): 251-257. doi:10.1016/0893-6080(91)90009-t.

[259] Haykin, Simon S. (1999). Neural Networks: A Comprehensive Foundation. Prentice Hall. ISBN 978-0-13-273350-2.

[260] Hassoun, Mohamad H. (1995). Fundamentals of Artificial Neural Networks. MIT Press. p. 48. ISBN 978-0-262-08239-6.

[261] Lu, Z., Pu, H., Wang, F., Hu, Z., & Wang, L. (2017). The Expressive Power of Neural Networks: A View from the Width. Neural Information Processing Systems, 6231-6239.

[262] Murphy, Kevin P. (24 Aug. 2012). Machine Learning: A Probabilistic Perspective. MIT Press. ISBN 978-0-262-01802-9.

[263] Sonoda, Sho; Murata, Noboru (2017). "Neural network with unbounded activation functions is universal approximator". Applied and Computational Harmonic Analysis. 43 (2): 233-268. arXiv:1505.03654. doi:10.1016/j.acha.2015.12.005. S2CID 12149203.

[264] Hinton, G. E.; Srivastava, N.; Krizhevsky, A.; Sutskever, I.; Salakhutdinov, R. R. (2012). "Improving neural networks by preventing co-adaptation of feature detectors". arXiv:1207.0580 [math.LG].

[265] Bishop, Christopher M. (2006). Pattern Recognition and Machine Learning (PDF). Springer. ISBN 978-0-387-31073-2.

[266] Ivakhnenko, Alexey (1971). "Polynomial theory of complex systems" (PDF). IEEE Transactions on Systems, Man and Cybernetics. SMC-1 (4): 364-378. doi:10.1109/TSMC.1971.4308320.

[267] Fukushima, K. (1980). "Neocognitron: A self-organizing neural network model for a mechanism of pattern recognition unaffected by shift in position". Biol. Cybern. 36 (4): 193-202. doi:10.1007/bf00344251. PMID 7370364. S2CID 206775608.

[268] Rina Dechter (1986). Learning while searching in constraint-satisfaction problems. University of California, Computer Science Department, Cognitive Systems Laboratory. Online

[269] Igor Aizenberg, Naum N. Aizenberg, Joos P. L. Vandewalle (2000). Multi-Valued and Universal Binary Neurons: Theory, Learning and Applications. Springer Science & Business Media.

[270] Co-evolving recurrent neurons learn deep memory POMDPs. Proc. GECCO, Washington, D.C., pp. 1795-1802, ACM Press, New York, N.Y., USA, 2005.

[271] J. Weng, N. Ahuja and T. S. Huang, "Cresceptron: a self-organizing neural network which grows adaptively," Proc. International Joint Conference on Neural Networks, Baltimore, Md., vol I, pp. 576-581, June, 1992.

[272] J. Weng, N. Ahuja and T. S. Huang, "Learning recognition and segmentation of 3-D objects from 2-D images," Proc. 4th International Conf. Computer Vision, Berlin, Germany, pp. 121-128, May, 1993.

[273] J. Weng, N. Ahuja and T. S. Huang, "Learning recognition and segmentation using the Cresceptron," International Journal of Computer Vision, vol. 25, no. 2, pp. 105-139, November 1997.

[274] de Carvalho, Andre C. L. F.; Fairhurst, Mike C.; Bisset, David (1994 Aug. 8). "An integrated Boolean neural network for pattern classification". Pattern Recognition Letters. 15 (8): 807-813. doi:10.1016/0167-8655(94)90009-4.

[275] Hinton, Geoffrey E.; Dayan, Peter; Frey, Brendan J.; Neal, Radford (1995 May 26). "The wake-sleep algorithm for unsupervised neural networks". Science. 268 (5214): 1158-1161. Bibcode:1995Sci . . . 268.1158H. doi:10.1126/science.7761831. PMID 7761831.

[276] Behnke, Sven (2003). "Hierarchical Neural Networks for Image Interpretation". Lecture Notes in Computer Science. 2766. doi:10.1007/b11963. ISBN 978-3-540-40722-5. ISSN 0302-9743. S2CID 1304548.

[277] Hinton, Geoffrey E. (2007 Oct. 1). "Learning multiple layers of representation". Trends in Cognitive Sciences. 11 (10): 428-434. doi:10.1016/j.tics.2007.09.004. ISSN 1364-6613. PMID 17921042. S2CID 15066318.

[278] Hinton, G. E.; Osindero, S.; Teh, Y. W. (2006). "A Fast Learning Algorithm for Deep Belief Nets" (PDF). Neural Computation. 18 (7): 1527-1554. doi:10.1162/neco.2006.18.7.1527. PMID 16764513. S2CID 2309950.

[279] Bengio, Yoshua (2012). "Practical recommendations for gradient-based training of deep architectures". arXiv: 1206.5533 [cs.LG].

[280] G. E. Hinton., "Learning multiple layers of representation," Trends in Cognitive Sciences, 11, pp. 428-434, 2007.

[281] Yann LeCun (2016). Slides on Deep Learning Online NIPS Workshop: Deep Learning for Speech Recognition and Related Applications, Whistler, BC, Canada, December 2009 (Organizers: Li Deng, Geoff Hinton, D. Yu).

[282] Keynote talk: Recent Developments in Deep Neural Networks. ICASSP, 2013 (by Geoff Hinton).

[283] D. Yu, L. Deng, G. Li, and F. Seide (2011). "Discriminative pretraining of deep neural networks," U.S. Patent Filing.

[284] Deng, L.; Hinton, G.; Kingsbury, B. (2013). "New types of deep neural network learning for speech recognition and related applications: An overview (ICASSP)" (PDF).

[285] Sze, Vivienne; Chen, Yu-Hsin; Yang, Tien-Ju; Emer, Joel (2017). "Efficient Processing of Deep Neural Networks: A Tutorial and Survey". arXiv:1703.09039 [cs.CV].

[286] Ciresan, D. C.; Meier, U.; Masci, J.; Gambardella, L. M.; Schmidhuber, J. (2011). "Flexible, High Performance Convolutional Neural Networks for Image Classification" (PDF). International Joint Conference on Artificial Intelligence. doi:10.5591/978-1-57735-516-8/ijcai11-210.

[287] Ciresan, Dan; Giusti, Alessandro; Gambardella, Luca M.; Schmidhuber, Juergen (2012). Pereira, F.; Burges, C. J. C.; Bottou, L.; Weinberger, K. Q. (eds.). Advances in Neural Information Processing Systems 25 (PDF). Curran Associates, Inc. pp. 2843-2851.

[288] "The Wolfram Language Image Identification Project". www.imageidentify.com. Retrieved 2017 Mar. 22.

[289] Vinyals, Oriol; Toshev, Alexander; Bengio, Samy; Erhan, Dumitru (2014). "Show and Tell: A Neural Image Caption Generator". arXiv:1411.4555 [cs.CV].

[290] Fang, Hao; Gupta, Saurabh; Iandola, Forrest; Srivastava, Rupesh; Deng, Li; Dollár, Piotr; Gao, Jianfeng; He, Xiaodong; Mitchell, Margaret; Platt, John C; Lawrence Zitnick, C; Zweig, Geoffrey (2014). "From Captions to Visual Concepts and Back". arXiv:1411.4952 [cs.CV].

[291] Kiros, Ryan; Salakhutdinov, Ruslan; Zemel, Richard S (2014). "Unifying Visual-Semantic Embeddings with Multimodal Neural Language Models". arXiv:1411.2539 [cs.LG].

[292] Zhong, Sheng-hua; Liu, Yan; Liu, Yang (2011). "Bilinear Deep Learning for Image Classification". Proceedings of the 19th ACM International Conference on Multimedia. MM '11. New York, N.Y., USA: ACM: 343-352.

doi:10.1145/2072298.2072344. hdl:10397/23574. ISBN 9781450306164. S2CID 11922007.
[293] Szegedy, Christian; Toshev, Alexander; Erhan, Dumitru (2013). "Deep neural networks for object detection". Advances in Neural Information Processing Systems: 2553-2561.
[294] Sutskever, L.; Vinyals, O.; Le, Q. (2014). "Sequence to Sequence Learning with Neural Networks" (PDF). Proc. NIPS. arXiv:1409.3215. Bibcode: 2014arXiv1409.32155.
[295] "Learning Precise Timing with LSTM Recurrent Networks (PDF Download Available)". ResearchGate. Retrieved 2017 Jun. 13.
[296] LeCun, Y.; et al. (1998). "Gradient-based learning applied to document recognition". Proceedings of the IEEE. 86 (11): 2278-2324. doi:10.1109/5.726791.
[297] Bengio, Yoshua; Boulanger-Lewandowski, Nicolas; Pascanu, Razvan (2013). "Advances in optimizing recurrent networks". 2013 IEEE International Conference on Acoustics, Speech and Signal Processing. pp. 8624-8628. arXiv:1212.0901. CiteSeerX 10.1.1.752.9151. doi: 10.1109/icassp.2013.6639349. ISBN 978-1-4799-0356-6. S2CID 12485056.
[298] Dahl, G.; et al. (2013). "Improving DNNs for LVCSR using rectified linear units and dropout" (PDF). ICASSP.
[299] Hinton, G. E. (2010). "A Practical Guide to Training Restricted Boltzmann Machines". Tech. Rep. UTML TR 2010-003.
[300] You, Yang; Buluç, Aydin; Demmel, James (November 2017). "Scaling deep learning on GPU and knights landing clusters". Proceedings of the International Conference for High Performance Computing, Networking, Storage and Analysis on—SC '17. SC '17, ACM. pp. 1-12. doi:10.1145/3126908.3126912. ISBN 9781450351140. S2CID 8869270. Retrieved 5 Mar. 2018.
[301] Viebke, André; Memeti, Suejb; Pllana, Sabri; Abraham, Ajith (2019). "CHAOS: a parallelization scheme for training convolutional neural networks on Intel Xeon Phi". The Journal of Supercomputing. 75: 197-227. arXiv:1702.07908. Bibcode:2017arXiv170207908V. doi: 10.1007/s11227-017-1994-x. S2CID 14135321.
[302] Ting Qin, et al. "A learning algorithm of CMAC based on RLS." Neural Processing Letters 19.1 (2004): 49-61.
[303] Ting Qin, et al. "Continuous CMAC-QRLS and its systolic array." Neural Processing Letters 22.1 (2005): 1-16.
[304] Cirean, Dan; Meier, Ueli; Masci, Jonathan; Schmidhuber, Jurgen (August 2012). "Multi-column deep neural network for traffic sign classification". Neural Networks. Selected Papers from IJCNN 2011. 32: 333-338. CiteSeerX 10.1.1.226.8219. doi:10.1016/j.neunet.2012.02.023. PMID 22386783.
[305] Shen, Yelong; He, Xiaodong; Gao, Jianfeng; Deng, Li; Mesnil, Gregoire (2014 Nov. 1). "A Latent Semantic Model with Convolutional-Pooling Structure for Information Retrieval". Microsoft Research.
[306] Huang, Po-Sen; He, Xiaodong; Gao, Jianfeng; Deng, Li; Acero, Alex; Heck, Larry (2013 Oct. 1). "Learning Deep Structured Semantic Models for Web Search using Clickthrough Data". Microsoft Research.
[307] Brocardo, Marcelo Luiz; Traore, Issa; Woungang, Isaac; Obaidat, Mohammad S. (2017). "Authorship verification using deep belief network systems". International Journal of Communication Systems. 30 (12): e3259. doi:10.1002/dac.3259.

Signal Separation References

[308] en.wikipedia.org/wiki/Signal_separation
[309] P. Comon and C. Jutten (editors). "Handbook of Blind Source Separation, Independent Component Analysis and Applications" Academic Press, ISBN 978-2-296-12827-9
[310] P. Comon, Contrasts, Independent Component Analysis, and Blind Deconvolution, "Int. Journal Adapt. Control Sig. Proc.", Wiley, April 2004. HAL link
[311] Kevin Hughes "Blind Source Separation on Images with Shogun" shogun-toolbox.org/static/notebook/current/bss_image.html
[312] Aapo Hyvarinen, Juha Karhunen, and Erkki Oja. "Independent Component Analysis" www.cs.helsinki.fi/u/ahyvarin/papers/bookfinal_ICA.pdf pp. 147-148, pp. 410-411, pp. 441-442, p. 448
[313] Congedo, Marco; Gouy-Pailler, Cedric; Jutten, Christian (December 2008). "On the blind source separation of human electroencephalogram by approximate joint diagonalization of second order statistics". Clinical Neurophysiology. 119 (12): 2677-2686. arXiv:0812.0494. doi: 10.1016/j.clinph.2008.09.007. PMID 18993114.
[314] Jean-Francois Cardoso "Blind Signal Separation: statistical Principles" citeseerx.ist.psu.edu/viewdoc/download?doi=10.1.1.462.9738&rep=rep1&type=pdf
[315] Rui Li, Hongwei Li, and Fasong Wang. "Dependent Component Analysis: Concepts and Main Algorithms" www.jcomputers.us/vo15/jcp0504-13.pdf
[316] Shlens, Jonathon. "A tutorial on independent component analysis." arXiv:1404.2986

Principal Component Analysis References

[317] Section 4—Principal Component Analysis and Dimension Reduction, DSCI 415-Unsupervised Learning, Brant Deppa—Winona State University.
[318] en.wikipedia.org/wiki/Principal_component_analysis
[319] Hsu, Daniel; Kakade, Sham M.; Zhang, Tong (2008). A spectral algorithm for learning hidden markov models. arXiv:0811.4413. Bibcode:2008arXiv0811.4413H.
[320] Markopoulos, Panos P.; Kundu, Sandipan; Chamadia, Shubham; Pados, Dimitris A. (15 Aug. 2017). "Efficient L1-Norm Principal-Component Analysis via Bit Flipping". IEEE Transactions on Signal Processing. 65 (16): 4252-4264. arXiv:1610.01959. Bibcode:2017ITSP . . . 65.4252M. doi:10.1109/TSP.2017.2708023.
[321] Chachlakis, Dimitris G.; Prater-Bennette, Ashley; Markopoulos, Panos P. (22 Nov. 2019). "L1-norm Tucker Tensor Decomposition". IEEE Access. 7: 178454-178465. doi:10.1109/ACCESS.2019.2955134.
[322] Markopoulos, Panos P.; Karystinos, George N.; Pados, Dimitris A. (October 2014). "Optimal Algorithms for L1-subspace Signal Processing". IEEE Transactions on Signal Processing. 62 (19): 5046-5058. arXiv:1405.6785. Bibcode:2014ITSP . . . 62.5046M. doi:10.1109/TSP.2014.2338077.
[323] Kanade, T.; Ke, Qifa (June 2005). Robust L1 Norm Factorization in the Presence of Outliers and Missing Data by Alternative Convex Programming. 2005 IEEE Computer Society Conference on Computer Vision and Pattern Recognition (CVPR'05). 1. IEEE. p. 739. CiteSeerX 10.1.1.63.4605. doi:10.1109/CVPR.2005.309. ISBN 978-0-7695-2372-9.
[324] Pearson, K. (1901). "On Lines and Planes of Closest Fit to Systems of Points in Space". Philosophical Magazine. 2 (11): 559-572. doi:10.1080/14786440109462720.

[325] Hotelling, H. (1933). Analysis of a complex of statistical variables into principal components. Journal of Educational Psychology, 24, 417-441, and 498-520.

[326] Hotelling, H (1936). "Relations between two sets of variates". Biometrika. 28 (3/4): 321-377. doi:10.2307/2333955. JSTOR 2333955.

[327] Jolliffe, I. T. (2002). Principal Component Analysis. Springer Series in Statistics. New York: Springer-Verlag. doi:10.1007/b98835. ISBN 978-0-387-95442-4.

[328] Bengio, Y.; et al. (2013). "Representation Learning: A Review and New Perspectives". IEEE Transactions on Pattern Analysis and Machine Intelligence. 35 (8): 1798-1828. arXiv:1206.5538. doi:10.1109/TPAMI.2013.50. PMID 23787338. S2CID 393948.

[329] Forkman J., Josse, J., Piepho, H. P. (2019). "Hypothesis tests for principal component analysis when variables are standardized". Journal of Agricultural, Biological, and Environmental Statistics. 24 (2): 289-308. doi:10.1007/s13253-019-00355-5.

[330] A. A. Miranda, Y. A. Le Borgne, and G. Bontempi. New Routes from Minimal Approximation Error to Principal Components, Volume 27, Number 3/June, 2008, Neural Processing Letters, Springer

[331] Fukunaga, Keinosuke (1990). Introduction to Statistical Pattern Recognition. Elsevier. ISBN 978-0-12-269851-4.

[332] Leznik, M; Tofallis, C. 2005 Estimating Invariant Principal Components Using Diagonal Regression.

[333] Jonathon Shlens, A Tutorial on Principal Component Analysis.

[334] Linsker, Ralph (March 1988). "Self-organization in a perceptual network". IEEE Computer. 21 (3): 105-117. doi:10.1109/2.36. S2CID 1527671.

[335] Deco & Obradovic (1996). An Information-Theoretic Approach to Neural Computing. New York, N.Y.: Springer. ISBN 9781461240167.

[336] Plumbley, Mark (1991). Information theory and unsupervised neural networks. Tech Note

[337] Geiger, Bernhard; Kubin, Gernot (January 2013). "Signal Enhancement as Minimization of Relevant Information Loss". Proc. ITG Conf. On Systems, Communication and Coding. arXiv:1205.6935. Bibcode:2012arXiv1205.6935G.

[338] A. A. Miranda, Y.-A. Le Borgne, and G. Bontempi. New Routes from Minimal Approximation Error to Principal Components, Volume 27, Number 3/June, 2008, Neural Processing Letters, Springer

[339] Abdi. H. & Williams, L. J. (2010). "Principal component analysis". Wiley Interdisciplinary Reviews: Computational Statistics. 2 (4): 433-459. arXiv:1108.4372. doi:10.1002/wics.101.

[340] Roweis, Sam. "EM Algorithms for PCA and SPCA." Advances in Neural Information Processing Systems. Ed. Michael I. Jordan, Michael J. Kearns, and Sara A. Solla The MIT Press, 1998.

[341] Geladi, Paul; Kowalski, Bruce (1986). "Partial Least Squares Regression: vA Tutorial". Analytica Chimica Acta. 185: 1-17. doi:10.1016/0003-2670(86)80028-9.

[342] Andrecut, M. (2009). "Parallel GPU Implementation of Iterative PCA Algorithms". Journal of Computational Biology. 16 (11): 1593-1599. arXiv:0811.1081. doi:10.1089/cmb.2008.0221. PMID 19772385. S2CID 1362603.

[343] Warmuth, M. K.; Kuzmin, D. (2008). "Randomized online PCA algorithms with regret bounds that are logarithmic in the dimension" (PDF). Journal of Machine Learning Research. 9: 2287-2320.

[344] Le Roux; Brigitte and Henry Rouanet (2004). Geometric Data Analysis, From Correspondence Analysis to Structured Data Analysis. Dordrecht: Kluwer. ISBN 9781402022357.

[345] Meglen, R. R. (1991). "Examining Large Databases: A Chemometric Approach Using Principal Component Analysis". Journal of Chemometrics. 5 (3): 163-179. doi:10.1002/cem.1180050305.

[346] H. Zha; C. Ding; M. Gu; X. He; H. D. Simon (December 2001). "Spectral Relaxation for K-means Clustering" (PDF). Neural Information Processing Systems Vol. 14 (NIPS 2001): 1057-1064.

[347] Chris Ding; Xiaofeng He (July 2004). "K-means Clustering via Principal Component Analysis" (PDF). Proc. Of Int'l Conf. Machine Learning (ICML 2004): 225-232.

[348] Drineas, P.; A. Frieze; R. Kannan; S. Vempala; V. Vinay (2004). "Clustering large graphs via the singular value decomposition" (PDF). Machine Learning. 56 (1-3): 9-33. doi:10.1023/b:mach.0000033113.59016.96. S2CID 5892850. Retrieved 2012 Aug. 2.

[349] Cohen, M.; S. Elder; C. Musco; C. Musco; M. Persu (2014). Dimensionality reduction for k-means clustering and low rank approximation (Appendix B). arXiv:1410.6801. Bibcode:2014arXiv1410.6801C.

[350] Hui Zou; Trevor Hastie; Robert Tibshirani (2006). "Sparse principal component analysis" (PDF). Journal of Computational and Graphical Statistics. 15 (2): 262-286. CiteSeerX 10.1.1.62.580. doi:10.1198/106186006×113430. S2CID 5730904.

[351] Alexandre d'Aspremont; Laurent El Ghaoui; Michael I. Jordan; Gert R. G. Lanckriet (2007). "A Direct Formulation for Sparse PCA Using Semidefinite Programming" (PDF). SIAM Review. 49 (3): 434-448. arXiv:cs/0406021. doi:10.1137/050645506. S2CID 5490061.

[352] Michel Journee; Yurii Nesterov; Peter Richtarik; Rodolphe Sepulchre (2010). "Generalized Power Method for Sparse Principal Component Analysis" (PDF). Journal of Machine Learning Research. 11: 517-553. arXiv:0811.4724. Bibcode:2008arXiv0811.4724J. CORE Discussion Paper 2008/70.

[353] Peter Richtarik; Martin Takac; S. Damla Ahipasaoglu (2012). "Alternating Maximization: Unifying Framework for 8 Sparse PCA Formulations and Efficient Parallel Codes". arXiv:1212.4137 [stat.ML].

[354] Baback Moghaddam; Yair Weiss; Shai Avidan (2005). "Spectral Bounds for Sparse PCA: Exact and Greedy Algorithms" (PDF). Advances in Neural Information Processing Systems. 18. MIT Press.

[355] Yue Guan; Jennifer Dy (2009). "Sparse Probabilistic Principal Component Analysis" (PDF). Journal of Machine Learning Research Workshop and Conference Proceedings. 5: 185.

[356] Hui Zou; Lingzhou Xue (2018). "A Selective Overview of Sparse Principal Component Analysis". Proceedings of the IEEE. 106 (8): 1311-1320. doi:10.1109/JPROC 0.2018.2846588.

[357] A. N. Gorban, B. Kegl, D. C. Wunsch, A. Zinovyev (Eds.), Principal Manifolds for Data Visualisation and Dimension Reduction, LNCSE 58, Springer, Berlin-Heidelberg-New York, 2007. ISBN 978-3-540-73749-0

[358] Lu, Haiping; Plataniotis, K. N.; Venetsanopoulos, A. N. (2011). "A Survey of Multilinear Subspace Learning for Tensor Data" (PDF). Pattern Recognition. 44 (7): 1540-1551. doi:10.1016/j.patcog.2011.01.004.

[359] Kriegel, H. P.; Kroger, P.; Schubert, E.; Zimek, A. (2008). A General Framework for Increasing the Robustness of PCA-Based Correlation Clustering Algorithms. Scientific and Statistical Database Management. Lecture Notes in Computer Science. 5069. pp. 418-435. CiteSeerX 10.1.1.144.4864. doi:10.1007/978-3-540-69497-7_27. ISBN 978-3-540-69476-2.

[360] Emmanuel J. Candes; Xiaodong Li; Yi Ma; John Wright (2011). "Robust Principal Component Analysis?". Journal of the ACM. 58 (3): 11. arXiv:0912.3599. doi: 10.1145/1970392.1970395. S2CID 7128002.

[361] T. Bouwmans; E. Zahzah (2014). "Robust PCA via Principal Component Pursuit: A Review for a Comparative Evaluation in Video Surveillance". Computer Vision and Image Understanding. 122: 22-34. doi:10.1016/j.cviu.2013.11.009.

[362] T. Bouwmans; A. Sobral; S. Javed; S. Jung; E. Zahzah (2015). "Decomposition into Low-rank plus Additive Matrices for Background/Foreground Separation: A Review for a Comparative Evaluation with a Large-Scale Dataset". Computer Science Review. 23: 1-71. arXiv: 1511.01245. Bibcode:2015arXiv151101245B. doi: 10.1016/j.cosrev.2016.11.001. S2CID 10420698.

[363] "Principal Components Analysis". Institute for Digital Research and Education. UCLA. Retrieved 29 May 2018.

Independent Component Analysis References

[364] en.wikipedia.org/wiki/Independent_component_analysis

[365] Hyvarinen, Aapo (2013). "Independent component analysis: recent advances". Philosophical Transactions: Mathematical, Physical and Engineering Sciences. 371 (1984): 20110534. Bibcode:2012RSPTA.37110534H. doi:10.1098/rsta.2011.0534. ISSN 1364-503X. JSTOR 41739975. PMC 3538438. PMID 23277597.

[366] Isomura, Takuya; Toyoizumi, Taro (2016). "A local learning rule for independent component analysis". Scientific Reports. 6: 28073. Bibcode:2016NatSR . . . 628073I. doi:10.1038/srep28073. PMC 4914970. PMID 27323661.

[367] Stone, James V. (2004). Independent component analysis: a tutorial introduction. Cambridge, Mass.: MIT Press. ISBN 978-0-262-69315-8.

[368] Hyvarinen, Aapo; Karhunen, Juha; Oja, Erkki (2001). Independent component analysis (1st ed.). New York: John Wiley & Sons. ISBN 978-0-471-22131-9.

[369] Johan Himbergand Aapo Hyvarinen, Independent Component Analysis For Binary Data: An Experimental Study, Proc. Int. Workshop on Independent Component Analysis and Blind Signal Separation (ICA2001), San Diego, Calif., 2001.

[370] Huy Nguyen and Rong Zheng, Binary Independent Component Analysis With or Mixtures, IEEE Transactions on Signal Processing, Vol. 59, Issue 7. (July 2011), pp. 3168-3181.

[371] Painsky, Amichai; Rosset, Saharon; Feder, Meir (2014). Generalized Binary Independent Component Analysis. IEEE International Symposium on Information Theory (ISIT), 2014. pp. 1326-1330. doi:10.1109/ISIT.2014.6875048. ISBN 978-1-4799-5186-4. S2CID 18579555.

[372] James V. Stone (2004); "Independent Component Analysis: A Tutorial Introduction", The MIT Press Cambridge, Mass., London, England; ISBN 0-262-69315-1

[373] Kruskal, J B. 1969; "Toward a practical method which helps uncover the structure of a set of observations by finding the line transformation which optimizes a new "index of condensation", Pages 427-440 of: Milton, R C, & Nelder, J A (eds), Statistical computation; New York, Academic Press.

Linear Discriminant Analysis References

[374] Fisher, R. A. (1936). "The Use of Multiple Measurements in Taxonomic Problems" (PDF). Annals of Eugenics. 7 (2): 179-188. doi:10.1111/j.1469-1809.1936.tb02137.x. hdl:2440/15227.

[375] McLachlan, G. J. (2004). Discriminant Analysis and Statistical Pattern Recognition. Wiley Interscience. ISBN 978-0-471-69115-0. MR 1190469.

[376] Analyzing Quantitative Data: An Introduction for Social Researchers, Debra Wetcher-Hendricks, p.288

[377] Martinez, A. M.; Kak, A. C. (2001). "PCA versus LDA" (PDF). IEEE Transactions on Pattern Analysis and Machine Intelligence. 23 (=2): 228-233. doi:10.1109/34.908974.

[378] Abdi, H. (2007) "Discriminant correspondence analysis." In: N. J. Salkind (Ed.): Encyclopedia of Measurement and Statistic. Thousand Oaks (Calif.): Sage. pp. 270-275.

[379] Perriere, G.; Thioulouse, J. (2003). "Use of Correspondence Discriminant Analysis to predict the subcellular location of bacterial proteins". Computer Methods and Programs in Biomedicine. 70 (2): 99-105. doi:10.1016/s0169-2607(02)00011-1. PMID 12507786.

[380] Bökeoğlu Çokluk, Ö, & Büyüköztürk, S. (2008). Discriminant function analysis: Concept and application. Eğitim araştirmalari dergisi, (33), 73-92.

[381] Cohen et al. Applied Multiple Regression/Correlation Analysis for the Behavioural Sciences 3rd ed. (2003). Taylor & Francis Group.

[382] Green, S. B. Salkind, N. J. & Akey, T. M. (2008). Using SPSS for Windows and Macintosh: Analyzing and understanding data. New Jersey: Prentice Hall.

[383] Venables, W. N.; Ripley, B. D. (2002). Modern Applied Statistics with S (4th ed.). Springer Verlag. ISBN 978-0-387-95457-8.

[384] Lachenbruch, P. A. (1975). Discriminant analysis. NY: Hafner

[385] Klecka, William R. (1980). Discriminant analysis. Quantitative Applications in the Social Sciences Series, No. 19. Thousand Oaks, Calif.: Sage Publications.

[386] Hardle, W., Simar, L. (2007). Applied Multivariate Statistical Analysis. Springer Berlin Heidelberg. pp. 289-303.

[387] Garson, G. D. (2008). Discriminant function analysis. web.archive.org/web/20080312065328/www2.chass.ncsu.edu/garson/pA765/discrim.htm.

[388] Hardle, W., Simar, L. (2007). Applied Multivariate Statistical Analysis. Springer Berlin Heidelberg. pp. 289-303.

[389] Israel, Steven A. (June 2006). "Performance Metrics: How and When". Geocarto International. 21 (2): 23-32. doi:10.1080/10106040608542380. ISSN 1010-6049. S2CID 122376081.

[390] Garson, G. D. (2008). Discriminant function analysis. "Archived copy". Archived from the original on 2008-03-12. Retrieved 2008 Mar. 4.

[391] Rao, R. C. (1948). "The utilization of multiple measurements in problems of biological classification". Journal of the Royal Statistical Society, Series B. 10 (2): 159-203. JSTOR 2983775.

[392] Aliyari Ghassabeh, Youness; Rudzicz, Frank; Moghaddam, Hamid Abrishami (2015 Jun. 1). "Fast

[393] Chatterjee, C.; Roychowdhury, V. P. (1997 May 1). "On self-organizing algorithms and networks for class-separability features". IEEE Transactions on Neural Networks. 8 (3): 663-678. doi:10.1109/72.572105. ISSN 1045-9227. PMID 18255669.

[394] Demir, G. K.; Ozmehmet, K. (2005 Mar. 1). "Online Local Learning Algorithms for Linear Discriminant Analysis". Pattern Recogn. Lett. 26 (4): 421-431. doi: 10.1016/j.patrec.2004.08.005. ISSN 0167-8655.

[395] Yu, H.; Yang, J. (2001). "A direct LDA algorithm for high-dimensional data with application to face recognition". Pattern Recognition. 34 (10): 2067-2069. CiteSeerX 10.1.1.70.3507. doi:10.1016/s0031-3203(00)00162-x.

[396] Friedman, J. H. (1989). "Regularized Discriminant Analysis" (PDF). Journal of the American Statistical Association. 84 (405): 165-175. CiteSeerX 10.1.1.382.2682. doi:10.2307/2289860. JSTOR 2289860. MR 0999675.

[397] Ahdesmäki, M.; Strimmer, K. (2010). "Feature selection in omics prediction problems using cat scores and false nondiscovery rate control". Annals of Applied Statistics. 4 (1): 503-519. arXiv:0903.2003. doi:10.1214/09-aoas277. S2CID 2508935.

[398] Preisner, O; Guiomar, R; Machado, J; Menezes, J C; Lopes, J A (2010). "Application of Fourier transform infrared spectroscopy and chemometrics for differentiation of *Salmonella enterica* serovar *Enteritidis* phage types". Appl Environ Microbiol. 76 (11): 3538-3544. doi:10.1128/aem.01589-09. PMC 2876429. PMID 20363777.

[399] David, D E; Lynne, A M; Han, J; Foley, S L (2010). "Evaluation of virulence factor profiling in the characterization of veterinary *Escherichia coli* isolates". Appl Environ Microbiol. 76 (22): 7509-7513. doi:10.1128/aem.00726-10. PMC 2976202. PMID 20889790.

[400] Tahmasebi, P.; Hezarkhani, A.; Mortazavi, M. (2010). "Application of discriminant analysis for alteration separation; sungun copper deposit, East Azerbaijan, Iran. Australian" (PDF). Journal of Basic and Applied Sciences. 6 (4): 564-576.

[401] Trevor Hastie; Robert Tibshirani; Jerome Friedman. The Elements of Statistical Learning. Data Mining, Inference, and Prediction (second ed.). Springer. p. 128.

[402] Kainen P. C. (1997) Utilizing geometric anomalies of high dimension: When complexity makes computation easier. In: Kárný M., Warwick K. (eds) Computer Intensive Methods in Control and Signal Processing: The Curse of Dimensionality, Springer, 1997, pp. 282-294.

[403] Donoho, D., Tanner, J. (2009) Observed universality of phase transitions in high-dimensional geometry, with implications for modern data analysis and signal processing, Phil. Trans. R. Soc. A 367, 4273-4293.

[404] Gorban, Alexander N.; Golubkov, Alexander; Grechuck, Bogdan; Mirkes, Evgeny M.; Tyukin, Ivan Y. (2018). "Correction of AI systems by linear discriminants: Probabilistic foundations". Information Sciences. 466: 303-322. arXiv:1811.05321. doi:10.1016/j.ins.2018.07.040. S2CID 52876539.

[405] Guedon, O., Milman, E. (2011) Interpolating thin-shell and sharp large-deviation estimates for isotropic log-concave measures, Geom. Funct. Anal. 21 (5), 1043-1068.

[406] Gorban, Alexander N.; Makarov, Valeri A.; Tyukin, Ivan Y. (July 2019). "The unreasonable effectiveness of small neural ensembles in high-dimensional brain". Physics of Life Reviews. 29: 55-88. arXiv:1809.07656. doi: 10.1016/j.plrev.2018.09.005. PMID 30366739.

Common Spatial Pattern References

[407] en.wikipedia.org/wiki/Common_spatial_pattern

[408] Zoltan J. Koles, Michael S. Lazaret and Steven Z. Zhou, "Spatial patterns underlying population differences in the background EEG", Brain topography, Vol. 2 (4) pp. 275-284, 1990

[409] S. Boudet, "Filtrage d'artefacts par analyse multicomposantes de l'électroencephalogramme de patients épileptiques.", PhD. Thesis: Unviversité de Lille 1, July 2008

[410] Y. Wang, "Reduction of cardiac artifacts in magnetoencephalogram." Proc. of the 12th Int. Conf. on Biomagnetism, 2000

[411] G. Pfurtscheller, C. Guger and H. Ramoser "EEG-based brain-computer interface using subject-specific spatial filters", Engineering applications of bio-inspired artificial neural networks, Lecture Notes in Computer Science, 1999, Vol. 1607/1999, pp. 248-254

[412] M. Congedo, L. Korczowski, A. Delorme and F. Lopes da Silva, "Spatio-temporal common pattern: A companion method for ERP analysis in the time domain", Journal of Neuroscience Methods, Vol. 267, pp. 74-88, 2016.

See, U.S. Patent Pub. App. Nos. 20080181508; 20080201282; 20120082384; 20130182130; 20140058755; 20140068740; 20140085501; 20140089001; 20140300758; 20140307076; 20140355861; 20140357312; 20140366113; 20150002682; 20150125049; 20150142466; 20150142704; 20150163345; 20150178554; 20150193718; 20150262496; 20150286858; 20150286873; 20150379253; 20160055307; 20160078339; 20160092764; 20160117587; 20160117593; 20160125274; 20160127641; 20160132789; 20160180183; 20160188902; 20160189010; 20160196758; 20160203525; 20160210518; 20160210533; 20160217157; 20160259994; 20160275341; 20160313801; 20160314345; 20160321633; 20160321671; 20160323274; 20160342865; 20160350649; 20160358314; 20160371546; 20160379092; 20160379505; 20170011258; 20170024611; 20170046562; 20170053169; 20170061249; 20170061625; 20170068647; 20170068888; 20170076179; 20170083752; 20170083762; 20170085774; 20170095192; 20170098122; 20170098124; 20170105668; 20170109571; 20170116467; 20170124894; 20170132495; 20170132496; 20170132511; 20170140213; 20170148222; 20170148223; 20170154211; 20170155631; 20170171614; 20170177943; 20170185871; 20170193011; 20170193315; 20170193480; 20170206691; 20170213112; 20170229149; 20170235824; 20170236006; 20170236337; 20170237961; 20170238859; 20170238860; 20170244908; 20170249306; 20170255648; 20170255837; 20170255923; 20170255941; 20170255942; 20170256254; 20170263030; 20170264578; 20170270593; 20170277363; 20170278122; 20170278289; 20170287225; 20170289234; 20170293480; 20170294000; 20170300750; 20170300784; 20170301108; 20170308734; 20170309079; 20170312614; 20170323481; 20170323485; 20170330029; 20170330059; 20170330264; 20170337438; 20170337742; 20170339093; 20170344860; 20170344900; 20170351905; 20170351909; 20170357847; 20170357851; 20170357866; 20170357877; 20170359570; 20170360323; 20170364733; 20170366896; 20170371856; 20170372046; 20170372202; 20170372364; 20170372487; 20170372505; 20180005445; 20180007337; 20180011865; 20180011866; 20180011867; 20180012072; 20180012080;

20180012082; 20180012110; 20180012330; 20180014382; 20180015282; 20180018508; 20180018515; 20180028364; 20180032798; 20180035938; 20180039745; 20180039866; 20180043829; 20180043902; 20180045963; 20180046851; 20180046869; 20180046870; 20180047288; 20180047395; 20180052876; 20180052908; 20180052928; 20180052929; 20180053102; 20180053103; 20180053108; 20180053233; 20180060466; 20180060468; 20180060469; 20180060649; 20180060724; 20180063482; 20180068019; 20180068031; 20180068198; 20180074493; 20180075292; 20180075293; 20180075483; 20180075659; 20180082107; 20180082172; 20180082212; 20180082304; 20180083901; 20180088340; 20180088677; 20180089493; 20180089505; 20180089534; 20180089540; 20180089543; 20180095619; 20180096196; 20180096226; 20180096457; 20180096503; 20180107682; 20180107684; 20180107685; 20180107902; 20180107917; 20180108066; 20180108165; 20180114017; 20180114219; 20180121560; 20180121748; 20180121762; 20180121767; 20180122114; 20180124299; 20180124300; 20180129869; 20180130324; 20180136486; 20180137551; 20180137678; 20180143635; 20180144214; 20180144242; 20180144243; 20180144465; 20180144466; 20180144649; 20180144746; 20180150681; 20180150684; 20180150740; 20180157398; 20180157465; 20180157681; 20180157916; 20180157923; 20180157939; 20180158159; 20180158197; 20180158210; 20180158246; 20180160982; 20180165508; 20180165596; 20180173572; 20180173942; 20180174348; 20180174586; 20180181445; 20180181446; 20180181592; 20180189111; 20180189112; 20180189113; 20180189215; 20180189227; 20180189229; 20180189236; 20180189238; 20180189424; 20180189544; 20180189568; 20180189581; 20180189641; 20180189642; 20180189652; 20180196432; 20180196587; 20180197624; 20180199025; 20180199870; 20180201273; 20180204111; 20180211107; 20180211117; 20180211135; 20180211152; 20180217429; 20180218275; 20180219814; 20180225032; 20180225519; 20180225551; 20180232566; 20180233132; 20180239650; 20180239651; 20180239975; 20180246762; 20180247189; 20180247191; 20180247201; 20180253816; 20180253817; 20180253818; 20180253865; 20180255290; 20180259960; 20180260417; 20180260643; 20180260668; 20180260801; 20180260975; 20180261203; 20180267951; 20180268280; 20180268290; 20180268595; 20180268812; 20180276231; 20180276259; 20180276479; 20180276489; 20180276495; 20180285456; 20180285682; 20180286428; 20180286520; 20180288182; 20180288431; 20180289334; 20180292092; 20180293552; 20180293664; 20180293754; 20180293755; 20180293806; 20180295081; 20180295396; 20180300556; 20180300751; 20180300927; 20180303397; 20180303581; 20180307303; 20180307899; 20180307912; 20180307916; 20180308005; 20180314406; 20180314416; 20180314941; 20180315076; 20180315188; 20180315213; 20180316643; 20180316860; 20180322365; 20180322908; 20180330178; 20180330536; 20180335776; 20180336226; 20180336332; 20180336401; 20180336415; 20180336440; 20180336463; 20180336464; 20180337994; 20180341838; 20180341861; 20180341878; 20180342050; 20180342322; 20180348861; 20180349508; 20180349702; 20180349939; 20180350071; 20180350150; 20180351786; 20180351956; 20180356967; 20180357286; 20180357501; 20180364966; 20180365270; 20180365372; 20180365772; 20180365828; 20180365874; 20180365901; 20180366225; 20180367626; 20180367752; 20180367774; 20180373328; 20180373696; 20180373958; 20180373975; 20180373983; 20180373984; 20180373985; 20180374099; 20180374105; 20180374199; 20180374242; 20190005021; 20190005024; 20190005195; 20190005200; 20190005313; 20190005355; 20190005629; 20190005976; 20190007894; 20190011703; 20190012170; 20190012403; 20190012599; 20190012654; 20190014884; 20190019012; 20190019063; 20190019068; 20190019575; 20190025773; 20190026155; 20190026538; 20190026548; 20190026563; 20190026608; 20190026864; 20190028829; 20190034235; 20190034706; 20190034716; 20190034735; 20190034765; 20190034897; 20190034976; 20190035104; 20190035159; 20190035381; 20190036856; 20190041197; 20190042833; 20190042851; 20190042854; 20190042867; 20190042870; 20190042884; 20190042894; 20190042900; 20190043177; 20190043201; 20190043209; 20190043217; 20190043351; 20190043514; 20190043521; 20190044703; 20190045169; 20190045207; 20190050683; 20190050774; 20190050987; 20190051179; 20190057299; 20190057356; 20190060602; 20190065460; 20190065626; 20190065835; 20190065856; 20190065867; 20190065901; 20190065906; 20190065970; 20190066225; 20190066328; 20190066733; 20190068996; 20190069147; 20190073547; 20190073562; 20190078142; 20190079920; 20190079921; 20190080003; 20190080148; 20190080243; 20190080448; 20190080474; 20190080498; 20190080692; 20190080794; 20190081476; 20190082229; 20190087544; 20190087660; 20190087661; 20190087686; 20190087690; 20190087726; 20190087729; 20190087973; 20190095703; 20190095716; 20190095736; 20190095787; 20190095946; 20190096073; 20190102531; 20190102640; 20190102873; 20190102905; 20190107845; 20190108436; 20190108447; 20190110103; 20190114302; 20190114487; 20190114533; 20190114548; 20190114818; 20190114824; 20190115097; 20190116150; 20190121808; 20190122082; 20190122092; 20190122146; 20190122373; 20190122409; 20190122411; 20190124079; 20190129887; 20190129888; 20190130165; 20190130167; 20190130172; 20190130202; 20190130208; 20190130214; 20190130275; 20190130292; 20190130580; 20190130583; 20190130594; 20190130622; 20190132629; 20190132709; 20190133510; 20190138554; 20190138555; 20190138569; 20190138656; 20190138787; 20190138854; 20190138907; 20190146997; 20190146998; 20190147125; 20190147224; 20190147296; 20190147305; 20190147366; 20190147607; 20190147614; 20190147709; 20190147875; 20190149725; 20190149736; 20190149752; 20190150857; 20190152492; 20190155313; 20190156112; 20190156193; 20190156206; 20190156210; 20190156217; 20190156477; 20190156484; 20190156506; 20190158784; 20190159737; 20190162549; 20190163870; 20190163959; 20190163977; 20190164050; 20190164173; 20190164197; 20190164285; 20190164312; 20190164322; 20190164341; 20190166141; 20190171690; 20190171868; 20190171871; 20190171876; 20190171886; 20190171916; 20190172197; 20190172224; 20190172243; 20190172245; 20190172458; 20190172462; 20190179861; 20190180083; 20190180084; 20190180153; 20190180409; 20190180438; 20190180469; 20190180499; 20190180586; 20190182455; 20190188240; 20190188493; 20190188524; 20190188562; 20190188567; 20190188830; 20190188895; 20190188899; 20190190538; 20190190908; 20190197021; 20190197328; 20190197330; 20190197354; 20190197357; 20190197362; 20190197369; 20190197789; 20190198057; 20190200746; 20190200888; 20190201691; 20190205616; 20190205618; 20190205620; 20190205659; 20190205735; 20190206091; 20190212749; 20190212815; 20190213212; 20190213314; 20190213390; 20190213392; 20190213393; 20190213418; 20190213421; 20190213429; 20190213435; 20190213441; 20190213462; 20190213474; 20190213497; 20190213523; 20190213534; 20190213535; 20190213545; 20190213546; 20190213563; 20190213689; 20190213752; 20190213772; 20190213804; 20190215424; 20190216334; 20190220652; 20190220653; 20190220665; 20190220697; 20190220698; 20190220975; 20190220983; 20190221001;

20190222830; 20190224441; 20190228231; 20190228273; 20190230253; 20190235729; 20190236273; 20190236342; 20190236450; 20190236452; 20190236531; 20190236609; 20190236738; 20190237044; 20190238568; 20190243371; 20190243448; 20190243865; 20190244092; 20190244347; 20190244348; 20190244386; 20190246075; 20190246130; 20190247662; 20190248487; 20190250601; 20190250622; 20190250640; 20190251337; 20190251369; 20190251376; 20190251395; 20190251674; 20190253270; 20190253614; 20190258251; 20190258851; 20190258866; 20190258878; 20190258885; 20190258919; 20190258920; 20190258921; 20190259284; 20190259378; 20190259473; 20190260204; 20190265703; 20190265783; 20190266015; 20190266391; 20190266404; 20190266418; 20190266450; 20190266451; 20190266479; 20190266485; 20190266701; 20190266784; 20190266796; 20190268660; 20190268716; 20190269224; 20190272415; 20190272547; 20190272636; 20190274523; 20190278434; 20190278976; 20190278994; 20190279011; 20190279021; 20190279046; 20190279768; 20190281093; 20190281104; 20190283762; 20190285881; 20190286153; 20190286242; 20190286889; 20190286936; 20190286947; 20190286972; 20190286973; 20190286980; 20190286987; 20190287114; 20190287139; 20190287309; 20190287512; 20190289258; 20190289359; 20190289372; 20190289986; 20190291277; 20190291720; 20190294631; 20190294860; 20190294868; 20190294869; 20190294889; 20190294961; 20190295151; 20190295223; 20190295252; 20190295282; 20190296540; 20190297461; 20190302310; 20190302761; 20190303651; 20190303684; 20190303715; 20190303759; 20190303765; 20190304104; 20190304118; 20190304156; 20190304595; 20190304604; 20190306566; 20190311098; 20190311099; 20190311183; 20190311184; 20190311260; 20190311261; 20190313086; 20190318153; 20190318156; 20190318171; 20190318262; 20190318491; 20190324458; 20190324527; 20190324553; 20190324780; 20190325042; 20190325080; 20190325081; 20190325084; 20190325200; 20190325203; 20190325256; 20190325259; 20190325263; 20190325273; 20190325276; 20190325317; 20190325633; 20190325653; 20190325863; 20190325914; 20190326018; 20190327330; 20190327331; 20190327486; 20190327501; 20190329364; 20190332869; 20190332901; 20190332926; 20190333233; 20190333507; 20190339784; 20190340190; 20190340314; 20190340419; 20190340470; 20190340492; 20190340499; 20190340803; 20190341025; 20190341050; 20190341152; 20190342235; 20190347388; 20190347518; 20190347522; 20190347536; 20190347813; 20190350514; 20190354173; 20190354174; 20190354344; 20190354744; 20190354797; 20190354829; 20190354879; 20190355180; 20190355193; 20190355351; 20190355474; 20190356679; 20190357615; 20190362058; 20190362130; 20190362132; 20190362149; 20190362233; 20190362506; 20190362514; 20190362529; 20190362557; 20190362707; 20190364039; 20190366153; 20190369974; 20190370288; 20190370529; 20190370532; 20190370577; 20190370578; 20190370580; 20190370581; 20190370652; 20190370665; 20190370695; 20190371028; 20190371145; 20190373264; 20190377345; 20190377487; 20190377819; 20190377840; 20190377957; 20190378010; 20190378037; 20190378049; 20190378050; 20190378051; 20190378171; 20190378316; 20190378423; 20190379682; 20190379683; 20190379818; 20190380792; 20190381401; 20190384303; 20190384304; 20190384790; 20190384954; 20190384967; 20190385239; 20190385338; 20190385430; 20190385600; 20190385711; 20190387168; 20190390392; 20190391972; 20190392122; 20190392128; 20190392195; 20190392196; 20190392212; 20190392230; 20190392266; 20190392297; 20190392305; 20190392643; 20190392729; 20190392852; 20190394057; 20190394153; 20190394276; 20190394420; 20200000552; 20200003482; 20200004808; 20200005060; 20200005088; 20200005138; 20200005142; 20200005789; 20200005794; 20200007512; 20200402342; 20200394281; 20200327410; 20200327310; 20200302609; 20200285683; 20200264758; 20200259862; 20200233060; 20200210956; 20200184053; 20200175737; 20200162266; 20200162236; 20200160502; 20200145436; 20200092301; 20200065526; 20200012806; 20190391972; 20190197789; 20190179861; 20190164173; 20180349702; 20180114017; U.S. Pat. Nos. 10,860,692; 10,817,134; 10,810,725; 10,803,646; 10,747,837; 10,715,329; 10,671,838; 10,671,240; 10,658,005; and 10,552,667.

TABLE 1

Image Forensics. Recent approaches with their reported accuracies on the corresponding datasets.

| Ref. | Accuracy | Dataset | Limitation |
|---|---|---|---|
| [20] | 98% | Own, NA | only [57] |
| [20] | 95% | FF [2] | only [37] |
| [45] | 93.99 AUROC | celebA [58] & [9] | image only |
| [46] | 97.1% | Own, NA | unpaired |
| [47] | 99.60% | FF [2] | only [37] & image only |
| [47] | 46.39% ERR | Own, NA | only [59] & [60], image only |
| [48] | 92% | Own, NA | image only |
| [49] | 0.927 AUC | Own, NA | only [59] & [60], image only |
| [51] | 0.851 AUC | Own, NA | image only |
| [51] | 0.866 AUC | FF [2] | image only |
| [52] | 24.74% EER | temp. vidTimit [61] | audio only |
| [52] | 33.86% EER | temp. AMI [62] | audio only |
| [52] | 14.12% EER | temp, grid [63] | audio only |
| [22] | 99% | Own, NA | only 50 videos |
| [50] | 99% | FF [2] | only [37] & image only |
| [55] | 97% | UADFV [56] | only [56] & image only |
| [55] | 99.9% | DF-TIMIT [64] | only [64] & image only |
| [21] | 0.95 AUC | Own, NA | person dependent |
| [56] | 0.974 AUROC | UADFV [56] | only [56] & image only |

TABLE 2

Signal Definitions. Signals used in all analysis

| Symbol | Signal |
|---|---|
| $S$ | $\{G_L, G_R, G_M, C_L, C_R, C_M\}$ |
| $S_C$ | $\{C_L, C_R, C_M\}$ |
| $D$ | $\{|C_L - G_L|, |C_R - G_R|, |C_M - G_M|\}$ |
| $D_C$ | $\{|C_L - C_M|, |C_L - C_R|, |C_R - C_M|\}$ |

TABLE 3

Transformation Definitions. Transformation functions used throughout the analysis of signals specified in Table 2.

| | |
|---|---|
| $A(S)$ | autocorrelation |
| $\hat{A}(S)$ | spectral autocorrelation |
| $\varphi(S_x, S_y)$ | cross correlation |
| $P(S)$ | power spectral density |
| $A_P(S_C)$ | pairwise cross spectral densities |
| $L(S)$ | log scale |
| $X(S)$ | discrete cosine transform |
| $W(S)$ | Wavelet transform |
| $Y(S)$ | Lyapunov function [80] |
| $G(S)$ | Gabor-Wigner transform [81] |

TABLE 4

Feature Sets. Feature sets (left) from all experiments are explained (middle) and documented by a reference (right).

| Feature | Explanation | Reference |
|---|---|---|
| $F_1$ | mean and maximum of cross spectral density | Sec. 3.3 |
| $F_2$ | RMS of differences, std., mean of absolute differences, ratio of negative differences, zero crossing rate, avg. prominence of peaks, std. prominence of peaks, avg. peak width, std. peak width, max./min. derivative, mean derivative, mean spectral centroid | [82] |
| $F_3$ | nb of narrow pulses in spectral autocorrelation, nb of spectral lines in spectral autocorrelation, average energy of narrow pulses, max. spectral autocorrelation | [83] |
| $F_4$ | std., std. of mean values of 1 sec windows, RMS of 1 sec differences, mean std. of differences std. of differences, mean of autocorrelation, Shannon entropy | [84] |
| $F_5$ | first n Wavelet coefficients W (S) | [80], [85] |
| $F_6$ | largest n Lyapunov exponents Y (S) | [80] |
| $F_7$ | max. of spectral power density of normalized centered instantaneous amplitude, std. of abs. value of the centered non-linear component of instantaneous phase, std. of centered non-linear component of direct instantaneous phase, std. of abs. value of normalized centered instantaneous amplitude, kurtosis of the normalized instantaneous amplitude | [86] |
| $F_8$ | log scale power of delta (1-4 HZ), theta (4-8 HZ) and alpha (8-13 HZ) bands | [87] |
| $F_9$ | mean amplitude of high frequency signals, slope of PSD curves between high and low frequencies, variance of inter-peak distances | [88] |

TABLE 5

Experiments. < Fn from 2> (<transformation from 1> (<signal from 1>)) (left), size of feature vector (middle), and segment classification accuracy (right) of some experiments.

| F | \|f\| | f~ |
|---|---|---|
| $F_3(\hat{A}(S))$ | 4 × 6 | 67.55% |
| $F_6(L(S))$ | 600 | 69.04% |
| $F_4(\log(S))$ | 60 | 69.07% |
| $F_2(S)$ | 13 × 6 | 69.26% |
| $F_5(P(W(S)))$ | 390 | 69.63% |
| $F_4(S) \cup$ | 6 × 6 + | |
| $F_3(\log(S)) \cup$ | 4 × 6 + | 71.34% |
| $\mu_{Ap(D_C)}$ | 3 | |
| $F_4(\log(S) \cup A_P(D_C)) \cup$ | 6 × 9 + | |
| $\cup F_1(\log(DC)) \cup$ | 6 + | 72.01% |
| $F_3(\log(S) \cup A_p(D_C))$ | 4 × 9 | |

TABLE 6

Comparison. Detection accuracies of several networks trained on images, face images, and videos. The next best after the present approach is 8.85% less accurate.

| Model | Frame | Face | Video |
|---|---|---|---|
| Simple CNN | 46.89% | 54.56% | 48.88% |
| InceptionV3 | 73.85% | 60.96% | 68.88% |
| Xception | 78.67% | 56.11% | 75.55% |
| ConvLSTM | 47.65% | 44.82% | 48.83% |
| [39] V1 | 86.26% | — | 82.22% |
| [39] V3 | 76.97% | — | 73.33% |
| [39] ensemble | 83.18% | — | 80.00% |
| Ours | — | 87.62% | 91.07% |

TABLE 7

Classification Results on DF. Accuracies with $\omega = 128$, on DF dataset, and train/test split of 60/40.

| Feature set | Signal | # features | Accuracy |
|---|---|---|---|
| $F_6$ | S | 600 | 43.22 |
| F12 | S | 12 | 43.41 |
| $F_3$ | log(S) | 24 | 43.81 |
| $F_6$ | log(S) | 600 | 43.81 |
| F12 | S | 12 | 43.61 |
| $F_3$ | S | 24 | 45.57 |
| $F_4$ | log(S) | 36 | 48.13 |
| $F_7$ | S | 30 | 48.52 |
| $F_4 F_3 F_1$ | log(S) × 2, log($D_C$), | 96 | 54.02 |
| $F_4 F_3$ | $A_p(\log(D_C))$ | | |
| $F_5$ | S | 767 | 54.22 |
| $\mu()\max()$ | A(log(S)) | 12 | 54.22 |
| $F_7$ | log(S) | 30 | 55.40 |
| $F_5$ | S | 390 | 58.84 |
| $F_5$ | A(log(S)) | 390 | 60.90 |

TABLE 8

Classification Results on FF. Accuracies of signal transformations and corresponding feature sets.

| Feature Set | Signal | #Feat. | Acc |
|---|---|---|---|
| $F_5$ | S | 774 | 51.23 |
| $F_8$ | log(S) | 18 | 51.81 |
| $F_6$ | log(S) | 600 | 51.89 |
| $F_7$ | S | 30 | 58.06 |
| $F_7$ | $S_C$ | 15 | 59.29 |
| $\mu(Ap())$ | log(D) | 3 | 62.3 |
| $F_2$ | log(S) | 78 | 64.04 |
| $F_2$ | log($S_C$) | 39 | 64.32 |
| $F_3, F_3$ | $\hat{A}(S)$, 13 | 36 | 64.89 |
| $F_5$ | log(S) | 768 | 65.27 |
| $F_1$ | $C_L - C_R$ | 2 | 65.37 |
| $F_1$ | $C_L - C_M$ | 2 | 65.55 |
| $F_7$ | log(S) | 30 | 65.55 |
| $F_1$ | $C_M - C_R$ | 2 | 65.84 |
| $F_5$ | $S_C$ | 768 | 66.03 |
| $F_6$ | $\hat{A}(S)$ | 600 | 66.03 |
| $F_2$ | $S_C$ | 39 | 66.88 |
| $\mu(A())$ | $S_C$ | 3 | 66.88 |
| $\mu(Ap())$ | log($D_C$) | 3 | 66.88 |
| $F_5$ | $A_p(\log(D_C))$ | 384 | 66.92 |
| $F_1$ | log($D_C$) | 6 | 67.17 |
| $F_6$ | $S_C$ | 300 | 67.26 |
| $F_3$ | log(S) | 24 | 67.55 |
| $F_3 F_3$ | $A_p(\log(D_C)), \hat{A}(S)$ | 36 | 67.55 |
| $F_4 F_3 \mu()$ | Ap(S) | 63 | 68.12 |
| $\mu()$ | A(log(S)) | 6 | 68.88 |
| $F_6$ | log(S) | 600 | 69.04 |
| $F_4$ | log(S) | 36 | 69.07 |
| $F_2$ | S | 78 | 69.26 |
| $F_5$ | P(W(S)) | 390 | 69.63 |
| $\mu()$ | $A_p(\log(D_C)), A(\log(S))$ | 9 | 69.63 |
| F1F2F3F4F5 F5F6F7F12 | log($D_C$), S, log(S) × 2, log(S) × 2, S, log(S) × 2 | 1944 | 70.49 |
| $F_4 F_3 \mu()$ | log(S) × 2, $A_p(D_C)$ | 63 | 71.34 |
| $F_4 F_3 F_1$ | log(S) × 2, log($D_C$), | 96 | 72.01 |
| $F_4 F_3$ | $A_p(\log(D_C)) \times 2$ | | |

TABLE 9

Classification on mixed train/test sets. FakeCatcher evaluated on several subsets, with various signals and features.

| Feature set | signal | test | ω | train | # feat. | s. acc | v. acc |
|---|---|---|---|---|---|---|---|
| $F_5$ | G(S) | FFX | 300 | FFT + FFC | 300 | 50 | — |
| $F_6$ | G(S) | FFX | 300 | FFT + FFC | 600 | 64.75 | — |
| $F_5$ | GQog(S)) | FFX | 300 | FFT + FFC | 300 | 70.25 | — |
| $LDA_3(F_1F_3F_4 F_{12}F_3F_4)$ | $log(D_C), A_p(log(D_C)) \times 2, S, log(S) \times 2$ | FFX | 300 | FFT + FFC | 3 | 71.75 | — |
| $F_1F_3F_4F_{12}F_3F_4$ | $log(DC), A_p(log(D_C)) \times 2, S, log(S) \times 2$ | FFC | 300 | FFT + FFX | 108 | 71.79 | — |
| $F_1F_3F_4\mu( )F_3F_4$ | $log(D_C), A_p(log(D_C)) \times 2, A(S), log(S) \times 2$ | FFC | 128 | FFT + FFX | 108 | 72.21 | — |
| $PCA_3(F_1F_3F_4 F_{12}F_3F_4)$ | $log(D_C), A_p(log(D_C)) \times 2, S, log(S) \times 2$ | FFX | 300 | FFT + FFC | 3 | 71 | 69.79 |
| $F_1F_3F_4F_3F_5$ | $log(D_C), A_p(log(D_C)) \times 2, log(S) \times 2, S$ | FFX | 300 | FFT + FFC | 1631 | 73.25 | 72.81 |
| $F_1F_3F_4F_{12}F_3F_4$ | $log(D_C), A_p(log(D_C)) \times 2, S, log(S) \times 2$ | FFX | 300 | FFT + FFC | 126 | 75 | 75.16 |
| $F_1F_3F_4F_{12}F_3F_4$ | $log(D_C), A_p(log(D_C)) \times 2, S, log(S) \times 2$ | FFX | 300 | FFT | 108 | 74.5 | 75.50 |
| $F_1F_3F_4F_{12}F_3F_4$ | $log(D_C), A_p(log(D_C)) \times 2, S, log(S) \times 2$ | FFX | 300 | FFT + FFC | 108 | 75 | 78.18 |
| $F_1F_3F_4F_{12}F_3F_4$ | $log(D_C), A_p(log(D_C)) \times 2, S, log(S) \times 2$ | FFX | 128 | FFT | 108 | 76.37 | 79.53 |
| $F_1F_3F_4F_3F_4$ | $log(D_C), A_p(log(D_C)) \times 2, log(S) \times 2$ | FFX | 128 | FFT + FFC | 108 | 75.51 | 79.53 |
| $F_1F_3F_4F_{12}F_3F_4$ | $log(D_C), A_p(log(D_C)) \times 2, S, log(S) \times 2$ | FFX | 128 | FFT + FFC | 126 | 77.12 | 81.54 |
| $F_1F_3F_4F_{12}F_3F_4$ | $log(D_C), A_p(log(D_C)) \times 2, S, log(S) \times 2$ | FFX | 128 | FFT + FFC | 108 | 77.50 | 82.55 |

TABLE 10

Cross Dataset Results. Accuracies for FakeCatcher trained on the first column and tested on the second column.

| Train | Test | Video Accuracy |
|---|---|---|
| Celeb-DF [4] | FF++ [3] | 83.10% |
| FF++ [3] | Celeb-DF [4] | 86.48% |
| FF++ [3] | Deep Fakes Dataset | 84.51% |
| Celeb-DF [4] | Deep Fakes Dataset | 82.39% |
| Deep Fakes | FF [2] | 86.34% |
| FF [2] | Deep Fakes Dataset | 67.61% |
| FF++ [3] | UADFV [56] | 97.92% |
| Deep Fakes Dataset | FF++ [3] | 80.60% |
| Deep Fakes Dataset | Celeb-DF [4] | 85.13% |

TABLE 11

Cross Model Results on FF++. Accuracies of FakeCatcher on FF++ dataset variations, where the samples generated by the model in the second column is excluded as test set.

| Train | Test | Video Accuracy |
|---|---|---|
| FF++ Face2Face | Face2Face [37] | 95.25% |
| FF++ FaceSwap | FaceSwap [59] | 96.25% |
| FF++ Deepfakes | Deepfakes [57] | 93.75% |
| FF++ NeuralTextures | NeuralTextures [77] | 81.25% |

TABLE 12

Accuracy per Segment Duration. Effects of ω, on segment and video accuracies, using SVM and CNN classifiers, on FF test, entire FF, and DF datasets. First 8 rows denote pairwise task.

| ω | dataset | s. acc. | v. acc. | CNNs. | CNNv. |
|---|---|---|---|---|---|
| 64 | FF test | 95.75% | — | — | — |
| 128 | FF test | 96.55% | — | — | — |
| 256 | FF test | 98.19% | — | — | — |
| 300 | FF test | 99.39% | — | — | — |
| 64 | FF | 93.61% | — | — | — |
| 128 | FF | 94.40% | — | — | — |
| 256 | FF | 94.15% | — | — | — |
| 300 | FF | 95.15% | — | — | — |
| 128 | DF | 75.82% | 78.57% | 87.42% | 91.07% |
| 150 | DF | 73.30% | 75.00% | — | — |
| 180 | DF | 76.78% | 80.35% | 86.25% | 85.71% |
| 240 | DF | 72.17% | 73.21% | — | — |
| 300 | DF | 69.25% | 66.07% | — | — |
| 128 | FF | 77.50% | 82.55% | 94.26% | 96% |
| 150 | FF | 75.93% | 78.18% | — | — |
| 180 | FF | 75.87% | 78.85% | 92.56% | 93.33% |
| 256 | FF | 72.55% | 73.82% | — | — |
| 300 | FF | 75.00% | 75.16% | — | — |
| 450 | FF | 70.78% | 71.33% | — | — |
| 600 | FF | 68.75% | 68.42% | — | — |

TABLE 13

ROI Analysis on SVM Classifier: Five different ROI sizes are evaluated on FF and DF datasets, with different segment sizes. Corresponding values are plotted in FIGS. 9A-9C, and corresponding ROI's are drawn on FIGS. 8A-8E.

| ROI | # pix | data | ω | # seg | p. acc | s. acc | v. acc |
|---|---|---|---|---|---|---|---|
| Smallest | 356 | FF | 128 | 1058 | 95.46 | 68.25 | 70.33 |
| Smallest | 356 | FF | 300 | 400 | 98.50 | 68.18 | 67.79 |
| Smallest | 356 | DF | 128 | 140 | 68.76 | 59.44 | 55.55 |
| Smallest | 356 | DF | 300 | 43 | 60.51 | 61.36 | 60.86 |
| Small | 2508 | FF | 128 | 1058 | 93.00 | 80.94 | 81.51 |
| Small | 2508 | FF | 300 | 400 | 94.50 | 77.41 | 76.47 |
| Small | 2508 | DF | 128 | 140 | 80.35 | 61.53 | 60.00 |
| Small | 2508 | DF | 300 | 43 | 81.53 | 68.18 | 65.21 |
| Default | 7213 | FF | 128 | 1058 | 96.55 | 77.50 | 82.55 |
| Default | 7213 | FF | 300 | 400 | 99.39 | 75.00 | 75.16 |
| Default | 7213 | DF | 128 | 140 | 83.55 | 75.82 | 78.57 |
| Default | 7213 | DF | 300 | 43 | 83.69 | 69.25 | 66.07 |
| Big | 10871 | FF | 128 | 1058 | 84.87 | 74.75 | 77.50 |
| Big | 10871 | FF | 300 | 400 | 87.50 | 73.07 | 71.66 |
| Big | 10871 | DF | 128 | 140 | 78.58 | 63.57 | 63.63 |
| Big | 10871 | DF | 300 | 43 | 82.51 | 60.46 | 59.09 |
| Face | 10921 | FF | 128 | 1058 | 61.66 | 60.04 | 74.23 |
| Face | 10921 | FF | 300 | 400 | 58.97 | 60.00 | 74.84 |
| Face | 10921 | DF | 128 | 140 | 58.93 | 61.53 | 62.22 |
| Face | 10921 | DF | 300 | 43 | 56.97 | 50.00 | 52.17 |

TABLE 14

Robustness. FakeCatcher accuracies on Celeb-DF dataset under different Gaussian Blur and Median filtering operations with different kernel sizes.

| Operation | Kernel | Accuracy |
|---|---|---|
| Original | N/A | 91.50% |
| Gaussian blur | 3 × 3 | 91.31% |
| Gaussian blur | 5 × 5 | 88.61% |
| Gaussian blur | 7 × 7 | 85.13% |
| Gaussian blur | 9 × 9 | 70.84% |
| Gaussian blur | 11 × 11 | 65.44% |
| Median Filter | 3 × 3 | 88.41% |
| Median Filter | 5 × 5 | 83.01% |
| Median Filter | 7 × 7 | 71.42% |
| Median Filter | 9 × 9 | 65.44% |
| Median Filter | 11 × 11 | 65.35% |

TABLE 15

Normalization Effects: Several normalization techniques are applied to the best configuration in the pairwise test.

| Normalization | Accuracy |
|---|---|
| None | 99.39 |
| 2-norm | 87.34 |
| ∞-norm | 84.03 |
| Standardized moment | 63.55 |
| Feature scaling | 59.03 |
| Spectral whitening | 49.09 |
| Coefficient of variation | 34.03 |

TABLE 16

Frequency Bands: Analysis on several frequency bands for best pairwise separation accuracy on entire FF dataset.

| Frequency band | Accuracy |
|---|---|
| 0-15 | 95.15 |
| 0-1.05 | 80.58 |
| 1.05-3.04 | 88.51 |
| 3.04-4.68 | 88.21 |
| 4.68-15 | 94.92 |

TABLE 17

Quantization Evaluation: Analysis on different bin counts for best pairwise separation accuracy on entire FF dataset.

| iFFT bins | Accuracy |
|---|---|
| 64 | 94.01 |
| 128 | 94.92 |
| 256 | 95.15 |
| 512 | 94.92 |

TABLE 18

DCT Components as Features: Following some image spoofing papers, accuracies with several DCT cut-offs with several window sizes are evaluated.

| ω | #videos | Setting | Accuracy | Setting | Accuracy |
|---|---|---|---|---|---|
| 512 | 62 | D | 70.96 | B | 77.41 |
| 256 | 236 | D | 70.33 | B | 72.03 |
| 196 | 323 | D | 71.20 | B | 77.39 |
| 128 | 532 | D | 68.23 | B | 72.93 |
| 64 | 1153 | D | 65.04 | B | 69.64 |
| 512 | 62 | C | 75.80 | A | 77.41 |
| 256 | 236 | C | 67.18 | A | 73.72 |
| 196 | 323 | C | 77.39 | A | 75.54 |
| 128 | 532 | C | 73.30 | A | 73.68 |
| 64 | 1153 | C | 68.08 | A | 69.55 |

What is claimed is:

1. A method of analyzing a video comprising skin for indicia of synthetic origin, comprising:
    receiving the video;
    generating signal maps of the skin;
    automatically determining, with at least one automated processor selected from the group consisting of a convolutional neural network and a support vector network, a spatial coherence and temporal consistency of biological signals represented in the video of the skin dependent on a power spectral density of respective signal maps; and
    producing an output dependent on the determined spatial and temporal consistency.

2. The method according to claim 1, wherein the automatic processor further comprises a synthetic video classifier.

3. The method according to claim 2, wherein the synthetic video classifier comprises the support vector network.

4. The method according to claim 2, wherein the synthetic video classifier comprises the convolutional neural network.

5. The method according to claim 1, wherein the video comprises color images, further comprising extracting the biological signals using photoplethysmography.

6. The method according to claim 5, wherein the spatial coherence is responsive differences in cyclic cardiac cycles over regions of the skin.

7. The method according to claim 6, wherein the skin comprises a human face.

8. The method according to claim 1, further comprising performing pattern recognition of the video to identify a region of the skin, and tracking movement of the region of the skin over time, wherein the spatial coherence is normalized for the position of the region of the skin.

9. The method according to claim 1, wherein said determining is performed by the automated processor comprising the convolutional neural network trained with both real and synthetic video training examples.

10. The method according to claim 1, wherein said determining is performed by the automated processor comprising the convolutional neural network trained with natural video training examples and corresponding synthetically modified natural video training examples, to detect synthetically modified natural video within a set of unclassified video.

11. The method according to claim 1, further comprising extracting a feature vector from at least biological signals in the video, and classifying the video dependent on the feature vector with a probabilistic video classifier.

12. The method according to claim 1, further comprising modifying the biological signals of the video to increase spatial coherence and temporal consistency, and outputting the video information having the modified biological signals.

13. A non-transitory computer readable medium storing instructions for controlling a programmable processor to analyze a received video comprising skin for indicia of synthetic origin, comprising:
  instructions for generating signal maps of the skin;
  instructions for implementing a network selected from the group consisting of a convolutional neural network and a support vector network for determining a spatial coherence and temporal consistency of biological signals represented in the video of the skin dependent on a power spectral density of respective signal maps; and
  instructions for producing an output dependent on the determined spatial and temporal consistency of the biological signals.

14. The non-transitory computer readable medium according to claim 13, wherein the instructions for determining comprise:
  instructions for extracting a feature vector from the video comprising biological signal features;
  instructions for classifying the feature vector; and
  instructions for implementing the convolutional neutral network trained to distinguish between video modified with synthetic elements corresponding to exposed skin and natural video of skin.

15. The non-transitory computer readable medium according to claim 13, wherein the instructions for determining comprise extracting the biological signals from the video using photoplethysmography.

16. A system for analyzing a video comprising skin for indicia of synthetic origin, comprising:
  an input port configured to receive the video;
  at least one automated processor responsive to a spatial coherence and temporal consistency of biological signals represented in the video of the skin, configured to:
    generate signal maps of the skin;
    extract feature vectors from the video comprising biological signals dependent on the generated signal maps;
    classify the feature vectors with at probabilistic video classifier selected from the group consisting of a convolutional neural network and a support vector network, dependent on a power spectral density of respective signal maps; and
    determine a likelihood of synthetic origin with a probabilistic video classifier; and
  an output port configured to communicate a signal selectively responsive to a probability of synthetic origin of the video, dependent on the determined spatial and temporal consistency.

17. The system according to claim 16, wherein the probabilistic video classifier comprises the convolutional neural network.

18. The system according to claim 16, wherein the video comprises color images, and the at least one automated processor is further configured to extract the feature vector comprising the biological signals by photoplethysmography.

19. The system according to claim 18, wherein the video of the skin comprises an image of a live human face, and the photoplethysmography is performed on facial skin.

20. The system according to claim 16, wherein the at least one automated processor is further configured to perform pattern recognition of the video to identify a region of the skin, and to determine the spatial and temporal coherence of the skin dependent on the pattern recognition.

* * * * *